US012499169B2

(12) United States Patent
Lyngbaek et al.

(10) Patent No.: US 12,499,169 B2
(45) Date of Patent: Dec. 16, 2025

(54) COMPUTER-IMPLEMENTED SYSTEM AND METHOD FOR PROVIDING WEBSITE NAVIGATION RECOMMENDATIONS

(71) Applicant: PALO ALTO RESEARCH CENTER INCORPORATED, Palo Alto, CA (US)

(72) Inventors: Kristian Lyngbaek, Palo Alto, CA (US); Lester D. Nelson, Santa Clara, CA (US); Eric A. Bier, Palo Alto, CA (US); Margaret H. Szymanski, Santa Clara, CA (US)

(73) Assignee: Xerox Corporation, Webster, NY (US)

( * ) Notice: Subject to any disclaimer, the term of this patent is extended or adjusted under 35 U.S.C. 154(b) by 0 days.

(21) Appl. No.: 18/209,269

(22) Filed: Jun. 13, 2023

(65) Prior Publication Data

US 2023/0325453 A1 Oct. 12, 2023

Related U.S. Application Data

(63) Continuation of application No. 13/673,917, filed on Nov. 9, 2012, now abandoned.

(51) Int. Cl.

| | |
|---|---|
| ***G06F 16/95*** | (2019.01) |
| ***G06F 16/955*** | (2019.01) |
| *G06F 16/954* | (2019.01) |

(52) U.S. Cl.
CPC ........ *G06F 16/9566* (2019.01); *G06F 16/954* (2019.01)

(58) Field of Classification Search
None
See application file for complete search history.

(56) References Cited

U.S. PATENT DOCUMENTS

| | | | |
|---|---|---|---|
| 817,441 | A | 4/1906 | Niesz |
| 4,309,569 | A | 1/1982 | Merkle |
| 4,921,898 | A | 5/1990 | Lenney |
| 5,070,134 | A | 12/1991 | Oyamada |
| 5,110,856 | A | 5/1992 | Oyamada |

(Continued)

FOREIGN PATENT DOCUMENTS

| | | |
|---|---|---|
| AU | 2017202840 | 5/2017 |
| CA | 2335801 | 5/2002 |

(Continued)

OTHER PUBLICATIONS

Kazunari Sugiyama; Adaptive Web Search Based on User Profile Constructed without Any Effort from Users; WWW2004, May 17-22, 2004; pp. 676-684 (Year: 2004).*

(Continued)

*Primary Examiner* — Ann J Lo
*Assistant Examiner* — Jermaine A Mincey
(74) *Attorney, Agent, or Firm* — Cesari and McKenna, LLP; Steven M. Mills

(57) ABSTRACT

A system and method for providing Website navigation recommendations is provided. A Web page of interest is identified as a destination Web page. A domain of Web pages related to the destination Web page is determined. Information is extracted from each Web page in the domain and a recommendation comprising instructions for navigating to the destination Web page is generated based on the extracted information.

20 Claims, 8 Drawing Sheets

(56) References Cited

U.S. PATENT DOCUMENTS 5,214,702 A 5/1993 Fischer
5,361,340 A 11/1994 Kelly
5,377,354 A 12/1994 Scannell
5,506,844 A 4/1996 Rao
5,629,370 A 5/1997 Freidzon
5,845,207 A 12/1998 Amin
5,870,605 A 2/1999 Bracho
5,895,470 A 4/1999 Pirolli et al.
5,966,534 A 10/1999 Cooke et al.
6,021,403 A 2/2000 Horvitz
6,037,976 A 3/2000 Wixson
6,052,683 A 4/2000 Irwin
6,085,320 A 7/2000 Kaliski, Jr.
6,091,724 A 7/2000 Chandra
6,131,110 A 10/2000 Bates et al.
6,134,532 A 10/2000 Lazarus et al.
6,173,364 B1 1/2001 Zenchelsky
6,175,831 B1 1/2001 Weinreich et al.
6,226,618 B1 5/2001 Downs
6,233,617 B1 5/2001 Rothwein
6,233,646 B1 5/2001 Hahm
6,249,807 B1 6/2001 Shaw et al.
6,320,495 B1 11/2001 Sporgis
6,332,158 B1 12/2001 Risley
6,338,066 B1 1/2002 Martin et al.
6,345,253 B1 2/2002 Viswanathan
6,366,988 B1 4/2002 Skiba
6,385,619 B1 5/2002 Eichstaedt
6,393,479 B1 5/2002 Glommen et al.
6,408,288 B1 6/2002 Ariyoshi
6,438,579 B1 8/2002 Hosken
6,456,234 B1 9/2002 Johnson
6,487,539 B1 11/2002 Aggarwal et al.
6,523,063 B1 2/2003 Miller et al.
6,526,351 B2 2/2003 Whitham
6,546,393 B1 4/2003 Khan
6,574,377 B1 6/2003 Cahill
6,587,835 B1 7/2003 Treyz et al.
6,654,735 B1 11/2003 Eichstaedt
6,654,792 B1 11/2003 Verma
6,667,957 B1 12/2003 Corson
6,680,675 B1 1/2004 Suzuki
6,681,220 B1 1/2004 Kaplan
6,681,326 B2 1/2004 Son
6,691,106 B1 2/2004 Sathyanarayan
6,714,778 B2 3/2004 Nykänen et al.
6,732,273 B1 5/2004 Byers
6,756,882 B2 6/2004 Benes et al.
6,769,066 B1 7/2004 Botros
6,772,333 B1 8/2004 Brendel
6,816,884 B1 11/2004 Summers
6,853,982 B2 2/2005 Smith et al.
6,862,280 B1 3/2005 Bertagna
6,901,452 B1 5/2005 Bertagna
6,917,985 B2 7/2005 Madruga
6,968,179 B1 11/2005 De Vries
6,968,393 B1 11/2005 Chen
6,981,029 B1 12/2005 Menditto
6,981,040 B1 12/2005 Konig et al.
7,013,308 B1 3/2006 Tunstall-Pedoe
7,013,389 B1 3/2006 Srivastava
7,031,308 B2 4/2006 Garcia-Luna-Aceves
7,043,475 B2 5/2006 Heer et al.
7,061,877 B1 6/2006 Gummalla
7,130,622 B2 10/2006 Vänskä et al.
7,152,094 B1 12/2006 Jannu
7,171,046 B2 1/2007 Myers et al.
7,177,646 B2 2/2007 ONeill
7,191,159 B2 3/2007 Horvitz et al.
7,194,454 B2 3/2007 Hansen et al.
7,200,637 B2 4/2007 Klos et al.
7,203,909 B1 4/2007 Horvitz et al.
7,206,860 B2 4/2007 Murakami
7,206,861 B1 4/2007 Callon
7,210,326 B2 5/2007 Kawamoto
7,213,260 B2 5/2007 Judge
7,231,607 B2 6/2007 Neely et al.
7,243,130 B2 7/2007 Horvitz et al.
7,246,159 B2 7/2007 Aggarwal
7,257,837 B2 8/2007 Xu
7,260,573 B1 8/2007 Jeh et al.
7,269,650 B2 9/2007 Hamdan
7,287,275 B2 10/2007 Moskowitz
7,305,436 B2 12/2007 Willis
7,315,541 B1 1/2008 Housel
7,315,883 B2 1/2008 Fair et al.
7,339,929 B2 3/2008 Zelig
7,346,668 B2 3/2008 Willis
7,346,703 B2 3/2008 Cope
7,349,827 B1 3/2008 Heller et al.
7,350,229 B1 3/2008 Lander
7,362,727 B1 4/2008 ONeill
7,382,787 B1 6/2008 Barnes
7,395,507 B2 7/2008 Robarts
7,401,087 B2 7/2008 Copperman
7,430,755 B1 9/2008 Hughes
7,444,251 B2 10/2008 Nikovski
7,466,223 B2 12/2008 Sefton
7,466,703 B1 12/2008 Arunachalam
7,472,422 B1 12/2008 Agbabian
7,496,668 B2 2/2009 Hawkinson
7,509,425 B1 3/2009 Rosenberg
7,523,016 B1 4/2009 Surdulescu
7,526,458 B2 4/2009 Flinn et al.
7,542,471 B2 6/2009 Samuels
7,543,031 B2 6/2009 Heidloff et al.
7,543,064 B2 6/2009 Juncker
7,552,233 B2 6/2009 Raju
7,555,482 B2 6/2009 Korkus
7,555,563 B2 6/2009 Ott
7,564,812 B1 7/2009 Elliott
7,565,425 B2 7/2009 Van Vleet et al.
7,567,547 B2 7/2009 Mosko
7,567,946 B2 7/2009 Andreoli
7,577,522 B2 8/2009 Rosenberg
7,580,971 B1 8/2009 Gollapudi
7,603,112 B2 10/2009 Huomo et al.
7,623,535 B2 11/2009 Guichard
7,639,840 B2 12/2009 Hanna et al.
7,647,507 B1 1/2010 Feng
7,652,594 B2 1/2010 Lamont et al.
7,660,324 B2 2/2010 Oguchi
7,668,885 B2 2/2010 Wittke
7,685,290 B2 3/2010 Satapati
7,698,463 B2 4/2010 Ogier
7,698,559 B1 4/2010 Chaudhury
7,707,226 B1 4/2010 Tonse
7,716,651 B2 5/2010 Cukierman et al.
7,739,338 B2 6/2010 Taylor
7,739,602 B2 6/2010 Feng et al.
7,743,050 B1 6/2010 Bern
7,765,470 B2 7/2010 Epstien
7,769,887 B1 8/2010 Bhattacharyya
7,779,467 B2 8/2010 Choi
7,801,177 B2 9/2010 Luss
7,809,601 B2 10/2010 Shaya et al.
7,816,441 B2 10/2010 Elizalde
7,831,670 B2 11/2010 Goodman et al.
7,831,707 B2 11/2010 Bardsley
7,831,733 B2 11/2010 Sultan
7,831,928 B1 11/2010 Rose et al.
7,835,578 B2 11/2010 Cheng et al.
7,885,844 B1 2/2011 Cohen
7,886,011 B2 2/2011 Buchheit
7,908,337 B2 3/2011 Garcia-Luna-Aceves
7,924,837 B1 4/2011 Shabtay
7,945,653 B2 5/2011 Zuckerberg et al.
7,949,574 B2 5/2011 Patel et al.
7,953,014 B2 5/2011 Toda
7,953,885 B1 5/2011 Devireddy
7,984,006 B2 7/2011 Price
8,000,267 B2 8/2011 Solis
8,010,669 B2 8/2011 Sathish et al.
8,010,691 B2 8/2011 Kollmansberger

(56) References Cited

U.S. PATENT DOCUMENTS 8,060,406 B2 11/2011 Blegen
8,074,289 B1 12/2011 Carpentier
8,095,523 B2 1/2012 Brave et al.
8,103,729 B2 1/2012 Tornabene et al.
8,117,441 B2 2/2012 Kurien
8,135,718 B1 3/2012 Das et al.
8,145,512 B1 3/2012 Henne
8,160,069 B2 4/2012 Jacobson
8,165,985 B2 * 4/2012 Stefik .................... G06F 16/355 706/62
8,204,060 B2 6/2012 Jacobson
8,214,364 B2 7/2012 Bigus
8,224,985 B2 7/2012 Takeda
8,225,057 B1 7/2012 Zheng
8,239,460 B2 8/2012 Meek et al.
8,255,468 B2 8/2012 Vitaldevara et al.
8,271,413 B2 9/2012 Agarwal et al.
8,271,578 B2 9/2012 Sheffi
8,296,351 B2 10/2012 Lazaridis et al.
8,307,029 B2 11/2012 Davis et al.
8,312,064 B1 11/2012 Gauvin
8,356,044 B2 1/2013 Stefik
8,386,622 B2 2/2013 Jacobson
8,428,614 B2 4/2013 Wolfe
8,428,777 B1 4/2013 Poursohi
8,447,851 B1 5/2013 Anderson
8,462,781 B2 6/2013 McGhee
8,467,297 B2 6/2013 Liu
8,473,633 B2 6/2013 Eardley
8,489,599 B2 7/2013 Bellotti
8,499,047 B2 7/2013 Weyer et al.
8,515,459 B2 8/2013 Busch
8,522,257 B2 8/2013 Rupp et al.
8,525,665 B1 9/2013 Trundle et al.
8,533,742 B2 9/2013 Ginis
8,549,013 B1 10/2013 Sarma et al.
8,553,562 B2 10/2013 Allan
8,554,703 B1 10/2013 Lin
8,572,214 B2 10/2013 Garcia-Luna-Aceves
8,589,494 B2 11/2013 Garrett
8,595,234 B2 11/2013 Subrahmanya et al.
8,600,920 B2 12/2013 Flynn
8,606,297 B1 12/2013 Simkai et al.
8,606,781 B2 12/2013 Chi et al.
8,620,764 B2 12/2013 Moritz et al.
8,654,649 B2 2/2014 Vasseur
8,661,046 B2 2/2014 King
8,665,757 B2 3/2014 Kling
8,667,172 B2 3/2014 Ravindran
8,676,929 B2 3/2014 Lazaridis et al.
8,677,451 B1 3/2014 Bhimaraju
8,688,619 B1 4/2014 Ezick
8,694,901 B2 4/2014 Falchuk et al.
8,699,350 B1 4/2014 Kumar
8,713,612 B2 4/2014 Levy et al.
8,718,055 B2 5/2014 Vasseur
8,719,391 B2 5/2014 Hamalainen et al.
8,732,584 B2 5/2014 Lee et al.
8,738,431 B2 5/2014 Elliott et al.
8,750,820 B2 6/2014 Allan
8,761,022 B2 6/2014 Chiabaut
8,762,302 B1 6/2014 Spivack
8,762,313 B2 * 6/2014 Lahav .................... G06N 5/046 706/46
8,762,477 B2 6/2014 Xie
8,762,570 B2 6/2014 Qian
8,762,707 B2 6/2014 Killian
8,767,627 B2 7/2014 Ezure
8,799,302 B2 8/2014 Singerman et al.
8,817,594 B2 8/2014 Gero
8,826,381 B2 9/2014 Kim
8,832,302 B1 9/2014 Bradford
8,836,536 B2 9/2014 Marwah
8,862,774 B2 10/2014 Vasseur
8,868,472 B1 10/2014 Lin
8,868,779 B2 10/2014 ONeill
8,874,842 B1 10/2014 Kimmel
8,880,682 B2 11/2014 Bishop
8,903,756 B2 12/2014 Zhao
8,923,293 B2 12/2014 Jacobson
8,934,496 B2 1/2015 Vasseur
8,937,865 B1 1/2015 Kumar
8,938,503 B2 1/2015 Schoen et al.
8,972,969 B2 3/2015 Gaither
8,977,596 B2 3/2015 Montulli
9,015,099 B2 4/2015 Nitz et al.
9,071,498 B2 6/2015 Beser
9,081,853 B2 7/2015 Rao et al.
9,098,834 B2 8/2015 Ramanathaiah et al.
9,112,895 B1 8/2015 Lin
9,137,190 B2 9/2015 Nairn et al.
9,195,640 B1 * 11/2015 Donneau-Golencer ...................... G10L 15/00
9,195,765 B2 11/2015 Russell et al.
9,195,989 B2 11/2015 Bosworth et al.
9,208,439 B2 12/2015 Roberts et al.
9,245,010 B1 1/2016 Donneau-Golencer et al.
9,245,238 B2 1/2016 Mejia et al.
9,256,785 B2 2/2016 Qvarfordt
9,280,911 B2 3/2016 Sadeh-Koniecpol
9,286,391 B1 3/2016 Dykstra
9,374,434 B2 6/2016 Sylvain
9,467,530 B2 10/2016 Belimpasakis et al.
9,507,851 B1 11/2016 Marquie et al.
9,589,560 B1 3/2017 Vitaladevuni
9,600,561 B2 3/2017 Bhargava
9,659,214 B1 5/2017 Kennedy
9,691,073 B2 6/2017 Tseng et al.
9,715,543 B2 7/2017 Macadaan et al.
9,906,539 B2 2/2018 Higbee
10,095,988 B2 10/2018 Tseng et al.
10,242,258 B2 3/2019 Guo
10,304,066 B2 5/2019 Tseng et al.
10,330,440 B2 6/2019 Lyren
10,394,919 B2 8/2019 Reese et al.
10,438,130 B2 10/2019 Rossi
10,885,478 B2 1/2021 Roberts
11,093,834 B2 8/2021 Ahern
11,127,020 B2 9/2021 Partridge
11,301,524 B2 4/2022 Bhargava
11,436,656 B2 9/2022 Huang
11,475,360 B2 10/2022 Rossi
11,477,302 B2 10/2022 Roberts
11,550,455 B2 1/2023 Rossi
11,599,709 B2 3/2023 Maxwell
12,242,580 B1 3/2025 Philbrick
2001/0032193 A1 10/2001 Ferber
2002/0010795 A1 1/2002 Brown
2002/0022516 A1 2/2002 Forden
2002/0038296 A1 3/2002 Margolus
2002/0046281 A1 4/2002 Cope et al.
2002/0048269 A1 4/2002 Hong
2002/0052781 A1 5/2002 Aufricht et al.
2002/0054593 A1 5/2002 Morohashi
2002/0077988 A1 6/2002 Sasaki
2002/0078066 A1 6/2002 Robinson
2002/0082910 A1 6/2002 Kontogouris
2002/0098891 A1 7/2002 Graham et al.
2002/0103698 A1 8/2002 Cantrell
2002/0111172 A1 8/2002 DeWolf
2002/0138551 A1 9/2002 Erickson
2002/0143802 A1 10/2002 Chi et al.
2002/0152305 A1 10/2002 Jackson
2002/0164977 A1 11/2002 Link, II
2002/0167939 A1 11/2002 Weissman-Berman et al.
2002/0173295 A1 11/2002 Nykanen
2002/0176404 A1 11/2002 Girard
2002/0188605 A1 12/2002 Adya
2002/0199014 A1 12/2002 Yang
2003/0004621 A1 1/2003 Bousquet
2003/0033394 A1 2/2003 Stine
2003/0046396 A1 3/2003 Richter
2003/0046437 A1 3/2003 Eytchison
2003/0048793 A1 3/2003 Pochon

(56) References Cited

U.S. PATENT DOCUMENTS

2003/0051100 A1 3/2003 Patel
2003/0061384 A1 3/2003 Nakatani
2003/0063072 A1 4/2003 Brandenberg
2003/0065731 A1 4/2003 Mohammed
2003/0074409 A1 4/2003 Bentley
2003/0074472 A1 4/2003 Lucco
2003/0088696 A1 5/2003 McCanne
2003/0097447 A1 5/2003 Johnston
2003/0099237 A1 5/2003 Mitra
2003/0140257 A1 7/2003 Peterka
2003/0163365 A1 8/2003 Farnes
2003/0200192 A1 10/2003 Bell et al.
2003/0229632 A1 12/2003 Harris
2003/0229892 A1 12/2003 Sardera
2004/0012625 A1 1/2004 Lei et al.
2004/0019603 A1 1/2004 Haigh et al.
2004/0024879 A1 2/2004 Dingman
2004/0030602 A1 2/2004 Rosenquist
2004/0059626 A1 3/2004 Smallwood
2004/0059736 A1 3/2004 Willse
2004/0064737 A1 4/2004 Milliken
2004/0071140 A1 4/2004 Jason
2004/0073617 A1 4/2004 Milliken
2004/0073715 A1 4/2004 Folkes
2004/0111477 A1 6/2004 Boss et al.
2004/0139230 A1 7/2004 Kim
2004/0141003 A1 7/2004 Nivers
2004/0176966 A1 9/2004 Chen
2004/0199587 A1 10/2004 McKnight
2004/0215509 A1 10/2004 Perry
2004/0221047 A1 11/2004 Grover
2004/0225627 A1 11/2004 Botros
2004/0252683 A1 12/2004 Kennedy
2005/0003832 A1 1/2005 Osafune
2005/0028156 A1 2/2005 Hammond
2005/0043060 A1 2/2005 Brandenberg
2005/0050211 A1 3/2005 Kaul
2005/0074001 A1 4/2005 Mattes
2005/0138049 A1 6/2005 Linden
2005/0144000 A1 6/2005 Yamasaki et al.
2005/0149508 A1 7/2005 Deshpande
2005/0159823 A1 7/2005 Hayes
2005/0198351 A1 9/2005 Nog
2005/0216434 A1 9/2005 Haveliwala
2005/0249196 A1 11/2005 Ansari
2005/0259637 A1 11/2005 Chu
2005/0262217 A1 11/2005 Nonaka
2005/0281288 A1 12/2005 Banerjee
2005/0286535 A1 12/2005 Shrum
2005/0289222 A1 12/2005 Sahim
2006/0010240 A1 1/2006 Chuah
2006/0010249 A1 1/2006 Sabesan
2006/0020662 A1 1/2006 Robinson
2006/0029102 A1 2/2006 Abe
2006/0039379 A1 2/2006 Abe
2006/0051055 A1 3/2006 Ohkawa
2006/0072523 A1 4/2006 Richardson
2006/0095457 A1 5/2006 Glasspool
2006/0099973 A1 5/2006 Nair
2006/0109237 A1 5/2006 Morita
2006/0129444 A1 6/2006 Baeza
2006/0129514 A1 6/2006 Watanabe
2006/0133343 A1 6/2006 Huang
2006/0143278 A1 6/2006 Bauchot et al.
2006/0146686 A1 7/2006 Kim
2006/0156222 A1 7/2006 Chi
2006/0173831 A1 8/2006 Basso
2006/0193295 A1 8/2006 White
2006/0200523 A1 9/2006 Tokuda et al.
2006/0200834 A1 9/2006 Cukierman et al.
2006/0203804 A1 9/2006 Whitmore
2006/0206445 A1 9/2006 Andreoli
2006/0206569 A1 9/2006 Heidloff
2006/0206578 A1 9/2006 Heidloff et al.
2006/0215684 A1 9/2006 Capone
2006/0223504 A1 10/2006 Ishak
2006/0224552 A1 10/2006 Riezler
2006/0235689 A1 10/2006 Sugihara
2006/0235696 A1 10/2006 Bennett
2006/0256767 A1 11/2006 Suzuki
2006/0268792 A1 11/2006 Belcea
2007/0019619 A1 1/2007 Foster
2007/0038777 A1 2/2007 Low et al.
2007/0061195 A1 3/2007 Liu
2007/0073888 A1 3/2007 Madhok
2007/0094265 A1 4/2007 Korkus
2007/0112880 A1 5/2007 Yang
2007/0124412 A1 5/2007 Narayanaswami
2007/0124721 A1 5/2007 Cowing et al.
2007/0127457 A1 6/2007 Mirtorabi
2007/0160062 A1 7/2007 Morishita
2007/0162394 A1 7/2007 Zager
2007/0171828 A1 7/2007 Dalal
2007/0185744 A1 8/2007 Robertson
2007/0189284 A1 8/2007 Kecskemeti
2007/0195765 A1 8/2007 Heissenbuttel
2007/0204011 A1 8/2007 Shaver
2007/0209067 A1 9/2007 Fogel
2007/0233736 A1 10/2007 Xiong
2007/0239892 A1 10/2007 Ott
2007/0240207 A1 10/2007 Belakhdar
2007/0245034 A1 10/2007 Retana
2007/0253418 A1 11/2007 Shiri
2007/0255677 A1 11/2007 Alexander
2007/0255699 A1 11/2007 Sreenivas
2007/0255781 A1 11/2007 Li
2007/0260596 A1 11/2007 Koran
2007/0260627 A1 11/2007 Knittel
2007/0274504 A1 11/2007 Maes
2007/0275701 A1 11/2007 Jonker
2007/0276907 A1 11/2007 Maes
2007/0283158 A1 12/2007 Danseglio
2007/0294187 A1 12/2007 Scherrer
2007/0300174 A1 12/2007 Macbeth
2008/0005056 A1 1/2008 Stelzig
2008/0010366 A1 1/2008 Duggan
2008/0037420 A1 2/2008 Tang
2008/0039203 A1 2/2008 Ackley et al.
2008/0040126 A1 2/2008 Estrada et al.
2008/0043989 A1 2/2008 Furutono
2008/0046340 A1 2/2008 Brown
2008/0059631 A1 3/2008 Bergstrom
2008/0077569 A1 3/2008 Lee et al.
2008/0080440 A1 4/2008 Yarvis
2008/0098420 A1 4/2008 Khivesara et al.
2008/0101357 A1 5/2008 Iovanna
2008/0107034 A1 5/2008 Jetcheva
2008/0107259 A1 5/2008 Satou
2008/0114639 A1 5/2008 Meek et al.
2008/0123862 A1 5/2008 Rowley
2008/0133444 A1 6/2008 Gao
2008/0133583 A1 6/2008 Artan
2008/0133755 A1 6/2008 Pollack
2008/0151755 A1 6/2008 Nishioka
2008/0159271 A1 7/2008 Kutt
2008/0165775 A1 7/2008 Das
2008/0172363 A1 7/2008 Wang et al.
2008/0178081 A1 7/2008 Reshef
2008/0186901 A1 8/2008 Itagaki
2008/0200153 A1 8/2008 Fitzpatrick
2008/0205775 A1 8/2008 Brinker
2008/0215669 A1 9/2008 Gaddy
2008/0216086 A1 9/2008 Tanaka
2008/0243992 A1 10/2008 Jardetzky
2008/0250006 A1 10/2008 Dettinger
2008/0256138 A1 10/2008 Sim-Tang
2008/0256359 A1 10/2008 Kahn
2008/0270618 A1 10/2008 Rosenberg
2008/0271143 A1 10/2008 Stephens
2008/0287142 A1 11/2008 Keighran
2008/0288580 A1 11/2008 Wang
2008/0294617 A1 11/2008 Chakrabarti
2008/0297589 A1 12/2008 Kurtz
2008/0298376 A1 12/2008 Takeda

(56) References Cited

U.S. PATENT DOCUMENTS

| | | | |
|---|---|---|---|
| 2008/0320148 | A1 | 12/2008 | Capuozzo |
| 2009/0006659 | A1 | 1/2009 | Collins |
| 2009/0013324 | A1 | 1/2009 | Gobara |
| 2009/0022154 | A1 | 1/2009 | Kiribe |
| 2009/0024641 | A1 | 1/2009 | Quigley |
| 2009/0030978 | A1 | 1/2009 | Johnson |
| 2009/0037763 | A1 | 2/2009 | Adhya |
| 2009/0052660 | A1 | 2/2009 | Chen |
| 2009/0064053 | A1 | 3/2009 | Crawford |
| 2009/0067429 | A1 | 3/2009 | Nagai |
| 2009/0077000 | A1 | 3/2009 | Begole |
| 2009/0077001 | A1 | 3/2009 | Macready |
| 2009/0077027 | A1 | 3/2009 | King et al. |
| 2009/0077057 | A1 | 3/2009 | Ducheneaut |
| 2009/0077184 | A1 | 3/2009 | Brewer |
| 2009/0089288 | A1 | 4/2009 | Petersen |
| 2009/0092043 | A1 | 4/2009 | Lapuh |
| 2009/0097631 | A1 | 4/2009 | Gisby |
| 2009/0103515 | A1 | 4/2009 | Pointer |
| 2009/0106040 | A1 | 4/2009 | Jones |
| 2009/0113068 | A1 | 4/2009 | Fujihira |
| 2009/0116393 | A1 | 5/2009 | Hughes |
| 2009/0117922 | A1 | 5/2009 | Bell |
| 2009/0125321 | A1 | 5/2009 | Charlebois et al. |
| 2009/0132662 | A1 | 5/2009 | Sheridan |
| 2009/0144272 | A1 | 6/2009 | Adarsh et al. |
| 2009/0144300 | A1 | 6/2009 | Chatley |
| 2009/0157828 | A1 | 6/2009 | Agrawal |
| 2009/0157887 | A1 | 6/2009 | Froment |
| 2009/0177541 | A1 | 7/2009 | Martel et al. |
| 2009/0185745 | A1 | 7/2009 | Momosaki |
| 2009/0193101 | A1 | 7/2009 | Munetsugu |
| 2009/0204470 | A1 | 8/2009 | Weyl |
| 2009/0204471 | A1 | 8/2009 | Elenbaas |
| 2009/0210282 | A1 | 8/2009 | Elenbaas |
| 2009/0222344 | A1 | 9/2009 | Greene |
| 2009/0224867 | A1 | 9/2009 | O'Shaughnessy et al. |
| 2009/0228593 | A1 | 9/2009 | Takeda |
| 2009/0234878 | A1 | 9/2009 | Herz et al. |
| 2009/0234958 | A1 | 9/2009 | Lee |
| 2009/0248819 | A1 | 10/2009 | Hutchison et al. |
| 2009/0254572 | A1 | 10/2009 | Redlich |
| 2009/0254971 | A1 | 10/2009 | Herz et al. |
| 2009/0265764 | A1 | 10/2009 | Schultz et al. |
| 2009/0268905 | A1 | 10/2009 | Matsushima |
| 2009/0285209 | A1 | 11/2009 | Stewart |
| 2009/0287835 | A1 | 11/2009 | Jacobson |
| 2009/0288143 | A1 | 11/2009 | Stebila |
| 2009/0288163 | A1 | 11/2009 | Jacobson |
| 2009/0292743 | A1 | 11/2009 | Bigus |
| 2009/0293121 | A1 | 11/2009 | Bigus |
| 2009/0300079 | A1 | 12/2009 | Shitomi |
| 2009/0300407 | A1 | 12/2009 | Karnath |
| 2009/0300512 | A1 | 12/2009 | Ahn |
| 2009/0307333 | A1 | 12/2009 | Welingkar |
| 2009/0323632 | A1 | 12/2009 | Nix |
| 2010/0005061 | A1 | 1/2010 | Basco |
| 2010/0027539 | A1 | 2/2010 | Beverly |
| 2010/0036856 | A1 | 2/2010 | Portilla |
| 2010/0046546 | A1 | 2/2010 | Ram |
| 2010/0057929 | A1 | 3/2010 | Merat |
| 2010/0058346 | A1 | 3/2010 | Narang |
| 2010/0064015 | A1 | 3/2010 | Sacks et al. |
| 2010/0088370 | A1 | 4/2010 | Wu |
| 2010/0094767 | A1 | 4/2010 | Miltonberger |
| 2010/0094876 | A1 | 4/2010 | Huang |
| 2010/0098093 | A1 | 4/2010 | Ejzak |
| 2010/0100465 | A1 | 4/2010 | Cooke |
| 2010/0103870 | A1 | 4/2010 | Garcia-Luna-Aceves |
| 2010/0106752 | A1 | 4/2010 | Eckhardt, III |
| 2010/0124191 | A1 | 5/2010 | Vos |
| 2010/0125911 | A1 | 5/2010 | Bhaskaran |
| 2010/0131660 | A1 | 5/2010 | Dec |
| 2010/0150155 | A1 | 6/2010 | Napierala |
| 2010/0165976 | A1 | 7/2010 | Khan |
| 2010/0169478 | A1 | 7/2010 | Saha |
| 2010/0169503 | A1 | 7/2010 | Kollmansberger |
| 2010/0180332 | A1 | 7/2010 | Ben-Yochanan |
| 2010/0182995 | A1 | 7/2010 | Hwang |
| 2010/0185753 | A1 | 7/2010 | Liu |
| 2010/0195653 | A1 | 8/2010 | Jacobson |
| 2010/0195654 | A1 | 8/2010 | Jacobson |
| 2010/0195655 | A1 | 8/2010 | Jacobson |
| 2010/0217874 | A1 | 8/2010 | Anantharaman |
| 2010/0228582 | A1 | 9/2010 | King et al. |
| 2010/0232402 | A1 | 9/2010 | Przybysz |
| 2010/0232439 | A1 | 9/2010 | Dham |
| 2010/0235516 | A1 | 9/2010 | Nakamura |
| 2010/0241464 | A1 | 9/2010 | Amigo |
| 2010/0246549 | A1 | 9/2010 | Zhang |
| 2010/0250497 | A1 | 9/2010 | Redlich |
| 2010/0250939 | A1 | 9/2010 | Adams |
| 2010/0262650 | A1 | 10/2010 | Chauhan et al. |
| 2010/0268782 | A1 | 10/2010 | Zombek |
| 2010/0272107 | A1 | 10/2010 | Papp |
| 2010/0274628 | A1 | 10/2010 | Kunz et al. |
| 2010/0281263 | A1 | 11/2010 | Ugawa |
| 2010/0284309 | A1 | 11/2010 | Allan |
| 2010/0284404 | A1 | 11/2010 | Gopinath |
| 2010/0293293 | A1 | 11/2010 | Beser |
| 2010/0299275 | A1 | 11/2010 | Greenspan |
| 2010/0322249 | A1 | 12/2010 | Thathapudi |
| 2011/0013637 | A1 | 1/2011 | Xue |
| 2011/0016161 | A1 | 1/2011 | Loeb |
| 2011/0016206 | A1 | 1/2011 | Kodialam |
| 2011/0019674 | A1 | 1/2011 | Iovanna |
| 2011/0022812 | A1 | 1/2011 | vanderlinden |
| 2011/0029952 | A1 | 2/2011 | Harrington |
| 2011/0055392 | A1 | 3/2011 | Shen |
| 2011/0055921 | A1 | 3/2011 | Narayanaswamy |
| 2011/0060716 | A1 | 3/2011 | Forman |
| 2011/0060717 | A1 | 3/2011 | Forman |
| 2011/0090908 | A1 | 4/2011 | Jacobson |
| 2011/0106755 | A1 | 5/2011 | Hao |
| 2011/0119302 | A1 | 5/2011 | Gorman |
| 2011/0125678 | A1 | 5/2011 | Partridge |
| 2011/0138000 | A1 | 6/2011 | Balasubramanian et al. |
| 2011/0145597 | A1 | 6/2011 | Yamaguchi |
| 2011/0145858 | A1 | 6/2011 | Philpott |
| 2011/0149858 | A1 | 6/2011 | Hwang |
| 2011/0153840 | A1 | 6/2011 | Narayana |
| 2011/0158122 | A1 | 6/2011 | Murphy |
| 2011/0161308 | A1* | 6/2011 | Andersen ............ G06F 16/9538 707/707 |
| 2011/0161408 | A1 | 6/2011 | Kim |
| 2011/0202609 | A1 | 8/2011 | Chaturvedi |
| 2011/0219427 | A1 | 9/2011 | Hito |
| 2011/0231578 | A1 | 9/2011 | Nagappan |
| 2011/0239256 | A1 | 9/2011 | Gholmieh |
| 2011/0246600 | A1 | 10/2011 | Kageyama |
| 2011/0258049 | A1 | 10/2011 | Ramer |
| 2011/0264824 | A1 | 10/2011 | Venkata Subramanian |
| 2011/0265159 | A1 | 10/2011 | Ronda |
| 2011/0265174 | A1 | 10/2011 | Thornton |
| 2011/0271007 | A1 | 11/2011 | Wang |
| 2011/0286457 | A1 | 11/2011 | Ee |
| 2011/0286459 | A1 | 11/2011 | Rembarz |
| 2011/0295612 | A1 | 12/2011 | Donneau-Golencer |
| 2011/0295783 | A1 | 12/2011 | Zhao |
| 2011/0299454 | A1 | 12/2011 | Krishnaswamy |
| 2011/0302169 | A1 | 12/2011 | Brdiczka |
| 2011/0320550 | A1 | 12/2011 | Lawson et al. |
| 2012/0001919 | A1 | 1/2012 | Lumer |
| 2012/0011170 | A1 | 1/2012 | Elad |
| 2012/0011551 | A1 | 1/2012 | Levy |
| 2012/0016875 | A1 | 1/2012 | Jin |
| 2012/0023113 | A1 | 1/2012 | Ferren |
| 2012/0023226 | A1 | 1/2012 | Petersen |
| 2012/0036180 | A1 | 2/2012 | Thornton |
| 2012/0041969 | A1 | 2/2012 | Priyadarshan |
| 2012/0046966 | A1 | 2/2012 | Chang et al. |
| 2012/0047361 | A1 | 2/2012 | Erdmann |
| 2012/0066727 | A1 | 3/2012 | Nozoe |
| 2012/0096114 | A1 | 4/2012 | McColgan et al. |

(56) References Cited

U.S. PATENT DOCUMENTS

2012/0102121 A1 4/2012 Wu
2012/0106339 A1 5/2012 Mishra
2012/0114313 A1 5/2012 Phillips
2012/0120803 A1 5/2012 Farkas
2012/0127994 A1 5/2012 Ko
2012/0131020 A1 5/2012 Nitz et al.
2012/0135751 A1 5/2012 Mishra
2012/0136676 A1 5/2012 Goodall
2012/0136936 A1 5/2012 Quintuna
2012/0136945 A1 5/2012 Lee
2012/0137367 A1 5/2012 Dupont
2012/0141093 A1 6/2012 Yamaguchi
2012/0155464 A1 6/2012 Kim
2012/0158973 A1 6/2012 Jacobson
2012/0163373 A1 6/2012 Lo
2012/0166377 A1 6/2012 Sathish et al.
2012/0170913 A1 7/2012 Isozaki
2012/0179653 A1 7/2012 Araki
2012/0191716 A1 7/2012 Omoigui
2012/0197690 A1 8/2012 Agulnek
2012/0198048 A1 8/2012 Ioffe
2012/0209654 A1 8/2012 Romagiano
2012/0221150 A1 8/2012 Arensmeier
2012/0224487 A1 9/2012 Hui
2012/0226902 A1 9/2012 Kim
2012/0233207 A1 9/2012 Mohajer
2012/0257500 A1 10/2012 Lynch
2012/0257733 A1 10/2012 Kosseifi
2012/0278127 A1 11/2012 Kirakosyan et al.
2012/0278300 A1 11/2012 Soubbotin
2012/0278388 A1 11/2012 Kleinbart
2012/0278473 A1 11/2012 Griffiths
2012/0284791 A1 11/2012 Miller
2012/0290520 A1 11/2012 Frank
2012/0290669 A1 11/2012 Parks
2012/0290919 A1 11/2012 Melnyk
2012/0291102 A1 11/2012 Cohen
2012/0310587 A1 12/2012 Tu
2012/0314580 A1 12/2012 Hong
2012/0317307 A1 12/2012 Ravindran
2012/0322422 A1 12/2012 Frecks
2012/0323933 A1 12/2012 He
2012/0324004 A1 12/2012 Le
2012/0330975 A1 12/2012 Lee
2012/0331112 A1 12/2012 Chatani
2013/0006991 A1 1/2013 Nagano
2013/0009993 A1 1/2013 Horseman
2013/0018954 A1 1/2013 Cheng
2013/0024560 A1 1/2013 Vasseur
2013/0041982 A1 2/2013 Shi
2013/0051392 A1 2/2013 Filsfils
2013/0054971 A1 2/2013 Yamaguchi
2013/0060962 A1 3/2013 Wang
2013/0066823 A1 3/2013 Sweeney
2013/0070928 A1 3/2013 Ellis
2013/0073552 A1 3/2013 Rangwala
2013/0074155 A1 3/2013 Huh
2013/0091539 A1 4/2013 Khurana
2013/0097664 A1 4/2013 Herz
2013/0110987 A1 5/2013 Kim
2013/0110992 A1 5/2013 Ravindra et al.
2013/0111063 A1 5/2013 Lee
2013/0125057 A1 5/2013 Kashik
2013/0132719 A1 5/2013 Kobayashi
2013/0151584 A1 6/2013 Westphal
2013/0151646 A1 6/2013 Chidambaram
2013/0152070 A1 6/2013 Bhullar
2013/0159100 A1 6/2013 Raina et al.
2013/0163426 A1 6/2013 Beliveau
2013/0166668 A1 6/2013 Byun
2013/0173822 A1 7/2013 Hong
2013/0182568 A1 7/2013 Lee
2013/0182931 A1 7/2013 Fan
2013/0185406 A1 7/2013 Choi
2013/0191412 A1 7/2013 Kitamura
2013/0197698 A1 8/2013 Shah
2013/0198119 A1 8/2013 Eberhardt, III
2013/0198197 A1 8/2013 Sawhney et al.
2013/0204813 A1 8/2013 Master
2013/0212185 A1 8/2013 Pasquero
2013/0219038 A1 8/2013 Lee
2013/0219081 A1 8/2013 Qian
2013/0219478 A1 8/2013 Mahamuni
2013/0223237 A1 8/2013 Hui
2013/0226865 A1 8/2013 Munemann
2013/0227114 A1 8/2013 Vasseur
2013/0227166 A1 8/2013 Ravindran
2013/0242996 A1 9/2013 Varvello
2013/0246050 A1 9/2013 Yu
2013/0246383 A1 9/2013 White
2013/0250809 A1 9/2013 Hui
2013/0253913 A1 9/2013 Tunstall-Pedoe
2013/0262216 A1 10/2013 Zhang
2013/0262365 A1 10/2013 Dolbear
2013/0271454 A1 10/2013 Lyons
2013/0273941 A1 10/2013 Grokop
2013/0282854 A1 10/2013 Jang
2013/0282860 A1 10/2013 Zhang
2013/0282889 A1 10/2013 Tito
2013/0282920 A1 10/2013 Zhang
2013/0290369 A1 10/2013 Sayers et al.
2013/0304758 A1 11/2013 Gruber
2013/0304937 A1 11/2013 Lee
2013/0325858 A1 12/2013 Xu
2013/0325888 A1 12/2013 Oneppo
2013/0325970 A1 12/2013 Roberts
2013/0329696 A1 12/2013 Xu
2013/0336103 A1 12/2013 Vasseur
2013/0336323 A1 12/2013 Srinivasan
2013/0338995 A1 12/2013 Elkins
2013/0339481 A1 12/2013 Hong
2013/0343408 A1 12/2013 Cook
2014/0003232 A1 1/2014 Guichard
2014/0006012 A1 1/2014 Zhou
2014/0006354 A1 1/2014 Parkison
2014/0006565 A1 1/2014 Muscariello
2014/0016820 A1 1/2014 Roberts
2014/0029445 A1 1/2014 Hui
2014/0032714 A1 1/2014 Liu
2014/0040370 A1 2/2014 Buhr
2014/0040505 A1 2/2014 Barton
2014/0040628 A1 2/2014 Fort
2014/0043325 A1 2/2014 Ruble
2014/0046983 A1 2/2014 Galloway
2014/0047513 A1 2/2014 vantNoordende
2014/0074730 A1 3/2014 Arensmeier
2014/0075567 A1 3/2014 Raleigh
2014/0082135 A1 3/2014 Jung
2014/0089048 A1 3/2014 Bruich
2014/0089454 A1 3/2014 Jeon
2014/0096249 A1 4/2014 Dupont
2014/0108313 A1 4/2014 Heidasch
2014/0108445 A1 4/2014 Oztekin
2014/0108474 A1 4/2014 David
2014/0115037 A1 4/2014 Liu
2014/0129736 A1 5/2014 Yu
2014/0136508 A1* 5/2014 Lyngbaek ........... G06F 16/9566 707/E17.108
2014/0136528 A1 5/2014 Anima
2014/0136814 A1 5/2014 Stark
2014/0140348 A1 5/2014 Perlman
2014/0143370 A1 5/2014 Vilenski
2014/0146819 A1 5/2014 Bae
2014/0149733 A1 5/2014 Kim
2014/0156282 A1 6/2014 Madere
2014/0156396 A1 6/2014 deKozan
2014/0156567 A1 6/2014 Scholtes
2014/0156654 A1 6/2014 Dutta et al.
2014/0156681 A1 6/2014 Lee
2014/0165207 A1 6/2014 Engel
2014/0172783 A1 6/2014 Suzuki
2014/0172981 A1 6/2014 Kim
2014/0173034 A1 6/2014 Liu
2014/0173076 A1 6/2014 Ravindran

(56) References Cited

U.S. PATENT DOCUMENTS

| | | | |
|---|---|---|---|
| 2014/0192717 | A1 | 7/2014 | Liu |
| 2014/0195328 | A1 | 7/2014 | Ferens |
| 2014/0195641 | A1 | 7/2014 | Wang |
| 2014/0195666 | A1 | 7/2014 | Dumitriu |
| 2014/0199663 | A1 | 7/2014 | Sadeh-Koniecpol |
| 2014/0214942 | A1 | 7/2014 | Ozonat |
| 2014/0233575 | A1 | 8/2014 | Xie |
| 2014/0237085 | A1 | 8/2014 | Park |
| 2014/0237595 | A1 | 8/2014 | Sridhara |
| 2014/0245359 | A1 | 8/2014 | DeFoy |
| 2014/0254595 | A1 | 9/2014 | Luo |
| 2014/0257540 | A1 | 9/2014 | Pacione |
| 2014/0280208 | A1 | 9/2014 | McConky |
| 2014/0280214 | A1 | 9/2014 | Han |
| 2014/0280823 | A1 | 9/2014 | Varvello |
| 2014/0281489 | A1 | 9/2014 | Peterka |
| 2014/0281505 | A1 | 9/2014 | Zhang |
| 2014/0282257 | A1 | 9/2014 | Nixon |
| 2014/0282816 | A1 | 9/2014 | Xie |
| 2014/0289325 | A1 | 9/2014 | Solis |
| 2014/0289790 | A1 | 9/2014 | Wilson |
| 2014/0298248 | A1 | 10/2014 | Kang |
| 2014/0314093 | A1 | 10/2014 | You |
| 2014/0337266 | A1 | 11/2014 | Kalns |
| 2014/0337276 | A1 | 11/2014 | Iordanov |
| 2014/0365550 | A1 | 12/2014 | Jang |
| 2015/0006316 | A1 | 1/2015 | Zhou et al. |
| 2015/0006528 | A1 | 1/2015 | Rao |
| 2015/0006896 | A1 | 1/2015 | Franck |
| 2015/0018770 | A1 | 1/2015 | Baran |
| 2015/0032892 | A1 | 1/2015 | Narayanan |
| 2015/0039890 | A1 | 2/2015 | Khosravi |
| 2015/0049591 | A1 | 2/2015 | Adams |
| 2015/0063802 | A1 | 3/2015 | Bahadur |
| 2015/0066554 | A1 | 3/2015 | Red |
| 2015/0089081 | A1 | 3/2015 | Thubert |
| 2015/0095182 | A1 | 4/2015 | Zhou et al. |
| 2015/0095481 | A1 | 4/2015 | Ohnishi |
| 2015/0095514 | A1 | 4/2015 | Yu |
| 2015/0131850 | A1 | 5/2015 | Qvarfordt |
| 2015/0134612 | A1 | 5/2015 | Silberstein |
| 2015/0149484 | A1 | 5/2015 | Kelley |
| 2015/0188770 | A1 | 7/2015 | Naiksatam |
| 2015/0193695 | A1 | 7/2015 | Cruz Mota |
| 2015/0195149 | A1 | 7/2015 | Vasseur |
| 2015/0207633 | A1 | 7/2015 | Ravindran |
| 2015/0207864 | A1 | 7/2015 | Wilson |
| 2015/0261867 | A1 | 9/2015 | Singal |
| 2015/0262067 | A1 | 9/2015 | Sridhara |
| 2015/0277846 | A1 | 10/2015 | Yen |
| 2015/0289797 | A1 | 10/2015 | Pacione |
| 2015/0309769 | A1 | 10/2015 | Greene |
| 2015/0324686 | A1 | 11/2015 | Julian |
| 2015/0356462 | A1 | 12/2015 | Fawaz |
| 2016/0042539 | A1 | 2/2016 | Ye et al. |
| 2016/0048500 | A1 | 2/2016 | Hebert |
| 2016/0093154 | A1 | 3/2016 | Bytnar |
| 2016/0119364 | A1 | 4/2016 | Zolli |
| 2016/0140481 | A1 | 5/2016 | Huang |
| 2016/0142435 | A1 | 5/2016 | Bernstein |
| 2016/0147892 | A1 | 5/2016 | Gilbert et al. |
| 2016/0180438 | A1 | 6/2016 | Boston |
| 2016/0196335 | A1 | 7/2016 | Vee |
| 2016/0203002 | A1 | 7/2016 | Kannan |
| 2016/0222459 | A1 | 8/2016 | Keating |
| 2016/0234143 | A1 | 8/2016 | Choudhary |
| 2016/0253710 | A1 | 9/2016 | Publicover |
| 2016/0283887 | A1 | 9/2016 | Jagyasi |
| 2016/0314627 | A1 | 10/2016 | Fish |
| 2016/0321616 | A1 | 11/2016 | Gedge |
| 2016/0335683 | A1 | 11/2016 | Roberts |
| 2016/0335686 | A1 | 11/2016 | AthuluruTlrumala |
| 2016/0350662 | A1 | 12/2016 | Jin |
| 2016/0358065 | A1 | 12/2016 | Gedge |
| 2016/0359993 | A1 | 12/2016 | Hendrickson |
| 2016/0379136 | A1 | 12/2016 | Chen |
| 2017/0032248 | A1 | 2/2017 | Dotan-Cohen |
| 2017/0085672 | A1 | 3/2017 | Liu |
| 2017/0111237 | A1 | 4/2017 | Shah |
| 2017/0126963 | A1 | 5/2017 | Todasco |
| 2017/0140285 | A1 | 5/2017 | Dotan-Cohen |
| 2017/0154282 | A1 | 6/2017 | Rossi |
| 2017/0163503 | A1 | 6/2017 | Black |
| 2017/0177833 | A1 | 6/2017 | Lewallen |
| 2017/0178024 | A1 | 6/2017 | Kida |
| 2017/0187807 | A1 | 6/2017 | Clernon |
| 2017/0201779 | A1 | 7/2017 | Publicover |
| 2017/0242920 | A1 | 8/2017 | Neland |
| 2017/0277559 | A1 | 9/2017 | Mullins |
| 2017/0279827 | A1 | 9/2017 | Savalle |
| 2017/0289769 | A1 | 10/2017 | Ceker |
| 2017/0309196 | A1 | 10/2017 | Vangala |
| 2017/0323233 | A1 | 11/2017 | Bencke |
| 2017/0323463 | A1 | 11/2017 | Leiba |
| 2017/0337177 | A1 | 11/2017 | Maxwell, III |
| 2018/0307995 | A1 | 10/2018 | Conroy |
| 2019/0311718 | A1 | 10/2019 | Huber et al. |
| 2021/0275023 | A1 | 9/2021 | Kalantarian et al. |
| 2023/0186192 | A1 | 6/2023 | Xia |
| 2024/0054430 | A1 | 2/2024 | Maikhuri |
| 2024/0135090 | A1 | 4/2024 | Kapcar et al. |

FOREIGN PATENT DOCUMENTS

| | | | |
|---|---|---|---|
| CA | 2378765 | | 9/2002 |
| EP | 1024437 | | 8/2000 |
| EP | 1077422 | | 2/2001 |
| EP | 1850134 | B1 | 10/2007 |
| EP | 2120402 | | 11/2009 |
| EP | 2120419 | | 11/2009 |
| EP | 2124415 | | 11/2009 |
| EP | 2214357 | | 8/2010 |
| EP | 2523436 | | 11/2012 |
| JP | 2000112978 | | 4/2000 |
| JP | 2000215023 | A | 8/2000 |
| JP | 2003330697 | | 11/2003 |
| JP | 2006293830 | | 10/2006 |
| JP | 2016081140 | A | 5/2016 |
| KR | 20170036805 | | 4/2017 |
| WO | 2001020481 | | 3/2001 |
| WO | 2003005288 | | 1/2003 |
| WO | 2003049369 | | 6/2003 |
| WO | 2006104345 | | 10/2006 |
| WO | 2007144388 | | 12/2007 |
| WO | 2008113425 | | 9/2008 |
| WO | 2011019295 | | 2/2011 |
| WO | 2011049890 | | 4/2011 |
| WO | 2011140701 | | 11/2011 |
| WO | 2013059906 | | 5/2013 |
| WO | 2013123410 | | 8/2013 |

OTHER PUBLICATIONS

Ahmed Hassan Awadallah; Supporting Complex Search Tasks; ACM; ; pp. 829-838 (Year: 2014).*

Dongshan Xing; Efficient data mining for web navigation patterns; 2002; Elsevier; pp. 55-63.*

Francisco Claude; Fast and Compact Web Graph Representation; 2010; ACM; pp. 1-31.*

"Final Written Decision," *Snap Inc.* v. *Palo Alto Research Center LLC*, IPR2021-00986 of U.S. Pat. No. 9,208,439, Paper: 54, 68 pages. (2023).

"Final Written Decision," *Snap Inc.* v. *Palo Alto Research Center LLC*, IPR2021-00987 of U.S. Pat. No. 8,489,599; *Facebook Inc.* v. *Palo Alto Research Center LLC*, IPR2021-01294 of U.S. Pat. No. 8,489,599; and *Twitter Inc.* v. *Palo Alto Research Center LLC*, IPR2021-01458 of U.S. Pat. No. 8,489,599, Paper: 54, 165 pages. (2023).

"Final Written Decision," *Facebook Inc.* v. *Palo Alto Research Center LLLC*, IPR2021-01264 of U.S. Pat. No. 7,043,475, Paper: 37, 60 pages. (2023).

(56) References Cited

OTHER PUBLICATIONS

"Final Written Decision," *Snap Inc.* v. *Palo Alto Research Center LLC*, IPR2021-00987 of U.S. Pat. No. 8,489,599; *Facebook Inc.* v. *Palo Alto Research Center LLC*, IPR2021-01294 of U.S. Pat. No. 8,489,599; and *Twitter Inc.* v. *Palo Alto Research Center LLC*, IPR2021-01458 of U.S. Pat. No. 8,489,599, Paper: 48, 165 pages. (2023).
"Final Written Decision," *Twitter Inc.* v. *Palo Alto Research Center LLC*, IPR2021-01398 of U.S. Pat. No. 7,043,475, Paper: 47, 93 pages. (2023).
"Final Written Decision," *Twitter Inc.* v. *Palo Alto Research Center LLC*, IPR2021-01430 of U.S. Pat. No. 9,208,439, Paper: 53, 62 pages. (2023).
"Final Written Decision," *Facebook Inc.* v. *Palo Alto Research Center LLC*, IPR2021-01434 of U.S. Pat. No. 8,732,584, Paper: 37, 38 pages. (2023).
"Final Written Decision," *Facebook Inc.* v. *Palo Alto Research Center LLC*, IPR2021-01461 of U.S. Pat. No. 9,208,439, Paper: 41, 65 pages. (2023).
"Final Written Decision," *Facebook Inc.* v. *Palo Alto Research Center LLC*, IPR2021-01467 of U.S. Pat. No. 8,606,781, Paper: 37, 46 pages. (2023).
"Final Written Decision," *Facebook Inc.* v. *Palo Alto Research Center LLC*, IPR2021-01472 of U.S. Pat. No. 9,137,190, Paper: 33, 52 pages. (2023).
Adhikari et al., "Unreeling Netflix: Understanding and Improving Multi-CON Movie Delivery," In the Proceedings of IEEE INFOCOM 2012 (2012), 9 pages.
Adhikari et al., "Vivisecting Youtube: An Active Measurement Study," In INFOCOM12 Mini-conference (2012), 14 pages.
Afanasyev et al. "Interest flooding attack and countermeasures in Named Data Networking." IFIP Networking Conference (2013), 9 pages.
Ahlgren et al., "A Survey of Information-Centric Networking," IEEE Commun. Magazine, pp. 26-36 (2012), 26 pAGES.
Amadeo et al., "Design and Analysis of a Transport-Level Solution for Content-Centric VANETs," University "Mediterranea" of Reggio Calabria, Jun. 15, 2013, 6 pages.
Asatiani et al., "Turning Robotic Process Automation into Commercial Success—Case Opuscapita," Teaching Case, pp. 1-18, 2016.
Ateniese et al., "Improved Proxy Re-Encryption Schemes with Applications to Secure Distributed Storage," ACM Transactions on Information and System Security, vol. 9, iss. 1, pp. 1-30 (Feb. 2006), 25 pAGES.
Aumasson et al., "SipHash: a fast short-input PRF," Sep. 18, 2012, 20 pages.
Ballardie et al., "Core Based Trees (CBT)," Proc. ACM SIGCOMM '88, Aug. 1988, 11 pages.
Bari et al., "A survey of naming and routing in information-centric networks," Communications Magazine, IEEE 50.12 (2012): 44-53, 9 pages.
Baugher et al., "Self-Verifying Names for Read-Only Named Data", 2012 IEEE Conference on Computer Communications Workshops (INFOCOM WKSHPS), Mar. 2012, pp. 274-279, 6 pages.
Beben et al., "Content Aware Network based on Virtual Infrastructure," 2012 13th ACIS International Conference on Software Engineering, 6 pages.
Belotti et al., "Activity-Based Serendipitous Recommendations with the Magitti Mobile Leisure Guide," CHI '08: Proceedings of the SIGCHI Conference on Human Factors in Computing Systems, pp. 1157-1166, https://doi.org/10.1145/1357054.1357237 (Apr. 2008), 10 pages.
Bethencourt et al., "Ciphertext-policy attribute-based encryption," in Proc. IEEE Security & Privacy 2007, Berkeley, CA, USA, pp. 321-334 (May 2007), 15 pages.
Biradar et al., "Review of multicast routing mechanisms in mobile ad hoc networks," Aug. 16, Journal of Network and Computer Applications 35, pp. 221-229 (2012), 19 pages.
Blaze et al., "Divertible Protocols and Atomic Proxy Cryptography," EUROCRYPT 1998: Advances in Cryptology—EUROCRYPT'98, pp. 127-144 (1998), 18 pages.
Boneh et al., "Collusion Resistant Broadcast Encryption With Short Ciphertexts and Private Keys," CRYPTO 2005: Advances in Cryptology—CRYPTO 2005, pp. 258-275 (2005), 19 pages.
Boneh et al., "Hierarchical Identity Based Encryption with Constant Size Ciphertext," from Advances in Cryptology—EUROCRYPT 2005, vol. 3493 LNCS, pp. 440-456, (2005), 29 pages.
Boneh et al., "Identity-Based Encryption from the Weil Pairing," Advances in Cryptology—CRYPTO 2001, vol. 2139, Springer Berlin Heidelberg (2001), 31 pages.
Brambley, M., "A novel, low-cost, reduced-sensor approach for providing smart remote monitoring and diagnostics for packaged air conditioners and heat pumps," Pacific Northwest National Laboratory (2009), 19 pages.
Broder et al., "Multilevel Adaptive Hashing," SODA '90: Proceedings of the First Annual ACM-SIAM Symposium on Discrete Algorithms, pp. 43-53 (Jan. 1990), 11 pages.
Carzaniga et al., "A routing scheme for content-based networking," INFOCOM 2004, 23rd Annual Joint Conference of the IEEE Computer and Communications Societies, vol. 2 (2004), 18 pages.
"CCNx Technical Documentation Index," as retrieved from URL: http://ccnx.org/releases/latest/doc/technical/ (Apr. 24, 2015), 2 pages.
"CCNx-Trace," Screen Capture retrieved from URL: https://code.google.com/p/ccnx-trace/ (Project Created 2012), 1 page.
Cherven, K., "Mastering Gephi Network Realization," [Excerpt] Mastering Gephi Network Realization, Packt Publishing (Jan. 2015), 50 pages.
Cho et al., "A survey on trust management for mobile ad hoc networks," Communications Surveys & Tutorials, IEEE 13.4: 562-583 (2011), 22 pages.
Chow et al., "Efficient Unidirectional Proxy Re- Encryption," Progress in Cryptology, AFRICACRYPT 2010, Springer Berlin Heidelberg (2010), 17 pages.
Compagno et al., "Poseidon: Mitigating interest flooding DDoS attacks in named data networking," 38th Conference on Local Computer Networks (LCN), (2013), 9 pages.
Conner et al., "A trust management framework for service-oriented environments," Proceedings of the 18th International Conference on World Wide Web, ACM (2009), 10 pages.
"Content Delivery Network", Wikipedia, Dec. 10, 2011, http://en.wikipedia.org/w/index.php?title=Content_delivery_network&oldid=465077460, 2 pages.
Dabirmoghaddam et al., "Understanding optimal caching and opportunistic caching at the edge of information-centric networks," Proceedings of the 1st International Conference on Information-Centric Networking, ACM (2014), 10 pages.
Data J Lab, "Gelphi Tutorial: Visualizing Facebook Network," YouTube Sep. 30, 2013, [online] Retrieved from URL: https://www.youtube.com/watch?v=kbLFMObmLNQ (2013), 4 pages.
Deering et al., "Multicast Routing in Internetworks and Extended LANs," Proc. ACM SIGCOMM '88 (Aug. 1988), 10 pages.
Deering et al., "The PIM architecture for wide-area multicast routing," IEEE/ ACM Trans. on Networking, vol. 4, No. 2 (Apr. 1996), 11 pages.
Dely et al., "OpenFlow for Wireless Mesh Networks," Proceedings of 20th International Conference on Computer Communications and Networks, IEEE (Jul. 31, 2011), 6 pages.
Deng et al., "Chosen-Ciphertext Secure Proxy Re-Encryption without Pairings," CANS, Spring Lecture Notes in Computer Science, vol. 5339 (2008), 17 pages.
Despotify, "The Despotify Project," [online] Retrieved from URL: http://despotify.sourceforge.net/ (2012), 2 pages.
Detti et al., "CONET: a content centric inter-networking architecture," Proceedings of the ACM SIGCOMM Workshop on Information-Centric Networking, ACM (2011), 6 pages.
Detti et al., "Supporting the Web with an information centric network that routes by name", Computer Networks, vol. 56, pp. 3705-3702 (Aug. 2012), 48 pages.
Dierks, T., "The transport layer security (TLS) protocol version 1.2," IETF RFC 5246 (2008), 104 pages.

(56) References Cited

OTHER PUBLICATIONS

"Digital Signature," archived on Aug. 31, 2009 at http://web.archive.org/web/20090831170721/http://en.wikipedia.org/wiki/Digital_signature, 7 pages.
Dijkstra et al., "Termination detection for diffusing computations," Information Processing Letters, 11.1: 1-4 (1980), 4 pages.
Dijkstra et al., "Derivation of a Termination Detection Algorithm for Distributed Computations," Information Processing Letter, vol. 16, No. 5 (1983), 3 pages.
Dijkstra et al., "Derivation of a termination detection algorithm for distributed computations," Control Flow and Data Flow: Concepts of Distributed Programming, Springer Berlin Heidelberg, pp. 507-512 (1986), 8 pages.
Eivazi et al., "Predicting Problem-Solving Behavior and Performance Levels from Visual Attention Data," 2nd Workshop on Eye Gaze in Intelligent Human Machine Interaction, pp. 9-16 (Feb. 13, 2012), 8 pages.
Fall et al., "DTN: an architectural retrospective," IEEE Journal on Selected Areas in Communications, vol. 28, No. 5, pp. 828-835 (Jun. 2008), 9 pages.
Fayazbakhsh et al., "Less pain, most of the gain: Incrementally deployable ICN," In ACM SIGCOMM Computer Communication Review, vol. 43, No. 4, pp. 147-158, ACM (Aug. 2013), 12 pages.
Fleseriu, G., "C++ Tutorial: A Beginner's Guide to std::vector, Part 1," [Online] Retrieved from URL: https://www.codeguru.com/cpp/cpp/cpp mfc/stl/article. php/c4027 /C-Tutorial-A-Beginners-Guide-to-stdvector-Part-1 .htm on Sep. 18, 2018, (Feb. 2003) 36 pages.
"The FP7 4WARD project," http://www.4ward-project.eu/. downloaded Mar. 11, 2015, 3 pages.
Garcia et al., "A resilient condition assessment monitoring system," 5th International Symposium on Resilient Control Systems (ISRCS), IEEE, (2012), 9 pages.
Garnepudi et al., "Proactive, reactive and hybrid multicast routing protocols for Wireless Mesh Networks," 2013 IEEE International Conference on Computational Intelligence and Computing Research, Enathi, India, pp. 1-7, DOI: 10.1109/ICCIC.2013.6724255 (2013), 7 pages.
Gasti et al., "DoS & DDoS in Named Data Networking," 2013 22nd International Conference on Computer Communication and Networks (ICCCN), Nassau, Bahamas, pp. 1-7, DOI: 10.1109/ICCCN.2013.6614127 (2013), 7 pages.
Gentry et al., "Hierarchical ID-Based Cryptography," Advances in Cryptology—ASIACRYPT 2002, LNCS 2501, pp. 548-566 (2002), 19 pages.
Getoor et al., "Chapter 5: Probabilistic Relational Models," in Introduction to Statistical Relational Learning, MIT Press (2007), 46 pages.
GFC LearnFree, [online] Retrieved from URL: www.gfclearnfree.org/windowsxp/working-with-windows-explorer/1/ (2018), 7 pages.
Ghali et al., "Needle in a Haystack: Mitigating Content Poisoning in Named-Data Networking," NDSS'14: Proceedings of NDSS Workshop on Security of Emerging Networking Technologies (SENT), pp. 1-10 (2014), 10 pages.
Ghodsi et al., "Information-centric networking: seeing the forest for the trees," HotNets-X: Proceedings of the 10th ACM Workshop on Hot Topics in Networks, Article No. 1, pp. 1-6, DOI: 10.1145/2070562.2070563 (Nov. 2011), 6 pages.
Ghodsi et al., "Naming in content-oriented architectures," SIGCOMM ICN'11: Proceedings of the ACM SIGCOMM workshop on Information-Centric Networking, Toronto, Ontario, CA, pp. 1-6 (Aug. 19, 2011), 9 pages.
Ghosh et al., "Automatic Routing Using Multiple Prefix Labels," IEEE Ad Hoc and Sensor Networking Symposium (2012), 6 pages.
Garcia-Luna-Aceves, J., "Name-Based Content Routing in Information Centric Networks Using Distance Information," ACM-ICN '14: Proceedings of the 1st ACM Conference on Information-Centric Networking, pp. 7-16, DOI: 10.1145/2660129.2660141 (Sep. 2014), 10 pages.
Garcia-Luna-Aceves, J., "A unified approach to loop-free routing using distance vectors or link states," ACM SIGCOMM Computer Communication Review, vol. 19, No. 4, ACM (1989), 12 pages.
Gopal et al., "Integrating content-based Mechanisms with hierarchical File systems," OSDI '99: Proceedings of the Third Symposium on Operating Systems Design and Implementation, pp. 265-278, (Feb. 1999), 15 pages.
Goyal et al., "Attribute-based encryption for fine- grained access control of encrypted data," CCS '06: Proceedings of the 13th ACM conference on Computer and Communications Security, pp. 89-98, DOI: 10.1145/1180405.1180418 (Oct. 2006), 28 pages.
Green et al, "Identity-based proxy re-encryption," in Proc. ACNS 2007, LNCS 4521, pp. 288-306, Zhuhai, China (Jun. 2007), 21 pages.
Gritter et al., "An Architecture for content routing support in the Internet," Proceedings of 3rd USENIX Symposium on Internet Technologies and Systems, pp. 37-48 (2001), 12 pages.
Guo et al., "Collaborative Forwarding and Caching in Content Centric Networks," Networking 2012, Lecture Notes in Computer Science, vol. 7289, Springer, Berlin, Heidelberg, DOI: 10.1007/978-3-642-30045-5_4 (2012), 15 pages.
Gupta et al., "Efficient Routing for Peer-to-Peer Overlays," NSDI'04: Proceedings of the 1st Conference on Symposium on Networked Systems Design and Implementation, vol. 1 (Mar. 2004), 14 pages.
Harley, A., "Slider Design: Rules of Thumb," Nielsen Norman Group, [online] Retrieved from URL: www.nngroup.com/articles/gui-slider-controls/ (Sep. 2015), 3 pages.
Hastie et al., "Automatic Evaluation: Using a DATE Dialogue Act Tagger for User Satisfaction and Task Completion," Proc. Lang. Resources Eval. Conf., pp. 1-8 (2002), 8 pages.
Heckerman et al., "Decision-Theoretic Troubleshooting," Communications of the ACM, vol. 38, No. 3 (Mar. 1995), 15 pages.
Heinemeier et al., "Uncertainties in Achieving Energy Savings from HVAC Maintenance Measures in the Field," ASHRAE Transactions, vol. 118, pt. 2 (Jun. 2012), 8 pages.
Herlich et al., "Optimizing Energy Efficiency for Bulk Transfer Networks," [online] Retrieved from URL: http://www.cs.uni-paderborn.de/fileadmin/informationik/ag-karl/publications/miscellaneous/optimizing.pdf on Mar. 9, 2012 (Apr. 2010), 3 pages.
Hoque et al., "NLSR: Named-data Link State Routing Protocol," ICN '13: Proceedings of the 3rd ACM SIGCOMM Workshop on Information-Centric Networking, Hong Kong, CN, pp. 15-20 (Aug. 2013), 6 pages.
Hur et al., "Attribute-based access control with efficient revocation in data outsourcing systems," IEEE Transactions on Parallel and Distributed Systems, vol. 22, No. 7, pp. 1214-1221, DOI: 10.1109/TPDS.2010.203 (Jul. 2011), 8 pages.
Hur, J., "Improving security and efficiency in attribute-based data sharing," IEEE Transactions on Knowledge and Data Engineering, vol. 25, No. 10, pp. 2271-2282, DOI: 10.1109/TKDE.2011.78 (Oct. 2013), 12 pages.
Intanagonwiwat et al., "Directed Diffusion: A Scalable and Robust Communication Paradigm For Sensor Networks," Proceedings of the 6th Annual International Conference on Mobile Computing and Networking, ACM (2000), 12 pages.
"Introducing JSON," http://www.json.org/. downloaded Mar. 11, 2015, 9 pages.
Ion et al., "Toward content-centric privacy in ICN: Attribute-based encryption and routing," SIGCOMM '13: Proceedings of the ACM SIGCOMM 2013 Conference on SIGCOMM, pp. 513-514, DOI: 10.1145/2486001.2491717 (Aug. 2013), 2 pages.
Ishiyama et al., "On the Effectiveness of Diffusive Content Caching in Content-Centric Networking", 2012 9th Asia-Pacific Symposium on Information and Telecommunication Technologies (APSITT), Santiago and Valparaiso, Chile, pp. 1-5 (2012).
Jacobson et al., "Content-Centric Networking, Whitepaper Describing Future Assurable Global Networks," Palo Alto Research Center, Inc. (PARC), pp. 1-9 (Jan. 2007), 10 pages.
Jacobson et al., "Custodian-Based Information Sharing," IEEE Communications Magazine, vol. 50, No. 7, pp. 38-43, DOI:10.1109/MCOM.2012.6231277 (Jul. 2012), 6 pages.
Jacobson et al., "Networking Named Content," CoNEXT '09: Proceedings of the 5th International Conference on Emerging

(56) References Cited

OTHER PUBLICATIONS

Networking Experiments and Technologies, pp. 1-12, DOI: 10.1145/1658939.1658941 (Dec. 2009), 12 pages.
Jacobson et al., "VoCCN: Voice Over Content-Centric Networks," ReArch'09, Rome, Italy, ACM (Dec. 2009), 6 pages.
Jahid et al., "EASiER: Encryption-based access control in social network with efficient revocation," ASIACCS '11: Proceedings of the 6th ACM Symposium on Information, Computer and Communications Security, pp. 411-415, DOI: 10.1145/1966913.1966970 (Mar. 2011), 5 pages.
Javaid, N., "Analysis and design of quality link metrics for routing protocols in Wireless Networks", PhD Thesis Defense, Universete Paris-Est. (Dec. 15, 2010), 146 pages.
Ji et al., "Prognostics enabled resilient control for model-based building automation systems," Proceedings of Building Simulation 2011: Proceedings of the 12th Conference of International Building Performance Simulation Association, Sydney, AU, pp. 286-293 (Nov. 2011), 8 pages.
Kamara et al., "Cryptographic cloud storage, Financial Cryptography and Data Security," FC 2010, Lecture Notes in Computer Science, vol. 6054, pp. 136-149, Springer, Berlin, Heidelberg, DOI: 10.1007/978-3-642-14992-4_13 (2010), 14 pages.
Katipamula et al., "Review Article: Methods for Fault Detection, Diagnostics, and Prognostics for Building Systems—A Review, Part I," HVAC&R Research, 11:1, pp. 3-25, DOI: 10.1080/10789669.2005.10391123 (2005), 23 pages.
Katipamula et al., "Review Article: Methods for Fault Detection, Diagnostics, and Prognostics for Building Systems—A Review, Part II," HVAC&R Research 11:2, pp. 169-187 (2005), 19 pages.
Kaya et al., "A Low Power Lookup Technique for Multi-Hashing Network Applications," IEEE Computer Society Annual Symposium on Emerging VLSI Technologies and Architectures (ISVLSI'06), Karlsruhe, Germany, DOI: 10.1109/ISVLSI.2006.3 (2006), 6 pages.
Keranen et al., "Interactive Connectivity Establishment (ICE): A Protocol for Network Address Translator (NAT) Traversal for Offer/Answer Protocols," IETF (2013), 118 pages.
Koponen et al., "A Data-Oriented (and Beyond) Network Architecture," SIGCOMM '07: Proceedings of the 2007 Conference on Applications, Technologies, Architectures, and Protocols for Computer Communications, Kyoto, Japan, ACM, pp. 181-192, DOI:10.1145/1282380.1282402 (Aug. 27-31, 2007), 12 pages.
Kulkarni et al., "Implementation of a prototype active network," 1998 IEEE Open Architectures and Network Programming, San Francisco, CA, USA, pp. 130-142, DOI: 10.1109/OPNARC.1998.662049 (1998), 14 pages.
Kumar et al., "Peacock Hashing: Deterministic and Updatable Hashing for High Performance Networking," IEEE INFOCOM 2008—The 27th Conference on Computer Communications, Phoenix, AZ, USA, pp. 101-105, DOI: 10.1109/INFOCOM.2008.29 (2008), 9 pages.
Lee et al., "On-demand Multicast Routing Protocol in Multihop Wireless Mobile Networks," Mobile Networks and Applications, vol. 7, No. 6, pp. 441-453 (2002), 13 pages.
Liang et al., "A Ciphertext-policy attribute-based proxy re-encryption with chosen-ciphertext security," 2013 5th International Conference on Intelligent Networking and Collaborative Systems, Xi'an, CN, pp. 552-559, DOI: 10.1109/INCoS.2013.103 (2013), 21 pages.
Li et al., "Coping with node misbehaviors in ad hoc networks: A multi-dimensional trust management approach," 2010 Eleventh International Conference on Mobile Data Management, Kansas City, MO, USA, pp. 85-94, DOI:10.1109/MDM.2010.57 (2010), 10 pages.
Liu et al., "A TLV-Structured Data Naming Scheme for Content-Oriented Networking," IEEE International Conference on Communications (ICC), Ottawa, ON, Canada, 2012, pp. 5822-5827, DOI: 10.1109/ICC.2012.6364710 (2012), 6 pages.
Lopez et al., "Trust management systems for wireless sensor networks: Best practices," Computer Communications, vol. 33(9), pp. 1086-1093, DOI: 10.1016.j.comcom.2010.02.006 (Jun. 2010), 23 pages.
Lotspiech et al., "Anonymous Trust: Digital Rights Management Using Broadcast Encryption," Proc. IEEE, vol. 92, No. 6, pp. 898-909 (2004), 12 pages.
Mahadevan et al., "CCN-krs: A key resolution service for con," ACM-ICN '14: Proceedings of the 1st ACM Conference on Information-Centric Networking, pp. 97-106, DOI: 10.1145/2660129.2660154 (Sep. 2014).
Mahadevan et al., "Orbis: rescaling degree correlations to generate annotated internet topologies," ACM SIGCOMM Computer Communication Review, vol. 37, iss. 4, pp. 325-336, DOI: 10.1145/1282427.1282417 (Oct. 2007).
Mahadevan et al., "Systematic topology analysis and generation using degree correlations," ACM SIGCOMM Computer Communication Review, vol. 36, iss. 4, pp. 135-146, DOI: 10.1145/1151659.1159930 (Oct. 2006).
Matocha et al., "A taxonomy of distributed termination detection algorithms," Journal of Systems and Software 43(3): 207-221 (1998), 15 pages.
McWilliams et al., "Home Energy Article: A Systems Approach to Retrofitting Residential HVAC Systems," Technical Report, Lawrence Berkeley National Laboratory, LBNL-57406, DOI: 10.2172/887199 (2005), 11 pages.
Merindol et al., "An efficient algorithm to enable path diversity in link state routing networks," Computer Networks, vol. 55, iss. 5, pp. 1132-1140 (Apr. 2011), 18 pages.
"Microsoft PlayReady," http://www.microsoft.com/playready/. downloaded Mar. 11, 2015, 1 page.
Misra et al., "Secure content delivery in information-centric networks: Design, implementation, and analyses," in Proc. ACM SIGCOMM ICN 2013, Hong Kong, China, pp. 73-78 (Aug. 2013), 6 pages.
Mobility First—Mobility First Project [online] Retrieved from URL: http://mobilityfirst.winlab.rutgers.edu/ on Mar. 9, 2015, 2 pages.
Moldovan, "Streaming Rows of SQL Server Data to a Table Valued Parameter Using a SQLDataReader," MSSQLTips.com, (Mar. 2011) URL: https://www.mssqltips.com/sqlservertip/2338/streaming-rows-of-sql-server-data-to-a-table-valued-parameter-using-a-sqldatareader/ (2011), 7 pages.
Naor et al., "Efficient trace and revoke schemes," In: Frankel, Y. (eds) Financial Cryptography, FC 2000, Lecture Notes in Computer Science, vol. 1962, Springer, Berlin, Heidelberg, DOI: 10.1007/3-540-45472-1_1 (2001), 20 pages.
Narasimhan et al., "HyDE—A General Framework for Stochastic and Hybrid Model-based Diagnosis," Proc. DX 7, pp. 162-169 (2007), 8 pages.
Named Data Networking—NDN Project [online] Retrieved from URL: http://www.named-data.net/ on Mar. 9, 2015, 7 pages.
Nystrom et al., "PKCS#12: Personal information exchange syntax v. 1.1," IETF RFC 7292, K. Moriarty, Ed., DOI: 10.17487/RFC7292 (Jul. 2014), 29 pages.
Omar et al., "Certification-based trust models in mobile ad hoc networks: A survey and taxonomy," Journal of Network and Computer Applications 35(1): 268-286 (Jan. 2012), 60 pages.
Parmar, H. (ed.) RTMP (2009). [online] Retrieved from URL: http://wwwimages.adobe.com/www.adobe.com/content/dam/Adobe/en/devnet/rtmp/pdf/rtmp specification 1.0.pdf (2012), 52 pages.
Parsa et al., "A Protocol for Scalable Loop-free Multicast Routing," IEEE Journal on Selected Areas in Communications, vol. 15, No. 3, pp. 316-331, DOI: 10.1109/49.564131 (Apr. 1997), 30 pages.
"PBC Library-Pairing-Based Cryptography-About," http://crypto.stanford.edu/pbc. downloaded Apr. 27, 2015, 2 pages.
Project CCNx—Content Centric Networking Project (CCN) [online] Retrieved from URL: http://ccnx.org/releases/latest/ doc/technical/ on Mar. 9, 2015, 5 pages.
Psaras et al., "Modelling and evaluation of CCN-caching trees," Networking 2011, Lecture Notes in Computer Science, vol. 6640, Springer, Berlin, Heidelberg, DOI: 10.1007/978-3-642-20757-0_7 pp. 78-91 (May 2011), 14 pages.

(56) References Cited

OTHER PUBLICATIONS

"Pursuing a pub/sub internet (PURSUIT)," http://www.fp7-pursuit.ew/PursuitWeb/. downloaded Mar. 11, 2015, 1 page.
Ratwani et al., "A Real-Time Eye Tracking System for Predicting and Preventing Postcompletion Errors," Human-Computer Interaction, vol. 26, pp. 205-245 (2011), 42 pages.
Rello et al., "Detecting Readers with Dyslexia Using Machine Learning with Eye Tracking Measures," May 18-20, 2015; W4A'15—Proceedings of the 112th Web For All Conference (2015), 8 pages.
Rescorla et al., "Datagram transport layer security," IETF RFC 4347, (Apr. 2006), 25 pages.
Ricci et al., "Acquiring and Revising Preferences in a Critique-Based Mobile Recommender System," in IEEE Intelligent Systems, vol. 22, No. 3, pp. 22-29, DOI: 10.1109/MIS.2007.43 (May-Jun. 2007), 8 pages.
Rodriguez et al., "The Graph Traversal Pattern," Graph Data Management, pp. 29-46, DOI:10.4018/978-1-61350-053-8.ch002 (2010), 18 pages.
Rosenberg, J. "Interactive Connectivity Establishment (ICE): A Protocol for Network Address Translator (NAT) Traversal for Offer/Answer Protocols," Internet Engineering Task Force (IETF), RFC: 5245, Retrieved from URL: https://www.rfc-editor.org/rfc/rfc5245 (Apr. 2010), 117 pages.
Rossi et al., "Parallel Maximum Clique Algorithms with Applications to Network Analysis and Storage," Dec. 26, 2013, pp. 1-11 (2013), 28 pages.
Rossi et al., "Scalable Relational Learning for Large Heterogenous Networks," 2015, pp. 1-10 (2015), 10 pages.
Rossi et al., "Transforming Graph Data for Statistical Relational Learning," Journal of Artificial Intelligence Research vol. 45(1), pp. 363-441 (2012), 79 pages.
SAIL Project, "Scalable and Adaptive Internet Solutions (SAIL) Project," [online] Retrieved from URL: http://sail-project.eu/ on Mar. 9, 2015, 5 pages.
Sandvine, "Global Internet Phenomena Report—Spring 2012," [online] Retrieved from URL: https://www.sandvine.com/hubfs/Sandvine_Redesign_2019/Downloads/Internet%20Phenomena/2012-1h-global-internet-phenomena-report.pdf (2012), 36 pages.
Schein et al., "A Simulation Study of a Hierarchical, Rule-Based Method for System-Level Fault Detection and Diagnostics in HVAC Systems," NIST Interagency/Internal Report (NISTIR), National Institute of Standards and Technology, Gaithersburg, MD, [online], (NISTIR-7216), 23 pgs., URL: https://tsapps.nist.gov/publication/get_pdf.cfm?pub_id=860972 (Apr. 2005), 23 pages.
Schiller et al., "Location-Based Services," The Morgan Kaufmann Series in Data Management Systems, Morgan Kaufmann Publishers / Elsevier, DOI: 10.1016/B978-1-55860-929-7.X5000-6 (2004), 266 pages.
Shani et al., "A survey of point-based POMDP solvers," Autonomous Agents and Multi-Agent Systems, vol. 27, pp. 1-51 (2013), 51 pages.
Shao et al., "CCA-Secure Proxy Re-Encryption without Pairings," Public Key Cryptography—PKC 2009, Lecture Notes in Computer Science, vol. 5443, 20 pgs., Springer, Berlin, Heidelberg, DOI: 10.1007/978-3-642-00468-1_20 (2009), 22 pages.
Sheppard et al., "A formal analysis of fault diagnosis with d-matrices," Journal of Electronic Testing 23(4): 309-322 (2007), 14 pages.
Shih et al., "Wake on Wireless: An Event Driven Energy Saving Strategy for Battery Operated Devices," MobiCom '02: Proceedings of the 8th Annual International Conference on Mobile Computing and Networking, pp. 160-171 (Sep. 2002), 12 pages.
Shneyderman et al., "Mobile VPN: Delivering Advanced Services in Next Generation Wireless Systems," [Excerpt] (Jan. 2003), 30 pages.
Siddheswar Ray and Rose H Turi. "Determination of Number of Clusters in K-Means Clustering and Application in Colour Image Segmentation" 1999 [online] Retrieved from URL: http://citeseerx.ist.psu.edu/viewdoc/download?doi=10.1.1.587.3517&rep=rep1&type=pdf on Apr. 28, 2017, 7 pages.
Smetters et al., "CCNx Access Control Specifications," PARC, Tech. Rep., (Jul. 30, 2010), 37 pages.
Soh et al., "Efficient Prefix Updates for IP Router Using Lexicographic Ordering and Updateable Address Set," IEEE Transactions on Computers, vol. 57, No. 1, pp. 110-125, DOI: 10.1109/TC.2007.70776 (Jan. 2008), 16 pages.
Solis et al., "Robust content dissemination in disrupted environments," CHANTS '08: Proceedings of the third ACM workshop on Challenged networks, pp. 3-10, DOI: 10.1145/1409985.1409988 (Sep. 2008), 8 pages.
Soulie, J., "Variables. Data Types," Cplusplus.com Apr. 20, 2009 verified by wayback machine [online] Retrieved from URL: https://web.archive.org/web/20090420124459/http://www.cplusplus.com/doc/tutorial/variables/ on Feb. 6, 2018, 5 pages.
Su et al., "Drafting Behind Akamai: Inferring Network Conditions Based on CDN Redirections," IEEE/ACM Transactions on Networking, vol. 17, iss. 6, pp. 1752-1765 (Dec. 2009), 14 pages.
Sun et al., "A framework for model-based repair," AAAI'93: Proceedings of the eleventh national conference on Artificial intelligence, pp. 182-187 (Jul. 1993), 6 pages.
Takeuchi et al., "CityVoyager: An Outdoor Recommendation System Based on User Location History," Ubiquitous Intelligence and Computing Lecture Notes in Computer Science; LNCS, Springer, Berlin, DE, vol. 4159, (Jan. 1, 2006), pp. 625-636, 12 pages.
Techopedia, "Database Management Systems (DBMS)," (Jul. 23, 2011) Retrieved from URL: https://web.archive.org/web/20110723213424/https://www.techopedia.com/definition/24361/database-management-systems-dbms (2011), 3 pages.
Trossen et al., "Designing and realizing and information-centric internet," IEEE Communications Magazine, vol. 50, No. 7, pp. 60-67, DOI: 10.1109/MCOM.2012.6231280 (Jul. 2012), 8 pages.
Tyson et al., "A trace-driven analysis of caching in content-centric networks," 2012 21st International Conference on Computer Communications and Networks (ICCCN), Munich, Germany, pp. 1-7, DOI: 10.1109/ICCCN.2012.6289181 (2012), 7 pages.
Tzeng et al., "A public-key traitor tracing scheme with revocation using dynamic shares," In: Kim, K. (eds) Public Key Cryptography, PKC 2001, Lecture Notes in Computer Science, vol. 1992, pp. 207-224, Springer, Berlin, Heidelberg, DOI:10.1007/3-540-44586-2_16 (2001), 18 pages.
Varvello et al., "Caesar: A Content Router for High-Speed Forwarding," ICN'12, Second Edition on Information-Centric Networking, New York, (Aug. 2012), 6 pages.
Verma et al., "Probabilistic models for monitoring and fault diagnosis," The Second IARP and IEEE/RAS Joint Workshop on Technical Challenges for Dependable Robots in Human Environments, Raja Chatila (ed.) (Oct. 2002), 10 pages.
Vo et al., "Towards Context-Aware Task Recommendation," 2009 Joint Conferences on Pervasive Computing (JCPC); DOI:10.1109/jgpg.2009.5420173 (2009), 4 pages.
Vutukury et al., "A simple approximation to minimum-delay routing," ACM SIGCOMM Computer Communication Review, vol. 29, iss. 4, pp. 227-238, DOI:10.1145/316194.316227 (Oct. 1999), 8 pages.
Waldvogel, M., "Fast Longest Prefix Matching: Algorithms, Analysis, and Applications," A dissertation submitted to the Swiss Federal Institute of Technology Zurich (2002), 174 pages.
Walfish et al., "Untangling the web from DNS," Conference: 1st Symposium on Networked Systems Design and Implementation (NSDI 2004), Mar. 29-31, 2004, San Francisco, California, USA, 14 pages.
Walker, I., "Best practices guide for residential HVAC Retrofits," Lawrence Berkeley National Lab. (LBNL), No. LBNL-53592, 31 pgs., Berkeley, CA (US) (Aug. 2003), 31 pages.
Wang et al., "DMND: Collecting Data from Mobiles Using Named Data," 2010 IEEE Vehicular Networking Conference, Jersey City, NJ, USA, pp. 49-56, DOI: 10.1109/VNC.2010.5698270 (2010), 8 pages.
Wang et al., "Hierarchical attribute-based encryption for fine-grained access control in cloud storage services," CCS'10: Proc. Of the 17th ACM Conference on Computer and Communications Security, pp. 735-737, DOI: 10.1145/1866307.1866414 (Oct. 2010), 3 pages.

(56) References Cited

OTHER PUBLICATIONS

Wang et al., "OSPFN: An OSPF Based Routing Protocol for Named Data Networking," NDN Technical Report NDN-0003, (2012), 15 pages.
Wetherall, D., "Active Network vision and reality: Lessons form a capsule-based system," 17th Symposium on Operating Systems Principles, pp. 64-79 (Dec. 1999), 16 pages.
Wolman et al., "On the scale and performance of cooperative web proxy caching," ACM SIGHOPS Operating Systems Review, vol. 33, No. 5, pp. 16-31, (Dec. 1999), 16 pages.
Wood, B., "Content Mediator Architecture for Content-aware Networks (COMET) Project," [online] Retrieved from URL: http://www.comet-project.org/ on Mar. 9, 2015, 1 page.
Wood et al., "Flexible end-to-end content security in CCN," 2014 IEEE 11th Consumer Communications and Networking Conference (CCNC), Las Vegas, NV, USA, 2014, pp. 858-865, DOI: 10.1109/CCNC.2014.6940528, 8 pages.
Xiong et al., "CloudSeal: End-to-End Content Protection in Cloud-based Storage and Delivery Services," In: Rajarajan et al. (eds) Security and Privacy in Communication Networks, SecureComm 2011, Lecture Notes of the Institute for Computer Sciences, Social Informatics and Telecommunications Engineering, vol. 96, Springer, Berlin, Heidelberg, DOI: 10.1007/978-3-642-31909-9_30 (2012), 10 pages.
Xylomenos et al., "A survey of information-centric networking research," IEEE Communications Surveys & Tutorials, vol. 16, No. 2, pp. 1024-1049, Second Quarter 2014, DOI: 10.1109/SURV.2013.070813.00063 (Jul. 2013), 26 pages.
Yu et al., "Achieving secure, scalable, and fine-grained data access control in cloud computing," 2010 Proceedings IEEE Infocom, San Diego, CA, USA, pp. 1-9 (2010), 9 pages.
Yi et al., "Adaptive forwarding in named data networking," ACM SIGCOMM Computer Communication Review, vol. 42, iss. 3, pp. 62-67 (2012), 6 pages.
Yi et al., "On the Role of Routing in Named Data Networking," NDN Technical Report NEN-0016 (2013), 10 pages.
Yi et al., "A case for stateful forwarding plane," Computer Communications, vol. 36, iss. 7, pp. 779-791 (2013), 14 pages.
Zahariadis et al., "Trust management in wireless sensor networks," European Transactions on Telecommunications, 21(4), pp. 386-395, DOI: 10.1002/ett.1413 (2010), 10 pages.
Zhang et al., "Named data networking," ACM SIGCOMM Computer Communication Review, vol. 44, iss. 3, pp. 66-73 (2014), 8 pages.
Zhang, et al., "Named Data Networking (NDN) Project", http://www.parc.com/publication/ 2709/named-data-networking-ndn-project.html, NDN-0001, PARC Tech Report (Oct. 2010), 26 pages.
Zhou et al., "Achieving secure role-based access control on encrypted data in cloud storage," IEEE Transactions on Information Forensics and Security, vol. 8, No. 12, pp. 1947-1960 (Dec. 2013), 14 pages.
Zhuang et al., "Managing Ad Hoc Networks of Smartphones," International Journal of Information and Education Technology, vol. 3, No. 5, (Oct. 2013), 7 pages.
Gephi 0.9.1 Release (Feb. 14, 2016), Github, URL:https://github.com/gephi/gephi/releases/tag/v0.9.1 (Year: 2016), 4 pages.
Gephi requirements, Dec. 8, 2015, Gephi.org, URL: https://web.archive.org/web/20151208052328/http://gephi.org:80/users/requirements/ (Year: 2015), 1 page.
Screenshots from Gephi 0.9.1 (May 9, 2023), 5 pages.
Heymann, S., "Gephi blog: GSoC mid-term: new visualization in API," Wordpress.com, URL: https://gephi.wordpress.com/2011/08/12gsoc-mid-term-new-visualization-api/ (Year: 2011), 6 pages.
Expert Declaration of Don Turnbull PhD for U.S. Pat. No. 7,043,475, pp. 1-439, 2021.
"Advisory Opinion re: Petition No. S050314A," New York State Department of Taxation and Finance, Office of Tax Policy Analysis Taxpayer Guidance Division, retrieved from URL: https://www.tax.ny.gov/pdf/ advisory_opinions/sales/a08_28s.pdf, pp. 1-6, 2008.
"Alcatel-Lucent, 1020 Placecast partner on location-based mobile advertising," Marketing Dive, retrieved from URL: https://www.marketingdive.com/ex/mobilemarketer/cms/news/advertising/3305.html, pp. 1-4, 2009.
"Apple introduces the New iPhone 3G," Apple Newsroom, retrieved from URL: https://www.apple.com/newsroom/2008/06/09Apple-introduces-the-New-iPhone-3G, pp. 1-4, 2008.
"Bear Group's Experience With DoubleClick," retrieved from URL: https://www.beargroup.com/system-integrations/ad-servers/doubleclick, pp. 1-3, 2002.
"CC/WC/WCP Detailed Specifications," Xerox Corporation, retrieved from URL: https://www.office.xerox.com/latest/W55SS-01.pdf, pp. 1-21, 2006.
"Document Security Xerox CopyCentre/WorkCentre/WorkCentre Pro 232/238/245/255/265/275," Xerox Corporation, retrieved from URL: https://www.office.xerox.com/latest/W7XFS-03U.pdf, pp. 1-4, 2006.
"Doubleclick, Inc. 1999 Form 10-K Annual Report," Securities and Exchange Commission, retrieved from URL: http://media.corporate-ir.net/media_files/NSD/DCLK/reports/10k99.pdf, pp. 1-77, 2007.
"ESRI's Geospatial Computer-Aided Dispatch," An ESRI White Paper, pp. 1-24, 2007.
"Facebook Unveils Facebook Ads," retrieved from URL: www.about.fb.com/news/2007/11/facebook-unveils-facebook-ads, pp. 1-7, 2007.
"Foursquare's 1st Pitch Deck," retrieved from URL: https://www.slideshare.net/alkarmi/foursquare-1stpitch2009, pp. 1-15, 2009.
"Gimbal REST API," Gimbal Inc., retrieved from URL: https://docs.gimbal.com/rest.html, pp. 1-9, 2013.
"In Pictures: All about Foursquare," Forbes, retrieved from URL: https://www.forbes.com/2010/04/07/iphone-mobile-android-technology-data-companies-10-foursquare_slide.html?sh=6a70a35328a2, pp. 1-11, 2010.
"LiveJournal Server Source Code (stale history from before it went closed-source)," GitHub, [added May 3, 2015] retrieved from URL: https://github.com/apparentlymart/livejournal, 3 pgs. (retrieved Jun. 2021).
"Magitti on the move," The Economic Times, English Ed., retrieved from URL: https://economictimes.indiatimes.com/as-you-like-it/magitti-on-the-move/printarticle/2568170.cms, pp. 1-2, 2007.
"New Jersey Division of Criminal Justice's 'Handling a Domestic Violence Call: In-Service Training for Police Dispatchers'" New Jersey Division of Criminal Justice, pp. 1-11, 2003.
"Nike + iPod Exercise," HowStuffWorks, retrieved from URL: https://electronics.howstuffworks.com/gadgets/fitness/nike-ipod.htm, pp. 1-10, 2007.
"Nike + iPod Experience Coming To A Gym Near You," Nike News, retrieved from URL: https://news.nike.com/news/nike-ipod-experience-coming-to-a-gym-near-you, pp. 1-4, 2008.
"Nike+ SportBand User's Guide," retrieved from URL: https://www.manualslib.com/manual/259083/Nike-NikePlus-Sportband.html, pp. 1-32, 2008.
"Project Ringing in the Rain—Overview," MIT Media Lab, retrieved from URL: https://www.media.mit.edu/projects/ringing-in-the-rain/overview, pp. 1-3, 2007.
"Qualcomm Acquires Xiam Technologies Limited, Leading Provider of Wireless Content Discovery and Recommendations Technology," Xiam Technologies, retrieved from URL: https://web.archive.org/web/20080808140641/http://www.xiam.com/press/2008-03-11-QualcommXiam.shtml, pp. 1-2, 2008.
"Quick Reference Guide," retrieved from URL: https://silo.tips/download/quick-reference-guide-21, pp. 1-5, 2009.
"Ringing in the Rain: An Agent Based Weather Warning System," MIT, retrieved from URL: https://alumni.media.mit.edu/~ccchang/RITR/RingingInTheRain.htm, pp. 1-4, 2008.
"Smarter Security Systems for Indian Banks," retrieved from URL: https://www.businesswireindia.com/smarter-security-systems-for-indian-banks-32474.html, pp. 1-3, 2012.
"Sponsor Breakfast Presentation PlaceIQ," retrieved from URL: https://www.slideshare.net/mediapostlive/place-iq-25647368, pp. 1-17, 2012.
"The MyExperience Tool," retrieved from URL: http://www.myexperience.sourceforge.net, pp. 1-5, 2007.

(56) References Cited

OTHER PUBLICATIONS

"UK Carrier O2 Teams with Placecast for LBS Opt-In Marketing to a Million Consumers," Internet 2 Go, retrieved from URL: http://internet2go.net/news/carriers/uk-carrier-02-teams-placecast-lbs-marketing-million-consumers, pp. 1-2, 2010.
"Visa DPS—Debit and ATM Processing: Quick Reference Guide," Visa, 5 pgs. (2012).
"Visa enhances fraud detection service for VisaNet processing platform," The PayPers, retrieved from URL: https://thepaypers.com/cards/visa-enhances-fraud-detection-service-for-visanet-processing-platform--742952, pp. 1-3, 2011.
"Visa Strategy Manager Boosts Issuer Fraud Detection," Visa, retrieved from URL: https://usa.visa.com/about-visa/newsroom/press-releases.releaseld.9101.html, pp. 1-2, 2012.
"Visa Transaction Alerts make North American debut," retrieved from URL: https://www.finextra.com/pressarticle/31025/visa-transaction-alerts-make-north-american-debut, pp. 1-3, 2009.
"Xerox Extensible Interface Platform (EIP)," Xerox Corporation, retrieved from URL: https://www.comdat.ch/ download/pictures/0e/rv3wgtpblgfwvuit5x53eaztpe9at5/eip_your_work_just_got_easier.pdf, pp. 1-4, 2006.
Abraham, "Business Intelligence from Web Usage Mining," Journal of Information & Knowledge Management, vol. 2, No. 4, pp. 375-390, 2003.
Albino, "GPS-tracking apps: Helicopter parenting or smart solution? ," Today's Parent, retrieved from URL: https://www.todaysparent.com/family/gps-tracking-kids, pp. 1-4, 2013.
Armstrong et al., "WebWatcher: A Learning Apprentice for the World Wide Web," 1995 AAAI Spring Symposium on Information Gathering from Heterogenous, Distributed Environments, pp. 1-7, 1995.
Aun, F., "DoubleClick Aims to Give Deeper Insight into Rich Media Effectiveness," Click Z, retrieved from URL: https://www.clickz.com/doubleclick-aims-to-give-deeper-insight-into-rich-media-effectivness/58863, pp. 1-13, 2008.
Balabanovic et al., "FAB: Content-Based, Collaborative Recommendation," Communications of the ACM, vol. 40, No. 3, pp. 66-72, 1997.
Banerjee et al., "Clickstream Clustering using Weighted Longest Common Subsequences," Proceedings of the Web Mining Workshop at the 1st SIAM Conference on Data Mining, pp. 1-8, 2001.
Bausch et al., excerpts from "Flickr Hacks," O'Reilly Media, Inc. (pub.), pp. 1-12, 2006.
Beale et al., "Mobile Context Aware Systems: The Intelligence to Support Tasks and Effectively Utilise Resources," International Conference on Mobile Human-Computer Interaction, pp. 1-12, 2004.
Bellotti et al., "Activity-Based Serendipitous Recommendations with the Magitti Mobile Leisure Guide," CHI 2008 Proceedings, pp. 1157-1166, 2008.
Belqasmi et al., "RESTful Web Services for Service Provisioning in Next-Generation Networks: A Survey," IEEE Communications Magazine, pp. 66-73, 2011.
Ben-Shaul et al., "Adding support for dynamic and focused search with Fetuccino," Elsevier Science B. V. (pub.), pp. 575-587, 1999.
Berendt et al., "Towards Semantic Web Mining," The Semantic Web—ISWC, ISWC 2002 Lecture Notes in Computer Science, pp. 1-15, 2002.
Bharat et al., "Personalized, interactive news on the Web," Multimedia Systems 6, pp. 1-22, 1997.
Bharat et al., "Personalized, interactive news on the Web," Multimedia Systems, vol. 6, No. 5, pp. 349-358, 1998.
Bogers, "Movie Recommendation using Random Walks over the Contextual Graph," Information Systems & Interactive Design; Royal School of Library and Information Science, pp. 1-5, 2010.
Butler, D., "Scientists Get Online News Aggregator," Nature, vol. 453, No. 26 [e! Science News: www.esciencenews.com], pp. 1, 2008.
Callihan, S., excerpts from "Learn HTML In a Weekend," Prima Publishing, [Part 1 of 2, 103 pgs.], 1998.
Callihan, S., excerpts from "Learn HTML In a Weekend," Prima Publishing, [Part 2 of 2, 87 pgs.], 1998.
Carlson, "Eclipse Distilled," Addison-Wesley, pub., pp. 1-12, 2005.
Cetintemel et al., "Self-Adaptive User Profiles for Large Scale Data Delivery," ICDE '00: Proceedings of the 16th International Conference on Data Engineering, pp. 1-12, 2000.
Chakrabarti et al., "Focused crawling: a new approach to topic-specific Web resource discovery," WWW '99 Proceedings of the Eighth International Conference on World Wide Web, pp. 545-562, 1999.
Chang et al., "Mining the World Wide Web: An Information Search Approach," The Kluwer International Series on Information Retreival, pp. 1-179, 2001.
Chen et al., "Multi-Modal Browsing of Images in Web Documents," IS&T/SPIE Conference on Document Recognition and Retrieval VI, vol. 3651, pp. 122-133, 1999.
Chen et al., "WebMate: A Personal Agent for Browsing and Searching," The Robotics Institute Carnegie Mellon University, pp. 1-16, 1997.
Chi et al., "An Operator Interaction Framework for Visualization Systems," Proceedings IEEE Symposium on Information Visualization (Cat. No.98TB100258), DOI: 10.1109/INFVIS.1998.729560, pp. 1-8, 1998.
Chi et al., "LumberJack: Intelligent Discovery and Analysis of Web User Traffic Composition," WEBKDD 2002—Mining Web Data for Discovering Usage Patterns and Profiles Conference, pp. 1-15, 2002.
Chi et al., "Using Information Scent to Model User Information Needs and Actions on the Web," ACM SIGCHI'01, pp. 1-8, 2001.
Chirita et al., "PROS: A Personalized Ranking Platform for Web Search," AH 2004: Adaptive Hypermedia and Adaptive Web-Based Systems, pp. 1-10, 2004.
Coburn, "Gowalla for the iPad: Map Views and Consumption," The Next Web, retrieved from https://thenextweb.com/insider/2010/05/01/gowalla-ipad-map-views-consumption, pp. 1-6, 2010.
Collection of Flickr web pages publicly available on archive.org, pp. 1-69, 2009.
Collins, excerpts from "The Little Book of Twitter," Michael O'Mara Books, pp. 1-5, 2009.
Collection of LiveJournal web pages publicly available on archive.org, (2008). (Pt. 1—171 pgs.).
Collection of LiveJournal web pages publicly available on archive.org, (2008). (Pt. 2—174 pgs.).
Collection of MySpace web pages publicly available on archive.org, pp. 1-32, 2009.
Cooley, R. et al., "Data Preparation for Mining World Wide Web Browsing Patterns," Knowledge and Information Systems 1, DOI:10.1007/BF03325089, pp. 5-32, 1999.
Cooley, R. et al., "Discovery of Interesting Usage Patterns from Web Data," International Workshop on Web Usage Analysis and User Profiling, WebKDD 1999, pp. 1-20, 1999.
Cooley, R. et al., "Web Mining: Information and Pattern Discovery on the World Wide Web," Proceedings Ninth IEEE International Conference on Tools with Artificial Intelligence, DOI:10.1109/TAI.1997.632303, pp. 558-567, 1997.
Cradler, excerpts from "Hacker's Guide to Navigator," Waite Group Press, pp. 1-25, 1997.
Curtiss et al., "Unicorn: A System for Searching the Social Graph," Proc. Of the VLDB Endowment, vol. 6, No. 11, The 39th International Conference on Very Large Data Bases, pp. 1-12, 2013.
Dargie, (ed.), "Context-Aware Computing and Self-Managing Systems," CRC Press, pp. 1-202, 2009.
"Dey et al., ""CybreMinder: A Context-Aware System for Supporting Reminders,"" International Symposium on Handheld and Ubiquitous Computing, HUC 2000: Handheld and Ubiquitous Computing, DOI: 10.1007/3-540-39959-3_13f, pp. 1-15, 2000."
Dickinson, "Why Gay Guys Love Using Grindr To Hook Up And Make Friends," Business Insider, retrieved from URL: https://www.businessinsider.com/why-gay-guys-love-using-grindr-to-hook-up-and-make-friends-2012-1, pp. 1-9, 2012.
Diligenti et al., "Focused Crawling Using Context Graphs," Proceedings of the 26th VLDB Conference, pp. 527-534, 2000.

(56) References Cited

OTHER PUBLICATIONS

Downey, "Minority Report advertising is already here: privacy at CES 2013, Day 1," Abine.com, retrieved from URL: https://www.abine.com/blog/201 3/privacy-at-ces-day-1, pp. 1-4, 2013.
El-Bishouty et al., "PERKAM: Personalized Knowledge Awareness Map for Computer Supported Ubiquitous Learning," Educational Technology & Society, vol. 10, No. 3, pp. 122-134, 2007.
Excerpts from Microsoft Computer Dictionary, 5th ed., pp. 1-14, 2002.
Excerpts from Microsoft Computer Dictionary, 5th ed., pp. 1-15, 2002.
Excerpts from The New Penguin Dictionary of Computing, pp. 1-6, 2001.
Excerpts from The New Penguin Dictionary of Computing, pp. 1-9, 2001.
Excerpts from Webster's New World Dictionary of Computer Terms,7th ed., pp. 1-6, 1999.
Fitton et al., excerpts from "Twitter for Dummies," Wiley Publishing, Inc., pp. 1-27, 2009.
Forrest, "Citysense: Lets You Know What Everybody's Doing," retrieved from URL: https://web.archive.org/web/ 20080701034213/http://radar.oreilly.com/archives/2008/06/citysense-reality-mining-iphone.html, pp. 1-4, 2008.
Freitag et al., "WebWatcher: Knowledge Navigation in the World Wide Web," AAAI Technical Report FS-95-03, pp. 145, 1995.
Froehlich et al., "MyExperience: A System for In situ Tracing and Capturing of User Feedback on Mobile Phones," MobiSys '07: Proceedings of the 5th international conference on Mobile systems, applications and services, DOI:10.1145/1247660.1247670, pp. 57-70, 2007.
Fuhr, "Daffodil (Distributed Agents for User-Friendly Access of Digital Libraries): The Underlying Concepts," Univ. of Duisburg-Essen, PowerPoint presentation, pp. 1-38, 2004.
Gaudin, S., "New PARC software turns a cell phone into a personal assistant," Computerworld, pp. 1-3, 2007.
Giles, "How to Use Flickr: The Digital Photography Revolution," Thomson Course Technology PTR (pub.), pp. 1-20, 2006.
Glinton, S., "From Grindr Team, a Meet-'N'-Greet App for the Rest," WBUR News, retrieved from https://www.wbur.org/npr/143585501/from-grindr-team-a-meet-n-greet-app-for-the-rest, pp. 1-8, 2011.
Google Scholar results for 2001-2002 articles citing Jeffrey Heer and Ed H. Chi, Identification of Web User Traffic Composition Using Multi-Modal Clustering and Information Scent, published as part of the Proceedings of the Workshop on Web Mining, First SIAM Conference on Data Mining (SMD 2001), Chicago, Illinois, Apr. 7, 2001, pp. 1-4.
Greene, "Mapping a City's Rhythm," MIT Technology Review, retrieved from URL: https://www.technologyreview.com/s/412529/mappinga-citys-rhythm, pp. 1-6, 2009.
Greene, "Smart Phone Suggests Things to Do," MIT Technology Review, retrieved from URL: https://www.technologyreview.com/2007/11/13/128685/smart-phone-suggests-things-to-do/, pp. 1-10, 2007.
Guinard et al., "Towards the Web of Things: Web Mashups for Embedded Devices," WWW 2009, pp. 1-8, 2009.
Hahn et al., "Evaluating Web Site Performance in Internet-Based Selling from a Business Value Perspective," 2001 International Conference on Electronic Commerce, pp. 1-25, 2001.
Harris, "How Does the Nike Plus Work?," retrieved from URL: https://www.livestrong.com/article/533191-how-does-the-nike-plus-work/, pp. 1-18, 2006.
Hazel, excerpts from "EXIM: The Mail Transfer Agent," O'Reilly & Assoc., pub., pp. 1-182, 2001.
Heer et al., "Identification of Web User Traffic Composition using Multi-Modal Clustering and Information Scent," Proceedings of the Workshop on Web Mining, SIAM Conference on Data Mining, pp. 1-13, 2001.
Heer, "Capturing and Analyzing the Web Experience," 2002 Workshop CHI, pp. 1-5, 2002.
Hersovici et al., "The shark-search algorithm—An application: tailored Web site mapping," Computer Networks and ISDN Systems, vol. 30, pp. 317-326, 1998.
Hickman, "How I became a Foursquare cyberstalker," retrieved from URL: https://www.theguardian.com/technology/2010/jul/23/foursquare, pp. 1-6, 2010.
Hristova et al., "Ad-me: Wireless Advertising Adapted to the User Location, Device and Emotions," Proceedings of the 37th Hawaii International Conference on System Sciences, retrieved from URL: http://citeseerx.ist.psu.edu/viewdoc/download;jsessionid=2CD78FA3E058EB3BD48812F5EA10553B?doi=10.1.1.129.2870&rep=rep1&type=pdf, pp. 1-10, 2004.
Hsu et al., "Ranking Comments on the Social Web," 2009 Int'l Conf. Computational Sci. & Engineering, vol. 4., pp. 1-8, 2009.
IEEE Information re: ICONS International Conference on Systems and Yau, pp. 1-30, 2021.
IEEE Information re: Yau, available at https://ieeexplore.ieee.org/document/4196333, pp. 1-3, 2021.
Joachims et al., "WebWatcher: Machine Learning and Hypertext," Carnegie Mellon University, pp. 1-6, 1995.
Joachims et al., "WebWatcher: A Tour Guide for the World Wide Web," CMU-CS-96, pp. 1-29, 1996.
Joachims et al., "WebWatcher: A Tour Guide for the World Wide Web," Proceedings of IJCAI97, pp. 1-6, 1997.
Kamba et al., "An interactive, personalized, newspaper on the WWW," Proceedings, Multimedia Computing and Networking 1996; DOI:10.1117/12.235880, vol. 2667, pp. 1-12, 1996.
Kamba et al., "Anatagonomy: a personalized newspaper on the World Wide Web," Int'l J. Human Computer Studies, vol. 46, pp. 789-803, 1997.
Kamba et al., "The Krakatoa Chronicle—An Interactive, Personalized, Newspaper on the Web," GVU Center Technical Reports, pp. 1-15, 1995.
Keenoy et al., "Personalisation of Web Search," Intelligent Techniques for Web Personalization IJCAI 2003 Workshop, pp. 1-29, 2003.
Kelly, "Business Models Based on Advertising," Technical, Business, and Legal Dimensions of Protecting Children from Pornography on the Internet: Proceedings of a Workshop, retrieved from URL: https://www.nap.edu/read/1 0324/chapter/17#105, pp. 1-8, 2002.
Kim et al., "CASTmiddleware: Security Middleware of Context-Awareness Simulation Toolkit for Ubiquitous Computing Research Environment," ICIC2006, LNCIS 344, pp. 506-513, 2006.
Kim, "Pebble watch: Smartwatch Review," PCMag, retrieved from URL: https://www.pcmag.com/reviews/pebble-smartwatch, 11 pgs. (Dec. 7, 2016).
Kirk, "Microsoft buys mobile advertising company ScreenTonic," IDG News Service, retrieved from URL: https://www.computerworld.com/article/2544849/microsoft-buys-mobile-advertising-company-screentonic.html, pp. 1-5, 2007.
Kosala et al., "Web Mining Research: A Survey," ACM SIGKDD Explorations Newsletter, vol. 2, No. 1, pp. 1-15, 2000.
Kovach, "How To Use Gowalla To Check-In With Foursquare," Business Insider, retrieved from URL: https://www.businessinsider.com/heres-a-tour-of-gowallas-latest-iphone-app-2010-12, pp. 1-9, 2010.
Lazerow, "Twitter's Ads API is Here: So What and Now What?," Ad Age, retrieved from URL: https://web.archive.org/web/20130223013656/http:/adage.com/article/digitalnext/twitter-s-ads-api/239913/, pp. 1-4, 2013.
Lerman et al., "Social Browsing on Flickr," International Conference on Weblogs and Social Media, pp. 1-9, 2006.
Lieberman et al., "Exploring the Web with Reconnaissance Agents," Communications of the ACM, vol. 44, No. 8, pp. 69-75, 2001.
Lieberman et al., "Let's Browse: A Collaborative Web Browsing Agent," IUI '99: Proceedings of the 4th International Conference on Intelligent User Interfaces, pp. 65-68, 1998.
Lieberman, "Autonomous Interface Agents," CHI 97, pp. 67-74, 1997.
Lieberman, "Letizia: An Agent That Assists Web Browsing," IJCAI '95: Proceedings of the 14th Int'l Joint Conf. on Artificial Intelligence, pp. 924-929, 1995.

(56) References Cited

OTHER PUBLICATIONS

Liu, "A Study of Mobile Sensing Using Smartphones," International Journal of Distributed Sensor Networks, vol. 2013, Article ID 272916, pp. 1-11, 2013.
Loecher et al., "CitySense: multiscale space time clustering of GPS points and trajectories," Joint Statistical Meeting (JSM), retrieved from URL: http://www1.cs.columbia.edu~jebara/papers/CitySense.JSM2009.pdf, pp. 1-10, 2009.
Loreto et al., "Known Issues and Best Practices for the Use of Long Polling and Streaming in Bidrectional HTTP," Internet Engineering Task Force (IETF), RFC: 6202, pp. 1-19, 2011.
Maarek et al., "WebCutter: A System for Dynamic and Tailorable Site Mapping," retrieved from URL: https://web.archive.org/web/20051024073316/http://www.ra.ethz.ch:80/CDstore/www6/Technical/Paper040/Paper40.html, pp. 1-6, 1998.
Maia et al., "LOCCAM—Loosely Coupled Context Acquisition Middleware," 28th Annual ACM Symposium on Applied Computing (SAC '13), pp. 534-541, 2013.
Malik, "Using the iPhone to Mine for Gold & Sense," Gigaom.com, retrieved from URL: https://gigaom.com/2008/06/09/sense-networks-citysense, pp. 1-4, 2008.
Mallick, "Mobile and Wireless Design Essentials," Wiley Publishing, pp. 1-51, 2003.
Manber et al., "WebGlimpse—Combining Browsing and Searching," in Conference Proceedings of the USENIX 1997 Technical Conference, pp. 1-12, 1997.
Marmasse et al., "Safe & Sound: A Wireless Leash," Short Talk: Trust, Security & Safety, CHI 2003: New Horizons, Ft. Lauderdale, USA, pp. 726-727, 2003.
McFedries et al., excerpts from "MySpace Visual Quick Tips," Wiley Publishing, Inc., pp. 1-64, 2006.
Meyers et al., "The Downloader's Companion for Windows," Prentice Hall PTR, pp. 1-41, 1995.
Miami Staff, "Grindr Anyone?," Miami Herald, retrieved from URL: https://www.miamiherald.com/miami-com/things-to-do/article225856080.html, pp. 1-5, 2010.
Miller, "Take a Step Closer for an Invitation to Shop," New York Times, retrieved from URL: https://www.nytimes.com/2010/02/23/business/media/23adco.html, pp. 1-4, 2010.
Miller, excerpts from "Absolute Beginner's Guide to Computer Basics," 4th ed., pp. 1-6, 2007.
Millhollon et al., excerpts from "Microsoft Internet Explorer 3.0 Frontrunner," Coriolis Group Books, pp. 1-49, 1996.
Mladenic, "Machine Learning for Better Web Browsing," AAAI Technical Report SS-00-01, pp. 82-85, 2000.
Mladenic, "Machine Learning Used by Personal WebWatcher," Proceedings of ACAI-99 Workshop on Machine Learning and Intelligent Agents, pp. 1-9, 1999.
Mladenic, "Personal WebWatcher: Design and Implementation," Technical Report IJS-DP-7472, pp. 1-18, 2006.
Mladenic, "Text Learning and Related Intelligent Agents: A Survey," IEEE Intelligent Systems and Their Applications, vol. 14, No. 11, pp. 44-54, 1999.
Mladenic, "Using Text Learning to Help Web Browsing," Proceedings of the Ninth Int'l Conf. on Human-Computer Interaction, pp. 1-5, 2001.
Mobasher et al., "Integrating Web Usage and Content Mining for More Effective Personalization," EC-Web 2000: Proceedings of the First International Conference on Electronic Commerce and Web Technologies, pp. 1-12, 2000.
Murchison, "Sieve Email Filtering: Subaddress Extension," Request for Comments: 5233, pp. 1-5, 2008.
Neufeld, "The Use of URLs as Meta-Syntax for Core Mail List Commands and their Transport through Message Header Fields," Request for Comments: 2369, pp. 1-10, 1998.
Newcomb, "Yahoo SmartAds: Super-Targeted Display Ads," Search Engine Watch, retrieved from URL: https://www.searchenginewatch.com/2007/07/02/yahoo-smartads-super-targeted-display-ads, pp. 1-4, 2007.
Olston et al., "ScentTrails: Integrating Browsing and Searching on the Web," ACM Transactions on Computer-Human Interactions, vol. 10, No. 3, pp. 1-21, 2003.
Paliouras et al., "PNS: A personalized news aggregator on the web," Intelligent Interactive Systems in Knowledge-based Environments, Virvou, M. and Lakhmi, C., eds., pp. 1-22, 2008.
Paliouras et al., "PNS: Personalized multi-source news delivery," International Conference on Knowledge-Based and Intelligent Information and Engineering Systems, pp. 1152-1161, 2006.
Pant et al., "Crawling the Web," Web Dynamics, Springer, Berlin, Germany, pp. 1-25, 2004.
Patel, "Pebble Smartwatch Review," retrieved from URL: https://www.theverge.com/2013/1/28/3924904/pebble-smartwatch-review, pp. 1-10, 2013.
Pazzani et al., "Adaptive Web Site Agents," Autonomous Agents and Multi-Agent Systems, Kluwer Academic, vol. 5 pp. 205-218, 2002.
Pazzani et al., "Learning and Revising User Profiles: The Identification of Interesting Web Sites," Machine Learning, vol. 27, pp. 313-331, 1997.
Pazzani et al., "Machine Learning for User Modeling," User Modeling and User-Adapted Interaction, vol. 11, pp. 19-29, 2001.
Pazzani et al., "Syskill and Webert: Identifying Interesting Websites," AAAI-96 Proceedings, pp. 54-61, 1996.
Perkowitz, "Adaptive Web Sites: Automatically Synthesizing Web Pages," AAAI-98 Proc., pp. 1-6, 1998.
Perkowitz, "Adaptive Web Sites: Conceptual Cluster Mining," Dept. of Computer Science and Engineering, Univ. of Washington, pp. 1-6, 1999.
Perkowitz, "Towards Adaptive Web Sites: Conceptual Framework and Case Study," Elsevier Science B. V. (pub.), pp. 1-14, 2000.
Petersen et al., "PALLAS: Personalised Language Learning on Mobile Devices," Fifth IEEE International Conference on Wireless, Mobile, and Ubiquitous Technology in Education, pp. 52-59, 2006.
Piquepaille, "A phone that tells you what to do," ZDNet, retrieved from URL: https://www.zdnet.com/article/a-phone-that-tells-you-what-to-do, pp. 1-5, 2007.
Pirolli et al., "Silk from a Sow's Ear: Extracting Usable Structures from the Web," Conference on Human Factors in Computing Systems (CHI '96), pp. 118-125, 1996.
Pitkow et al., "Mining Longest Repeating Subsequences to Predict World Wide Web Surfing," Proceedings of USITS' 99: The 2nd USENIX Symposium on Internet Technologies & Systems, pp. 1-13, 1999.
Pokraev et al., "Service Platform for Rapid Development and Deployment of Context-Aware, Mobile Applications," IEEE International Conference on Web Services, vol. 646, pp. 1-8, 2005.
Postel, "Instructions to RFC Authors," Request for Comments: 1543, pp. 1-16, 1993.
Powell, excerpts from "AJAX: The Complete Reference," McGraw Hill (pub.), pp. 1-98, 2008.
Prasad, "Magitti: The Intelligent Mobile Platform," Geospatial World, retrieved from https://www.geospatialworld.net/article/magitti-the-intelligent-mobile-platform, pp. 1-3, 2010.
Ramakrishnan, "The PointCast Network," PointCast Inc., retrieved from URL: https://dl.acm.org/doi/abs/1 0.1145/276304.276361, pp. 520, 1998.
Rao, "Placecast Brings Location-Based Shopping Alerts To Retailer Smartphone Apps," TechCrunch, retrieved from URL: https://techcrunch.com/2011/08/22/placecast-brings-location-based-shopping-alerts-to-smartphone-apps, pp. 1-3, 2011.
Reardon, "Motion Sensing comes to mobile phones," CNET, pp. 1-4, 2007.
Resnick, "Internet Message Format," Request for Comments: 2822, pp. 1-44, 2001.
Ricci, "Mobile Recommender Systems," Information & Technology Tourism, pp. 1-24, 2010.
Richardson et al., excerpts from "RESTful Web Services," O'Reilly Media, Inc. (pub.), pp. 1-74, 2007.
Riggsby et al., "Mastering Lotus Notes and Domino 6," Sybex, retrieved from URL: https://archive.org/details/masteringlotusno0000unse, pp. 1-228, 2003.

(56) References Cited

OTHER PUBLICATIONS

Rodriguez, "RESTful Web Services: The Basics." IBM DeveloperWorks, pp. 1-11, 2008.
Saint, "What is Foursquare And How Do I Use it?" Business Insider, retrieved from URL: https://www.businessinsider.com/how-hit-location-based-social-app-foursquare-works-2010-1, pp. 1-17, 2010.
Schonfeld, "Liveblogging Facebook Advertising Announcement (Social Ads + Beacon + Insights)," Tech Crunch, retrieved from URL: https://techcrunch.com/2007/11/06/liveblogging- facebook-advertising- announcement, pp. 1-9, 2007.
Schwab et al., "Adaptivity through Unobtrusive Learning," KI 2002/3, Special Issue on Adaptivity and User Modeling, pp. 1-8, 2002.
"Schwinger et al., ""Context-awareness in Mobile Tourism Guides—A Comprehensive Survey,"" Johannes Kepler Universität Linz, pp. 1-20, 2004."
Screen Capture of "About PlaceIQ," retrieved from URL: https://www.placeiq.com/about-placeiq, pp. 1, 2012.
Screen Capture of "Doubleclick Inc.," Encyclopedia.com, retrieved from URL: https://www.encyclopedia.com/economics/encyclopedias-almanacs-transcripts-and-maps/doubleclick-inc, pp. 1-8, 2001.
Screen Capture of "Gowalla," retrieved from URL: https://en.wikipedia.org/wiki/Gowalla, pp. 1-3, 2021.
Screen Capture of "Murder: Fast datacenter code deploys using BitTorrent," retrieved from URL: https://blog.twitter.com/engineering/en_us/a/2010/murder-fast-datacenter-code-deploys-using-bittorrent.html, pp. 1-3, 2010.
Screen Capture of "Nike Plus Review," YouTube, retrieved from URL: https://www.youtube.com/watch?v=CkyecA7z4es, pp. 1-2, 2012.
Screen Capture of "PlaceIQ—Shyenne Horras," retrieved from URL: https://shyennehorras.com/tag/placeiq, pp. 1, 2012.
Screen Capture of "Privacy," PlaceIQ, retrieved from URL: https://www.placeiq.com/privacy, pp. 1, 2012.
Screen Capture of "Proximity Overview," Gimbal Inc., retrieved from URL: https://docs.gimbal.com/proximity_overview.html, pp. 1-8, 2013.
Seo et al., "Learning User's Preferences by Analyzing Web-Browsing Behaviors," Proceedings of the Fourth International Conference on Autonomous Agents, pp. 381-387, 2000.
Shahabi et al., "A Framework for Efficient and Anonymous Web Usage Mining Based on Client-Side Tracking," WebKDD 2001—International Workshop of Mining Web Log Data Across All Customer Touch Points, pp. 1-32, 2002.
Shahabi et al., "Knowledge Discovery from Users Web-Page Navigation," Proceedings of the Seventh International Workshop of Research Issues in Data Engineering. High Performance Database Management for Large-Scale Applications, pp. 1-10, 1997.
Shalloway et al., excerpts from "Design Patterns Explained: A New Perspective on Object-Oriented Design," 2nd ed., pp. 1-84, 2005.
Shapira et al., "ePaper—the Personalized Mobile Newspaper," J. Am. Soc. Info. Sci. & Tech., vol. 60, pp. 1-7, 2009.
Sharp et al., "Establishing Requirements for a Mobile Learning System," Interaction Design 5th Edition, pp. 1-14, 2007.
Sharp et al., "Establishing Requirements for a Mobile Learning System," Mobilearn Case Study 10.2, pp. 1-25, 2007.
Sharples et al., "Big Issues in Mobile Learning," Report of a Workshop by Kaleidoscope Network of Excellence Mobile Learning Initiative, pp. 1-34, 2006.
Sharples et al., "Towards a Theory of Mobile Learning," MLEARN, pp. 1-9, 2005.
Sizov et al., "BINGO!: Bookmark-Induced Gathering of Information," Proceedings of the Third International Conference on Web Information Systems Engineering, WISE 2002, DOI:10.1109/WISE.2002.1181668, pp. 1-10, 2002.
Sizov et al., "The BINGO! System for Information Portal Generation and Expert Web Search," University of Saarland, Dept. of Computer Science, pp. 1-12, 2003.
Sizov et al., "BINGO!: Bookmark-Induced Gathering of Information," Slide Presentation, 16 pgs., (Dec. 14, 2002).
Springer Information re: Kim, available at URL: https://link.springer.com/bookseries/642, pp. 1, 2020.
Srivastava et al., "Web Usage Mining: Discovery and Applications of Usage Patterns from Web Data," SIGKDD Explorations, ACM SIGKDD, vol. 1, No. 2, pp. 1-12, 2000.
Sterling, "New SmartAds: The Future of Graphical Advertising at Yahoo," Search Engine Land, retrieved from URL: https://searchengineland.com/new-smartads-the-future-of-graphical-advertising-at-yahoo-11607, pp. 1-3, 2007.
"Stern, ""Pebble Watch: Behind the Smartwatch Sensation,"" retrieved from URL: https://abcnews.go.com/Technology/pebble-watch-smartwatch-iphone-android/story?id=16750944, pp. 1-5, 2012."
Stevens, "Nike + ipod Sports Kit review," retrieved from URL: https://www.cnet.com/reviews/nike-plus-ipod-sport-kit-review, pp. 1-5, 2007.
Story, "Online Customized Ads Move a Step Closer," New York Times, retrieved from URL: http://www.nytimes.com/2007/07/02/technology/02yahoo.html, pp. 1-4, 2007.
Strang et al., "A Context Modeling Survey," pp. 1-8, 2004.
Sugiyama et al., "Adaptive Web Search Based on User Profiles Constructed without Any Effort from Users," WWW 2004, pp. 675-684, 2004.
Takeuchi et al., "An Outdoor Recommendation System based on User Location History," ubiPCMM, retrieved from URL: https://citeseerx.ist.psu.edu/viewdoc/download?doi=10.1.1.91.813&rep=rep1&type=pdf, pp. 1-10, 2005.
Theobald et al., "BINGO! And DAFFODIL: Personalized Exploration of Digital Libraries and Web Sources," Max-Planck Inst. Fur Informatik, Saarbrucken, Germany, pp. 1-19, 2004.
Van Setten et al., "Context-Aware Recommendations in the Mobile Tourist Application COMPASS," International Conference on Adaptive Hypermedia and Adaptive Web-Based Systems, pp. 1-10, 2004.
Verbert et al., "Context-Aware Recommender Systems for Learning: A Survey and Future Challenges," IEEE Transactions on Learning Technologies, vol. 5, No. 4, pp. 318-335, 2012.
Vo et al., "A Survey of Context-Aware Recommendation Systems," Semantic Scholar, retrieved from URL: http://homepage.cs.latrobe.edu.au/ccvo/papers/16recommendation.pdf, pp. 1-23, 2013.
Vrettos et al., "A Fuzzy Rule-Based Agent for Web Retrieval-Filtering," LNAI 2198, pp. 448-453, 2001.
Wancho, F., "Digest Message Format," Networking Group Request for Comments: 1153, WSMR, pp. 1-4, 1990.
Wang et al., "Unified relevance models for rating prediction in collaborative filtering," ACM Transactions on Information Systems, pp. 1-40, 2008.
Wang et al., "Unifying user-based and item-based collaborative filtering approaches by similarity fusion," Proceedings of the 29th annual international ACM SIGIR Conference on Research and Development in Information Retrieval, pp. 1-8, 2006.
Wang, "Beginning Programming for Dummies," IDG Books Worldwide, Inc., pp. 1-27, 1999.
Wang, excerpts from "Beginning Programming for Dummies," IDG Books Worldwide, Inc. (pub.), pp. 1-40, 1999.
Wasfi et al., "Collecting User Access Patterns for Building User Profiles and Collaborative Filtering," IUI '99: Proceedings of the 4th International Conference on Intelligent User Interfaces, pp. 57-64, 1999.
Wattanajantra, "Nike+ GPS app for iPhone: Track runs without a sensor in your shoe," CNET, retrieved from https://www.cnet.com/news/nike-gps-app-for-iphone-track-runs-without-a-sensor-in-your-shoe, pp. 1-2, 2010.
Wayback Machine Capture of "PIQ Segments," retrieved from URL: https://web.archive.org/web/20130404211709/http://www.placeiq.com/products/piq-segments-piq-segments, pp. 1, 2013.
Wayback Machine Capture of "5 Tips for Creating an Advertisement on Facebook," retrieved from URL: https://web.archive.org/web/20111111002017/http:/www.advertisementinfacebook.com/advertisement-for-facebook.html, pp. 1-2, 2011.
Wayback Machine Capture of "AdRevolver Banner Manager," retrieved from URL: https://web.archive.org/web/20020204042004/http://www.adrevolver.com:80/banner_manager/about.htm, pp. 1, 2002.

(56) References Cited

OTHER PUBLICATIONS

Wayback Machine Capture of "AdRevolver Banner Manager: FAQ," retrieved from URL: https://web.archive.org/web/20020204042401/http:/www.adrevolver.com/banner_manager/faq.htm, pp. 1-3, 2002.
Wayback Machine Capture of "Advertisement In Facebook Information," retrieved from URL: https://web.archive.org/web/20111112062703/http:/www.advertisementinfacebook.com/index.html, pp. 1-2, 2011.
Wayback Machine Capture of "Advertiser Analytics: Twitter for Business," retrieved from URL: https://web.archive.org/web/20120930215459/https:/business.twitter.com/en/advertise/analytics/, pp. 1-3, 2012.
Wayback Machine Capture of "Alarm Clock 2: About Alarm Clock," retrieved from URL: https://web.archive.org/web/20060208031527/http://www.robbiehanson.com/alarmclock/index.html, 2 pgs. (2006).
Wayback Machine Capture of "Alarm Clock 2: About Alarm Clock," retrieved from URL: https://web.archive.org/web/20071011022121/http://www.robbiehanson.com/alarmclock/index.html, 2 pgs. (2007).
Wayback Machine Capture of "Alarm Clock 2: FAQ," retrieved from URL: https://web.archive.org/web/20071011034339/http://robbiehanson.com/alarmclock/faq.html, pp. 1-4, 2007.
Wayback Machine Capture of "Alarm Clock 2: Screen Shots," retrieved from URL: https://web.archive.org/web/20071011044752/http://www.robbiehanson.com/alarmclock/screenShots.html, 2 pgs. (2007).
Wayback Machine Capture of "Alarm Clock 2: What's New," retrieved from URL: https://web.archive.org/web/20071011034402/http://robbiehanson.com/alarmclock/whatsNew.html, 5 pgs. (Oct. 11, 2007).
Wayback Machine Capture of "Analytics," Twitter, retrieved from URL: https://web.archive.org/web/20130307212005/https:/business.twitter.com/products/analytics-self-service, pp. 1-3, 2013.
Wayback Machine Capture of "Announcing the Twitter Ads API," retrieved from URL: https://web.archive.org/web/20130223180647/http:/advertising.twitter.com/2013/02/announcing-twitter-ads-api_20.html, pp. 1-3, 2013.
Wayback Machine Capture of "API Integration," retrieved from URL: https://web.archive.org/web/20120209174437/https:/business.twitter.com/en/optimize/api, pp. 1-2, 2012.
Wayback Machine Capture of "BallBug," 6 pgs., retrieved from URL: https://web.archive.org/web/20080105010049/http://ballbug.com:80/#a071102p10, pp. 1-10, 2008.
Wayback Machine Capture of "Blogniscient," retrieved from URL: https://web.archive.org/web/20070704140750/http://www.blogniscient.com/tb.html, pp. 1-8, 2007.
Wayback Machine Capture of "BlogRunner," retrieved from URL: https://web.archive.org/web/20080614113547/http://www.blogrunner.com, pp. 1-10, 2008.
Wayback Machine Capture of "Certified Products," retrieved from URL: https://web.archive.org/web/20130307212611/https:/dev.twitter.com/programs/twitter-certified-products/products, pp. 1-5, 2013.
Wayback Machine capture of "Citysense," retrieved from URL: https://web.archive.org/web/20080922000635/http://www.sensenetworks.com:80/citysense.php, 2 pgs. (Sep. 22, 2008).
Wayback Machine Capture of "Cloudee Alpha—About," retrieved from URL: https://web.archive.org/web/20080227033022/http://www.cloudee.com:80/about.php, pp. 1, 2008.
Wayback Machine Capture of "Cloudee Alpha," retrieved from URL: https://web.archive.org/web/20080227033020/http://www.cloudee.com:80, pp. 1-2, 2008.
Wayback Machine Capture of "Daylife.com," retrieved from URL: https://web.archive.org/web/20080317095538/http://www.daylife.com:80, pp. 1-3, 2008.
Wayback Machine Capture of "Documentation: Twitter Developers," retrieved from URL: https://web.archive.org/web/20110713041412/https://dev.twitter.com/docs, pp. 1-2, 2011.
Wayback Machine Capture of "Eclipse.org," retrieved from URL: https://web.archive.org/web/20080307093622 /https://www.eclipse.org, pp. 1, 2008.
Wayback Machine Capture of "Fab" homepage, available at URL: https://web.archive.org/web/19971021223905/ http://fab.stanford.edu:80, pp. 1, 1997.
Wayback Machine Capture of "Gender targeting for Promoted Products now available," retrieved from URL: https://web.archive.org/web/20121028010012/http:/advertising.twitter.com/2012/10/gendertargeting-for-promotedproducts.html, pp. 1-3, 2012.
Wayback Machine Capture of "Geo Developer Guidelines," retrieved from URL: https://web.archive.org/web/20110713045612/https://dev.twitter.com/terms/geo-developerguidelines, pp. 1-3, 2011.
Wayback Machine Capture of "GET geo/search," retrieved from URL: https://web.archive.org/web/20110713042853/https://dev.twitter, pp. 1-3, 2011.
Wayback Machine Capture of "GET search," retrieved from URL: https://web.archive.org/web/20111223105655/https:/dev.twitter.com/docs/api/1/get/search, pp. 1-11, 2011.
Wayback Machine Capture of "Getting Started," retrieved from URL: https://web.archive.org/web/20110713043554/https://dev.twitter.com/start, pp. 1-2, 2011.
Wayback Machine Capture of "GNIP," retrieved from URL: https://web.archive.org/web/20121214215529/https:/dev.twitter.com/programs/twitter-certified-products/gnip, pp. 1-3, 2012.
Wayback Machine Capture of "History of the REST & Search API," retrieved from URL: https://web.archive.org/web/20111202041642/https:/dev.twitter.com/docs/history-rest-search-api, pp. 1-2, 2011.
Wayback Machine Capture of "How Do You Advertise on Facebook?," retrieved from URL: https://web.archive.org/web/20111111023735/http:/www.advertisementinfacebook.com/how-do-you-advertise-on-facebook.html, pp. 1-2, 2011.
Wayback Machine Capture of "Improving performance on twitter.com," retrieved from URL: https://blog.twitter.com/engineer ing/en_us/a/2012/improving-performance-on-twittercom.html, pp. 1-4, 2012.
Wayback Machine capture of "Interest targeting: Broaden your reach, reach the right audience," retrieved from URL: https://web.archive.org/web/20120831222534/http:/advertising.twitter.com/2012/08/interest-targeting-broaden-your-reach.html, pp. 1-3, 2012.
Wayback Machine Capture of "Letizia: An Agent That Assists Web Browsing," The Lieberary: Henry Lieberman's On-Line Library, retrieved from URL: https://web.archive.org/web/20040426134417/http://web.media.mit.edu~lieber/Lieberary/Lieberary.html, pp. 1-2, 2004.
Wayback Machine Capture of "Measure your impact," retrieved from URL: https://web.archive.org/web/20130307211901/https:/business.twitter.com/measure-your-impact, pp. 1-3, 2013.
Wayback Machine Capture of "Measurement," retrieved from URL: https://www.placeiq.com/measurement, pp. 1, 2012.
Wayback Machine Capture of "Memeorandum," retrieved from URL: https://web.archive.org/web/20080203205518/http://www.memeorandum.com:80/#a080130p150, pp. 1-13, 2008.
Wayback Machine Capture of "More powerful tools for small business and self-service advertisers," retrieved from URL: https://web.archive.org/web/20130321053415/http:/advertising.twitter.com/2013/03/More-powerful-tools-for-small-business-and-self-service-advertisers.html, pp. 1-3, 2013.
Wayback Machine Capture of "MPOS AdSpace," retrieved from URL: https://web.archive.org/web/20080808140616/http://www.xiam.com/xiam.products.adspace.shtml, pp. 1, 2008.
Wayback Machine Capture of "Personalization & Discovery," retrieved from URL: https://web.archive.org/web/20080915111528/http://www.qualcomm.com/products_services/mobile_content_services/personalization_discovery.html, pp. 1-3, 2008.
Wayback Machine Capture of "PIQ Conquest," retrieved from URL: https://web.archive.org/web/20130405064340/http://www.placeiq.com/products/piq-conquest-piq-conquest, pp. 1, 2013.
Wayback Machine Capture of "PIQ Customer," retrieved from URL: https://web.archive.org/web/20130405063947/http://www.placeiq.com/products/piq-customer-piq-customer, pp. 1, 2013.

(56) References Cited

OTHER PUBLICATIONS

Wayback Machine Capture of "Place Visit Rate (PVR)," retrieved from URL: https://web.archive.org/web/20130411042334/http://www.placeiq.com/products/pvr, pp. 1, 2013.
Wayback Machine Capture of "PlaceIQ Blog," retrieved from URL: https://web.archive.org/web/20130413102103/https://www.placeiq.com/blog, pp. 1, 2013.
Wayback Machine Capture of "Pricing," retrieved from URL: https://web.archive.org/web/20130307212012/https:/business.twitter.com/products/pricing, pp. 1-3, 2013.
Wayback Machine Capture of "Promoted Products: now more mobile," retrieved from URL: https://web.archive.org/web/20120229030349/http:/blog.twitter.com/2012/02/promoted-products-now-more-mobile.html, pp. 1-3, 2012.
Wayback Machine Capture of "Promoted Trends," Twitter, retrieved from URL: https://web.archive.org/web/20101010145232/https:/support.twitter.com/articles/282142, pp. 1-2, 2010.
Wayback Machine Capture of "Promoted Tweets on mobile: more options, starting today," retrieved from URL: https://web.archive.org/web/20120320192505/http://advertising.twitter.com/2012/03/promoted-tweets-on-mobile-more-options.html, pp. 1-3, 2012.
Wayback Machine Capture of "REST API v. 1.1 Resources," Twitter, retrieved from URL: https://web.archive.org/web/20130325202324/https://dev.twitter.com/docs/api/1.1, pp. 1-8, 2013.
Wayback Machine Capture of "REST API v1.1 Resources," retrieved from URL: https://web.archive.org/web/20121214124240/https:/dev.twitter.com/docs/api/1.1, pp. 1-8, 2012.
Wayback Machine Capture of "ScreenTonic: Stamp Technology," retrieved from URL: https://web.archive.org/web/20080213054711/http://www.screentonic.com/stamp-technology.htm, pp. 1, 2008.
Wayback Machine Capture of "ScreenTonic—At a glance," retrieved from URL: https://web.archive.org/web/ 20080209135205/http://www.screentonic.com/at-a-glance1.htm, pp. 1, 2008.
Wayback Machine Capture of "Start Advertising," retrieved from URL: https://web.archive.org/web/20120206021953/https:/business.twitter.com/en/advertise/start, pp. 1-2, 2012.
Wayback Machine Capture of "Streaming API Concepts," retrieved from URL: https://web.archive.org/web/20111202024252/https://dev.twitter.com/docs/streaming-api/concepts, pp. 1-6, 2011.
Wayback Machine Capture of "Streaming API," retrieved from URL: https://web.archive.org/web/20111202024242/https:/dev.twitter.com/docs/streaming-api, pp. 1-3, 2011.
Wayback Machine Capture of "Targeted Mobile Advertising," retrieved from URL: https://web.archive.org/web/20081121201849/http://www.xiam.com/xiam.solutions.targeted.advertising.shtml, pp. 1, 2008.
Wayback Machine Capture of "Targeting," Twitter, retrieved from URL: https://web.archive.org/web/20130307212103/https://business.twitter.com/targeting, pp. 1-3, 2013.
Wayback Machine Capture of "TechMeme," retrieved from URL: https://web.archive.org/web/20080620082917/http://www.techmeme.com, pp. 1-13, 2008.
Wayback Machine Capture of "Technorati: Front Page," retrieved from URL: https://web.archive.org/web/20080707232324/http://www.technorati.com, pp. 1-2, 2008.
Wayback Machine Capture of "Technorati Support: Site Guide—Channels," retrieved from URL: https://web.archive.org/web/20080512023633/http://support.technorati.com/support/siteguide/channels, 1 pg. (2008).
Wayback Machine Capture of "The new Twitter Ads center," retrieved from URL: https://web.archive.org/web/20130316005334/http:/advertising.twitter.com/2013/03/The-new-Twitter-Ads-center.html, pp. 1-3, 2013.
Wayback Machine Capture of "The Streaming APIs," retrieved from URL: https://web.archive.org/web/20130119212721/https://dev.twitter.com/docs/streaming-apis, pp. 1-3, 2013.
Wayback Machine Capture of "Things Every Developer Should Know: Twitter Developers," retrieved from URL: https://web.archive.org/web/20111202041631/https://dev.twitter.com/docs/things-every-developer-should-know, pp. 1-3, 2011.
Wayback Machine Capture of "Twitter Ads Full Service—Analytics: Twitter for Business," retrieved from URL: https://web.archive.org/web/20130307212052/https:/business.twitter.com/products/analytics-full-service, pp. 1-4, 2013.
Wayback Machine Capture of "Twitter Ads self service: Twitter for Business," retrieved from URL: https://web.archive.org/web/20130307211550/https:/business.twitter.com/products/twitter-ads-self-service, pp. 1-4, 2013.
Wayback Machine Capture of "Twitter Advertising: Introducing Keyword Targeting in Timelines," retrieved from URL: https://web.archive.org/web/20130418114422/http://advertising.twitter.com/2013/04/Introducing-Keyword-Targeting-in-Timeline.html, pp. 1-3, 2013.
Wayback Machine Capture of "Twitter Advertising: New enhanced geo-targeting for marketers," retrieved from URL: https://web.archive.org/web/20120914024230/http:/advertising.twitter.com/2012/ 09/new-enhanced-geo-targeting-for-marketers.html, pp. 1-2, 2012.
Wayback Machine Capture of "Twitter Advertising: New targeting adds greater relevance to your Promoted Tweets," retrieved from URL: https://web.archive.org/web/ 20120722044622/http:/advertising.twitter.com/2012/07/ new-targeting-adds-greater-relevance-to.html, pp. 1-3, 2012.
Wayback Machine Capture of "Twitter Advertising: Two new features for self-service advertisers," retrieved from URL: https://web.archive.org/web/20120911135519/http:/advertising.twitter.com/2012/09/two-new-features-for-self-service.html, pp. 1-2, 2012.
Wayback Machine Capture of "Twitter Blog: Hello World", retrieved from URL: https://web.archive.org/web/ 20100416111723/http://blog.twitter.com/2010/04/hello-world.html, pp. 1-3, 2010.
Wayback Machine Capture of "Twitter Help Center:Promoted Accounts," Twitter, retrieved from URL: https://web.archive.org/web/20101009232719/http:/support.twitter.com/articles/282154, pp. 1-2, 2010.
Wayback Machine Capture of "User Streams," retrieved from https://web.archive.org/web/20111202041744/https:/dev.twitter.com/docs/streaming-api/user-streams, pp. 1-4, 2011.
Wayback Machine Capture of "User Streams," Twitter, retrieved from URL: https://web.archive.org/web/20120712073356/https://dev.twitter.com/docs/streaming-apis/streams/user, pp. 1-3, 2012.
Wayback Machine Capture of "We Smirch," retrieved from URL: https://web.archive.org/web/20071031220029/http://www.wesmirch.com:80, pp. 1-5, 2007.
Wayback Machine capture of "We've just made the 'Places' screen smarter!," retrieved from URL: https://web.archive.org/web/20100531082001/http://blog.foursquare.com:80/post/589698188/weve-just-made-the-places-screen-smarter, pp. 1, 2010.
Wayback Machine Capture of "WebGlimpse.org," retrieved from URL: https://web.archive.org/web/ 20000815205534/http://webglimpse.org:80, pp. 1, 2000.
Wayback Machine Capture of "WebMate: Introduction," retrieved from URL: https://web.archive.org/web/20010210064517/http://www.cs.cmu.edu:80/~softagents/webmate/Introduction.html, pp. 1-2, 2001.
Wayback Machine capture of "What are Promoted Trends?," retrieved from URL: https://web.archive.org/web/20130326131656/https:/support.twitter.com/articles/282142, pp. 1-2, 2013.
Wayback Machine Capture of "Why Should You Advertise on Facebook?," retrieved from URL: https://web.archive.org/web/20111111002041/http:/www.advertisementinfacebook.com/why-advertise-on-facebook.html, pp. 1-2, 2011.
Wayback Machine Capture of "ss1.jpg", Oct. 11, 2007, retrieved from https://web.archive.org/web/20071011044752im_/http://robbiehanson.com/alarmclock/images/ss1.jpg, 2 pgs.
Wayback Machine Capture of "ss2.jpg", Oct. 11, 2007, retrieved from https://web.archive.org/web/20071011044752im_/http://robbiehanson.com/alarmclock/images/ss2.jpg, 2 pgs.
Wayback Machine Capture of "ss3.jpg", Oct. 11, 2007, retrieved from https://web.archive.org/web/20071011044752im_/http://robbiehanson.com/alarmclock/images/ss3.jpg, 2 pgs.
Wayback Machine Capture of "ss4.jpg", Oct. 11, 2007, retrieved from https://web.archive.org/web/20071011044752im_/http://robbiehanson.com/alarmclock/images/ss4.jpg, 2 pgs.

(56) References Cited

OTHER PUBLICATIONS

Wayback Machine Capture of "ss5.jpg", Oct. 11, 2007, retrieved from https://web.archive.org/web/20071011044752im_/http://robbiehanson.com/alarmclock/images/ss5.jpg, 2 pgs.
Wayback Machine Capture of "ss6.jpg", Oct. 11, 2007, retrieved from https://web.archive.org/web/20071011044752im_/http://robbiehanson.com/alarmclock/images/ss6.jpg, 2 pgs.
Wayback Machine Capture of "ss7.jpg", Oct. 11, 2007, retrieved from https://web.archive.org/web/20071011044752im_/http://robbiehanson.com/alarmclock/images/ss7.jpg, 2 pgs.
Wayback Machine Capture of "ss8.jpg", Oct. 11, 2007, retrieved from https://web.archive.org/web/20071011044752im_/http://robbiehanson.com/alarmclock/images/ss8.jpg, 2 pgs.
Wayback Machine Capture of "ss9.jpg", Oct. 11, 2007, retrieved from https://web.archive.org/web/20071011044752im_/http://robbiehanson.com/alarmclock/images/ss9.jpg, 2 pgs.
Wayback Machine Capture of "ss10.jpg", Oct. 11, 2007, retrieved from https://web.archive.org/web/20071011044752im_/http://robbiehanson.com/alarmclock/images/ss10.jpg, 2 pgs.
Wayback Machine Capture of "ss11.jpg", Oct. 11, 2007, retrieved from https://web.archive.org/web/20071011044752im_/http://robbiehanson.com/alarmclock/images/ss11.jpg, 2 pgs.
Wayback Machine Capture of "ss12.jpg", Oct. 11, 2007, retrieved from https://web.archive.org/web/20071011044752im_/http://robbiehanson.com/alarmclock/images/ss12.jpg, 2 pgs.
Wayback Machine Capture of "ss13.jpg", Oct. 11, 2007, retrieved from https://web.archive.org/web/20071011044752im_/http://robbiehanson.com/alarmclock/images/ss13.jpg, 2 pgs.
Wayback Machine Capture of "ss14.jpg", Oct. 11, 2007, retrieved from https://web.archive.org/web/20071011044752im_/http://robbiehanson.com/alarmclock/images/ss14.jpg, 2 pgs.
Weiss et al., "HyPursuit: A Hierarchical Network Search Engine that Exploits Content-Link Hypertext Clustering," Hypertext'96, ACM (pub.), pp. 180-193, 1996.
White, excerpts from "How Computers Work," QUE Corp. (pub.), 6th ed., pp. 1-5, 2002.
Wilkinson, excerpts from "Flickr Mashups," Wiley Publishing, Inc., pp. 1-7, 2007.
Williams et al., "Role of a Personal Assistant in Delivering Personalised Context-Aware Services to Young People," retrieved from https://citeseerx.ist.psu.edu/viewdoc/download?doi=10.1.1.11.8614&rep=rep1&type=pdf, pp. 1-5, 2002.
Wolber et al., "Exposing Document Context in the Personal Web," IUI '02: 7th International Conference on Intelligent User Interfaces, pp. 1-8, 2002.
Wolber et al., "Navigating the Personal Web," JCDL Conference '04, ACM (pub.), pp. 1-10, 2004.
Wortham, "How Grindr is Changing the Way We Connect," The New York Times, retrieved from URL: https://bits.blogs.nytimes.com/2013/03/10/how-grindr-is-changing-the-way-we-all-connect, pp. 1-3, 2013.
Wu, "SpeedTracer: A Web Usage Mining and Analysis Tool," IBM Systems Journal, vol. 37, No. 1, pp. 89-105, 1998.
Xiang et al., "Temporal Recommendation on Graphs via Long- and Short-term Preference Fusion," ACM KDD '10, pp. 723-731, 2010.
Yan et al., "From User Access Patterns to Dynamic Hypertext Linking," Computer Networks and ISDN Systems, pp. 1-11, 1996.
Yao et al., "PagePrompter: An Intelligent Agent for Web Navigation Created Using Data Mining Techniques," pp. 1-13, 2002.
Yao et al., "PagePrompter: An Intelligent Web Agent Created Using Data Mining Techniques," LNAI 2475, pp. 1-8, 2002.
Yao et al., "Personalized Recommendation on Multi-Layer Context Graph," Springer-Vering Berlin Heidelberg, pp. 135-148, 2013.
Yau et al., "A context-aware and adaptive learning schedule framework for supporting learners' daily routines," Second International Conference on Systems (ICONS'07), IEEE, pp. 1-6, 2007.
Yeung et al., "A proactive personalised mobile recommendation system using analytic hierarchy process and Bayesian network," J. Internet Serv. Appl., vol. 3, pp. 195-214, 2012.
Young, "Getting the Message: How the Internet is Changing Advertising," Harvard Business School, retrieved at https://hbswk.hbs.edu/item/ getting-the-message-how- the-internet-is-changing- advertising, pp. 1-4, 2000.
Zabala et al., "CALVIN: A Personalized Web-Search Agent based on Monitoring User Actions," Artificial Intelligence Group, Universidad Simon Bolivar, Caracas, Venezuela; GI Jahrestagung, pp. 1-5, 2001.
Zafra, "Yahoo! Steps Up Online Advertising with SmartAds," Search Engine Journal, retrieved from URL: https://www.searchenginejournal.com/yahoo-steps-up-online-advertising-with-smartads/5245/#close, pp. 1-16, 2007.
Zaiane et al., "Discovering Web Access Patterns and Trends by Applying OLAP and Data Mining Technology on Web Logs," Proceedings IEEE International Forum on Research and Technology Advances in Digital Libraries—ADL '98, pp. 1-11, 1998.
Zee, "Foursquare who? 'Gowalla' might just be where it's at," retrieved from URL: https://thenextweb.com/2009/09/22/square-gowalla, pp. 1-5, 2009.
Zeff et al., "Advertising on the Internet," 2nd Ed., Wiley Computer Publishing, pp. 1-127, 1999.
Zheng et al., "Collaborative Location and Activity Recommendations with GPS History Data," ACM International Conference on World Wide Web, pp. 1-10, 2010.
Zuckerman, L., "Convention Highlights 'Push' Software for Web Browsers," Technology Cybertimes, New York Times on the Web, retrieved from URL: https://archive.nytimes.com/www.nytimes.com/library/cyber/week/1209software.html, pp. 1-4, 1996.
Wolfe, U.S. Appl. No. 60/819,576, filed Jul. 10, 2006, pp. 1-27.
Affidavit of Duncan Hall, pp. 1-18, 2021.
Affidavit of Duncan Hall, pp. 1-21, 2021.
Affidavit of Duncan Hall, pp. 1-23, 2021.
Affidavit of Duncan Hall, pp. 1-7, 2021.
Affidavit of Duncan Hall, pp. 1-14, 2021.
Affidavit of Duncan Hall, pp. 1-60 (part 1 of 2).
Affidavit of Duncan Hall, pp. 1-79 (part 2 of 2).
Declaration of Bamshad Mobasher for U.S. Pat. No. 7,043,475, pp. 1-53, 2021.
Declaration of Christopher M. Schmandt for U.S. Pat. No. 8,489,599 pp. 1-154, 2021.
Declaration of Christopher M. Schmandt for U.S. Pat. No. 8,732,584, pp. 1-105, 2021.
Declaration of Christopher M. Schmandt for U.S. Pat. No. 9,137,190 pp. 1-173, 2021.
Declaration of Christopher M. Schmandt for U.S. Pat. No. 9,208,439, pp. 1-119, 2021.
Declaration of Duncan Hall for U.S. Pat. No. 7,043,475, pp. 1-13, 2021.
Declaration of Edward A. Fox for U.S. Pat. No. 7,043,475, pp. 1-290, 2021.
Declaration of Edward A. Fox for U.S. Pat. No. 8,606,781, pp. 1-288, 2021.
Declaration of Gordon MacPherson for U.S. Pat. No. 8,489,599, pp. 1-14, 2021.
Declaration of Megan Raymond for U.S. Pat. No. 7,043,475, pp. 1-3, 2021.
Declaration of Michael F. Milea for U.S. Pat. No. 7,043,475, pp. 1-3, 2021.
Declaration of Michael F. Milea for U.S. Pat. No. 8,489,599, pp. 1-31, 2021.
Declaration of Sayem Osman for U.S. Pat. No. 7,043,475, pp. 1-7, 2021.
Declaration of Sayem Osman for U.S. Pat. No. 8,489,599, pp. 1-8, 2021.
Declaration of Sayem Osman for U.S. Pat. No. 9,208,439, pp. 1-8, 2021.
Declaration of Steve Smoot for U.S. Pat. No. 8,489,599, pp. 1-137, 2021.
Declaration of Steve Smoot for U.S. Pat. No. 9,208,439, pp. 1-142, 2021.
Declaration of Sylvia Hall-Ellis for U.S. Pat. No. 7,043,475, pp. 1-385, 2021.
Declaration of Sylvia Hall-Ellis for U.S. Pat. No. 8,489,599, pp. 1-101, 2021.

(56) References Cited

OTHER PUBLICATIONS

Declaration of Sylvia Hall-Ellis for U.S. Pat. No. 8,606,781, pp. 1-157, 2021.
Declaration of Sylvia Hall-Ellis for U.S. Pat. No. 8,732,584, pp. 1-122, 2021.
Declaration of Sylvia Hall-Ellis for U.S. Pat. No. 9,137,190, pp. 1-151, 2021.
Declaration of Sylvia Hall-Ellis for U.S. Pat. No. 9,208,439, pp. 1-123, 2021.
Declaration of Tanya S. Manno for U.S. Pat. No. 7,043,475, pp. 1-3, 2021.
Expert Declaration of Don Turnbull PhD for U.S. Pat. No. 8,489,599, pp. 1-565, 2021.
Expert Declaration of Don Turnbull PhD for U.S. Pat. No. 9,208,439, pp. 1-353, 2021.
Prosecution History of U.S. Pat. No. 9,137,190, 145 pgs.
Prosecution History of U.S. Pat. No. 9,208,439, 144 pgs.
Prosecution History of U.S. Pat. No. 7,043,475, 157 pgs.
Prosecution History of U.S. Pat. No. 8,489,599, 474 pgs.
Prosecution History for U.S. Pat. No. 8,606,781, 463 pgs. (Pts. 1 [146 pgs.], 2 [167 pgs.], 3 [150 pgs.]).
Complaint for Patent Infringement, Case No. 2:20-cv-10753, *Palo Alto Research Center Inc.* v. *Facebook, Inc*., pp. 1-70, 2021.
Complaint for Patent Infringement, Case No. 2:20-cv-10754, *Palo Alto Research Center Inc.* v. *Twitter, Inc*., pp. 1-61, 2021.
Complaint for Patent Infringement, Case No. 2:20-cv-10755, *Palo Alto Research Center Inc.* v. *Snap Inc*., pp. 1-31, 2021.
Order re: Joint Stipulation Re Stay Pending Inter Partes Review, Case No. 2:20-cv-10753-AB-MRW, pp. 1-2, 2021.
Order re: Joint Stipulation Re Stay Pending Inter Partes Review, Case No. Case No. 2:20-cv-10754-AB-MRW, pp. 1-2, 2021.
Petition for Inter Partes Review of U.S. Pat. No. 9,208,439 (IPR2021-00986), 81 pgs. (2021).
Petition for Inter Partes Review of U.S. Pat. No. 8,489,599 (IPR2021-00987), 77 pgs. (2021).
Petition for Inter Partes Review of U.S. Pat. No. 7,043,475 (2021-01264), 77 pgs. (2021).
Petition for Inter Partes Review of U.S. Pat. No. 8,489,599 (2021-01294), 73 pgs. (2021).
Petition for Inter Partes Review of U.S. Pat. No. 7,043,475 (IPR2021-01398), 102 pgs. (2021).
Petition for Inter Partes Review of U.S. Pat. No. 9,208,439 (IPR2021-01430), 98 pgs. (2021).
Petition for Inter Partes Review of U.S. Pat. No. 8,732,584 (IPR2021-01434), 67 pgs. (2021).
Petition for Inter Partes Review of U.S. Pat. No. 8,489,599 (IPR2021-01458), 121 pgs. (2021).
Petition for Inter Partes Review of U.S. Pat. No. 8,489,599 (IPR2021-01459), 117 pgs. (2021).
Petition for Inter Partes Review of U.S. Pat. No. 9,208,439 (IPR2021-01461), 75 pgs. (2021).
Petition for Inter Partes Review of U.S. Pat. No. 8,606,781 (IPR2021-01467), 76 pgs. (2021).
Petition for Inter Partes Review of U.S. Pat. No. 9,137,190 (IPR2021-01472), 78 pgs. (2021).
Petition for Inter Partes Review of U.S. Pat. No. 8,489,599 (IPR2021-01536), 73 pgs. (2021).
Plaintiff's Disclosure of Asserted Claims and Infringement Contentions, Exhibit FB04, U.S. Pat. No. 8,606,781, *Palo Alto Research Center Inc.* v. *Facebook, Inc*., Case No. 2:20-cv-10753-AB (C.D. Cal.), pp. 1-123.
Plaintiff's Disclosure of Asserted Claims and Infringement Contentions, Exhibit SN01, U.S. Pat. No. 8,489,599, *Palo Alto Research Center Inc.* v. *Snap, Inc*., Case No. 2:20-cv-10755-AB (C.D. Cal.), pp. 1-99.
Plaintiff's Disclosure of Asserted Claims and Infringement Contentions, Exhibit SN02, U.S. Pat. No. 9,208,439, *Palo Alto Research Center Inc.* v. *Snap, Inc*., Case No. 2:20-cv-10755-AB (C.D. Cal.), pp. 1-74.
Plaintiff's Disclosure of Asserted Claims and Infringement Contentions, Exhibit TW01, U.S. Pat. No. 8,489,599,, *Palo Alto Research Center Inc.* v. *Twitter, Inc*., Case No. 2:20-cv-10754-AB (C.D. Cal.), pp. 1-133.
"Defendant's Initial Invalidity Contentions," *Palo Alto Research Center Inc.* v. *Facebook, Inc*., Case No. 2:20-cv-10753-AB(MRWx), United States District Court, Central District of California, Western Division (Jun. 15, 2021).
"SNAP Inc.'s Initial Invalidity Contentions," *Palo Alto Research Center Inc.* v. *SNAP Inc*., Case No. 2:20-cv-10755-AB-MRW, United States District Court, Central District of California, Western Division (Jun. 15, 2021).
"Twitter's Initial Invalidity Contentions," *Palo Alto Research Center Inc.* v. *Twitter, Inc*., Case No. 2:20-cv-10754-AB(MRWx), United States District Court, Central District of California, Western Division (Jun. 15, 2021) [Pt. 1, 165 pgs; Pt. 2, 166 pgs.].
Sauri et al., "TimeML Annotation Guidelines," Version 1.2.1, dated Jan. 31, 2006. Available at http://www.timeml.org/site/ , pp. 1-71.
Lee et al., Context-Aware Recommendations on the Mobile Web. On the Move Meaningful Internet Systems 2005; OTM Workshops, 2005, pi 42-151 (Year 2005).
Shaban, Khaled, A Semantic Graph Model for Text Representation and Matching in Document Mining, 2006, A thesis presented to the University of Waterloo in fullfillment of the thesis requirement for the degree of Doctor of Philosophy in Electrical and Computer Engineering, Waterloo, Ontario, Canada, 2206, 1-140.
Hristova et al., "Ad-me: Wireless Advertising Adapted to the User Location, Device and Emotions," 2204 [Online Downloaded Nov. 26, 2024 https://ieeeexplore.org/stamp/stamp.jsp?arnumber=1265673.
Stopher et al., "Processing GPS Data from Travel Surveys" 2005 [Online] Downloaded Nov. 26, 24 https://australasiantransportresearchforum.org.au/wp-content/uploads/2022/03/2005_Stopher_Jiang_FitzGerald.pdf.
Zheng et al., "Mining Interesting Locations and Travel Sequences from GPS Trajectories" Apr. 24, 2009 [Online] Downloaded Nov. 26, 2024 https://dl.acm.org/doi/pdf/10.1145/1526816.
Mbastian. Gephi 0.9.1 Release Notes. Feb. 14, 2016. Github. <https://github.com/gephi/releases/tag/v0.9.1> (Year: 2016).
Gephi 0.9.1 Requirements. Dec. 18, 2015. Gephi.org. <https://web.archive.org/web/20151208052328/http:l/gephi.org:80/users/ requirements/> (Year: 2015).
Screenshots from Gephi 0.9.1. Taken May 9, 2023.1 (Year: 2023).
Heymann, Sebastian. "GSoC mid-term: new Visualization API". Feb. 25, 2015. Gephi blog. <https://gephi.wordpress.com/2011/08/12/ gsoc-mid-term-new-visualization-api/> (Year: 2015).
Mbastian. "Edge weight range filter that also hides nodes". forum-gephi.org. 7/3/2013 <https://forum-geph.org/viewtopic.php?f= 30&t=1174< (Year: 2011).
Morris, Scooter, "Edge weight range filter that also hides nodes". groups.google.com. Oct. 24, 2014. <https://groups.google.com/g/cytoscape-hel pdesk/c/l7kGmj lsAa E> (Year: 2014).

* cited by examiner

COMPUTER-IMPLEMENTED SYSTEM AND METHOD FOR PROVIDING WEBSITE NAVIGATION RECOMMENDATIONS

CROSS-REFERENCE TO RELATED APPLICATION

This patent application is a continuation of U.S. patent application Ser. No. 13/673,917 filed on Nov. 9, 2012, the contents of which are incorporated herein in their entirety by reference.

FIELD

This application relates in general to navigating Websites, and in particular, to a computer-implemented system and method for providing Website navigation recommendations.

BACKGROUND

The use of computers is widespread and as the Internet becomes the primary source for users to obtain information, efficiently navigating to a Web page with desired information becomes extremely important so that users can quickly and easily obtain the information. However, based on a large amount of available data, the desired information can be difficult to locate due to the structure and set up of a Web site, unclear page links, time to reach the desired information and long paths to reach the desired information, as well as other barriers. Thus, users often require assistance to reach the desired information.

Directing a user to the information can be a difficult task, especially using limited interpersonal communication types, such as the telephone or other device through which voice is provided. Conventionally, a user places a call to an agent at a call center in an attempt to locate the information. The agent can verbally provide instructions on how to reach the desired information. However, the verbal instructions can be difficult to understand and directing the user to the information via the verbal instructions can be time consuming as the agent must often repeat or reword the instructions. Further, each agent subjectively provides the instructions and different instructions can be provided by different agents, resulting in inconsistent instructions. As well, due to the subjective, inconsistent, and sometimes confusing instructions, the users are frequently unable to access the same information at a later time, despite receiving the instructions from the agent.

Thus, a system and method for providing efficient and easy-to-understand instructions to locating requested information is needed. Preferably the user will learn about the structure of the Website from the provided instructions so as to be able to access the same or similar information without further assistance.

SUMMARY

Often times, locating a desired Web page can be difficult due to large amounts of information available on the Web or a complex structure of a domain to which the Web page belongs. Verbally conveying instructions to a user for reaching the desired Web page can be frustrating and unsuccessful. A recommendation for efficiently reaching the destination Web page can be provided based on data extracted from the domain. The recommendation can include providing short link recommendations, search queries, or a path from a source Web page to the destination Web page.

An embodiment provides a system and method for providing Website navigation recommendations is provided. A Web page of interest is identified as a destination Web page. A domain of Web pages related to the destination Web page is determined. Information is extracted from each Web page in the domain and a recommendation comprising instructions for navigating to the destination Web page is generated based on the extracted information.

Still other embodiments of the present invention will become readily apparent to those skilled in the art from the following detailed description, wherein are described embodiments by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Users frequently turn to the Internet to obtain desired information, including, inter alia, instructions or content and product information. However, navigating to a particular Web page with the desired information can be difficult. Further, providing instructions regarding navigating to the Web page can be time consuming and frustrating to the users requesting the information. For example, a user having trouble locating a particular Web page with the requested information places a call for assistance, such as to a call center associated with the requested information. An agent at the assistance center verbally attempts to provide instructions on how to reach the Web page over the telephone, but the user cannot understand the instructions so the agent repeats himself or provides an alternate explanation. Hopefully, the agent is able to direct the caller to the requested information, but if not, the agent must take further action to handle the call.

Figure 1:
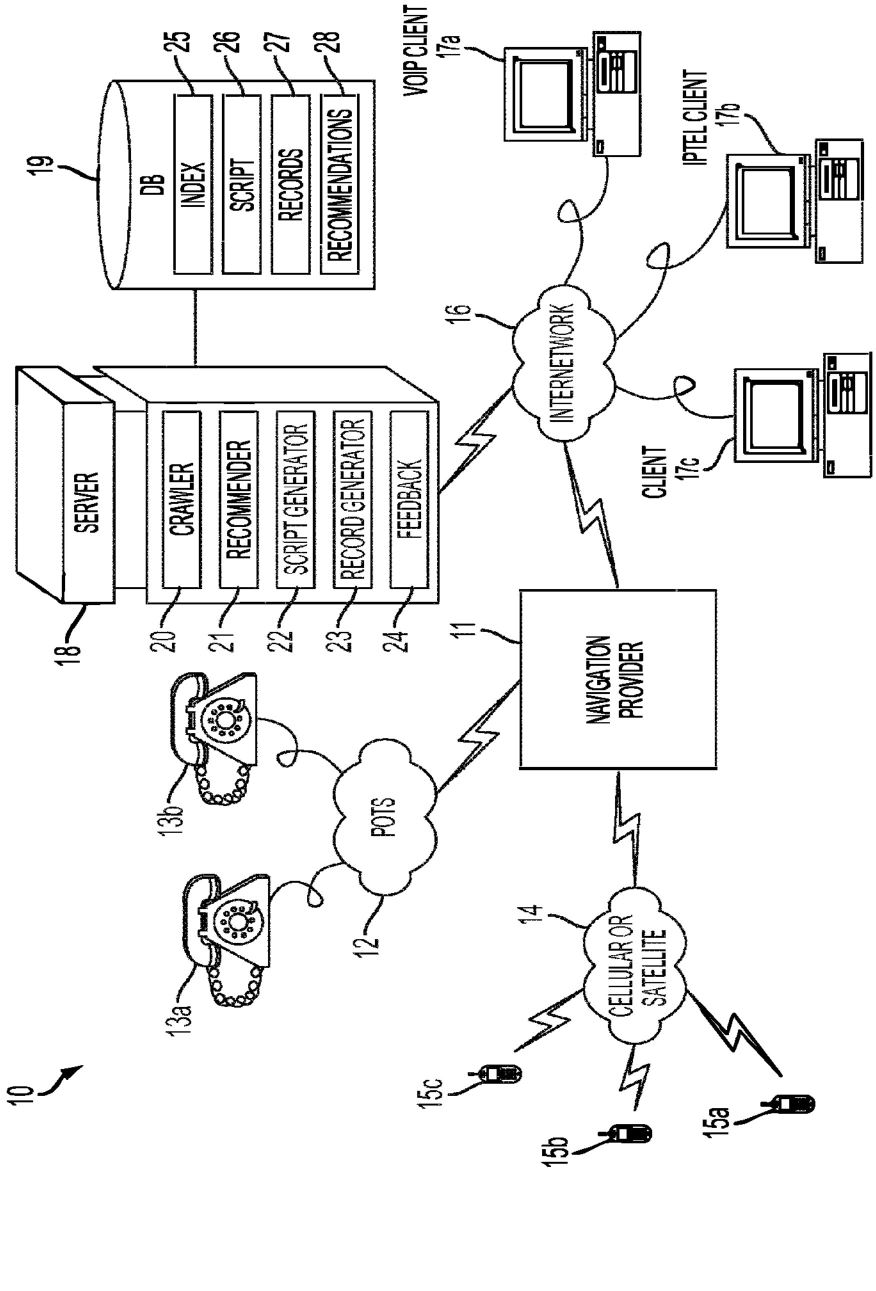
FIG. 1 is a block diagram showing a system for providing Website navigation recommendations, in accordance with one embodiment.

To efficiently direct the user to the Web page and provide the user with necessary tools to be able to return to the Web page, the agent can provide recommendations for navigation to the Web page, which are based on the content and structure of the Website with the requested information. Determining navigation recommendations requires a system involving analysis of a designated set of Web pages. FIG. 1 is a functional block diagram showing a system 10 for providing Website navigation recommendations, in accordance with one embodiment. A user can contact an assistance center 11 for help locating information on a particular Web page via conventional telephone handsets 13*a-c* through Plain Old Telephone Service (POTS) 12, portable handsets 15*a-c* through cellular and satellite telephone service 14, and VoIP clients 17 and Internet telephony clients 18, as well as other forms and combinations of telephony, message, and voice-based communications via an Internetwork 16. The assistance center 16 can include a call center, which is operated by a company to address information queries from consumers and provide product support. The assistance center can include agents that answer calls from the consumers and provide the requested information. Except as otherwise stated, as used herein, the terms "user" and "caller" are used interchangeably to refer to a caller to the assistance center 11, and the terms "agent" and "service provider" are used interchangeably to refer to an agent that provides navigation instructions to the caller.

A call is received into the assistance center from a user. During the call, the user requests assistance regarding locating a particular Web page with desired information. The request is transmitted to a server 18 via the Internetwork 16 for processing and identifying the Web page as a destination Web page. Alternatively, the server 18 can be local to the assistance center. Initially, a domain is defined for the desired Web page. Alternatively, the domain can be predetermined. The domain includes a document set, such as a collection of Web pages on a Website or a collection of Websites, files, databases, or file management system related to the desired information. The domain can be generated by the user, agent, or automatically. Defining a domain is further described below with reference to FIG. 3.

Once defined, a WebCrawler 20 navigates to and parses each Web page in the domain. Relevant information is extracted from the Web pages and stored in an index 25 that is maintained in a database 19 that is interconnected to the server 18. The WebCrawler 20 can navigate to each Web page in the domain by traversing links in each page or by generating a list of Uniform Resource Identifiers (URIs), which can include Uniform Resource Locators (URLs). Subsequently, a recommender 21 utilizes the information in the index to generate a recommendation 28 for navigating to the desired Web page. The recommendation can include navigations instructions and can be generated via a shortlink generator (not shown), a search term generator (not shown), or a Web page traversal path recommender (not shown). The recommendations can be stored in the database 19 for subsequent use. A short link generator creates and assigns a short link to the desired Web page, while the search term generator generates a search query for identifying the destination Web page. Meanwhile, the path recommender builds a path of links within the domain from a source Web page to the desired destination Web page. Generating a recommendation is further described below with reference to FIGS. 5-7.

The recommendation is then provided to the agent at the assistance center for relaying to the user. In one embodiment, a script 26 can be generated via a script generator 22 based on the recommendation so that the agent relays the navigation directions by reading the script 26 to the user. In a further embodiment, a script 26 previously generated and stored in the database can be provided to the agent for relaying to the user. The navigation instructions can also be provided via text, such as in an email, SMS text message, or via Instant Messenger. After the navigation instructions are provided and the user locates the desired Web page, a record generator 23 can document the call based on the call script 26, which is stored as a record 27 of the call in the database 19. Finally, a feedback module 24 can evaluate the recommendation 28 to determine whether refinement is necessary before providing the same recommendation to a further user. The evaluation can be based on metrics, such as repeatability, error rate, learnability, and number of clicks, as well as other metrics, which are described in detail below.

The handsets, computers, and server each include components conventionally found in general purpose programmable computing devices, such as a central processing unit, memory, input/output ports, network interfaces, and non-volatile storage, although other components are possible. Moreover, other information sources in lieu of or in addition to the servers, and other information consumers, in lieu of or in addition to the handsets and computers, are possible.

Additionally, the handsets, computers, and server can each include one or more modules for carrying out the embodiments disclosed herein. The modules can be implemented as a computer program or procedure written as source code in a conventional programming language and is presented for execution by the central processing unit as object or byte code or written as interpreted source code in a conventional interpreted programming language interpreted by a language interpreter itself executed by the central processing unit as object, byte, or interpreted code. Alternatively, the modules could also be implemented in hardware, either as integrated circuitry or burned into read-only memory components. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components.

Figure 2:
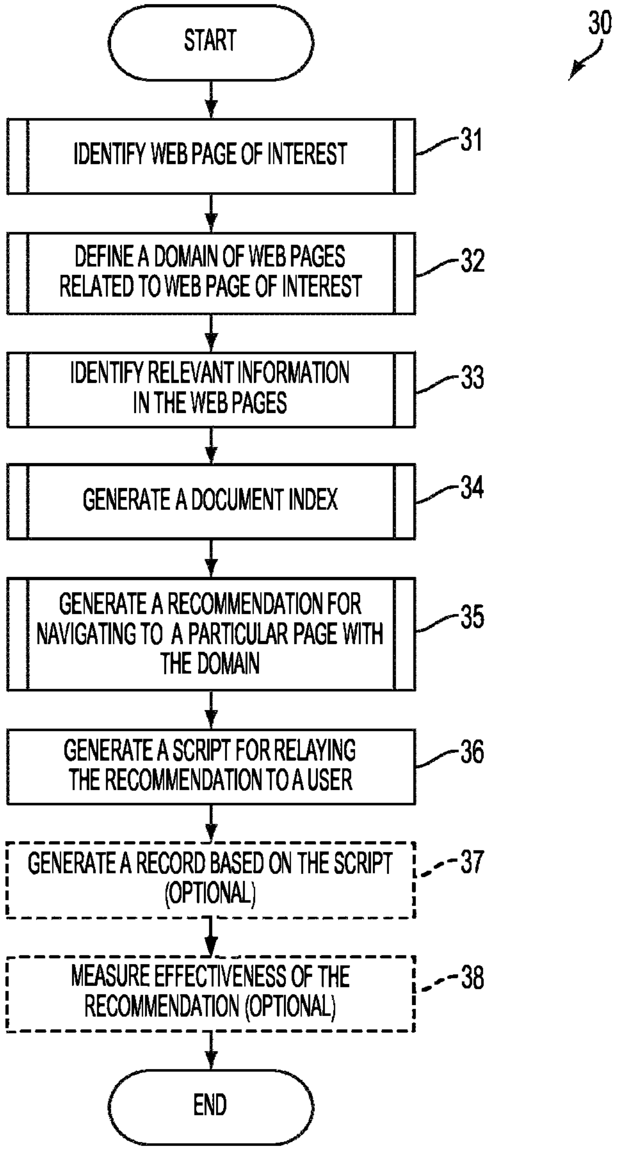
FIG. 2 is a flow diagram showing a method for providing Website navigation recommendations, in accordance with one embodiment.

A recommendation for navigating to a destination Web page can efficiently direct users to desired information, while providing tools to the users to re-access the Web page at a later time. FIG. 2 is a flow diagram showing a method 30 for providing Website navigation recommendations, in accordance with one embodiment. A user conducts a search for desired information on a Website and is unable to locate the information. The user can then place a call to a assistance center and request instructions for navigating to the desired information from an agent at the assistance center. In one embodiment, the assistance center can own or manage the Website with the desired information. However, other relationships between the Website and assistance center are possible. Alternatively, the user can send the request for instructions via a text message, Instant Messaging, or email, as well as other forms of communication. In the following discussion, a call center is used as an example.

During the call interaction, the user identifies desired information or a Web page of interest (block 31). If desired information is provided, the Web page of interest can be determined automatically or by the agent. The Web page of interest is determined to be the destination Web page to which instructions are provided via a recommendation. Except as otherwise stated, as used herein, the terms "Web page of interest" and "destination Web page" are used interchangeably to refer to the Web page which includes information requested by a user and to which navigation instructions are provided.

A domain of Web pages is defined for the Web page of interest (block 32). The domain includes Web pages related to the Web page of interest and defining the domain is further described below with reference to FIG. 3. Relevant information within the Web pages of the domain is identified (block 33) and extracted to generate a document index (block 34). The relevant information can include relationships between the domain pages, metadata of each of the pages, and content of the pages. Identifying the relevant information is further discussed below with reference to FIG. 4.

The index can be structured as a graph representation of the structure of the Web pages or a hash table where each Web page maps to a set of attributes. In the graph representation, the Web pages can be represented by nodes, while connections shared between the Web pages are represented by links. The hash table can include a list of the Web pages that are each mapped to a set of attributes. The attributes can include nouns and noun phrases, tokens, titles, URIs and links, as well as other attributes.

Based on the information in the index, a recommendation for navigating to the Web page of interest is generated (block 35). The type of structured index for use in generating a navigation recommendation is dependent upon the type of recommendation to be generated. For instance, a graph representation can be used to generate a path recommendation, while the hash table can be used to generate a query recommendation, as further discussed below with reference to FIGS. 6 and 7. Generating the recommendation is further discussed below with reference to FIGS. 5-7. A script of the recommendation can be generated (block 36) for relaying the recommended instructions to the user. Optionally, a record of the user interaction can be made based on the script (block 37). Further, the recommendation can be analyzed and refined if necessary (block 38).

A domain of Web pages is defined upon receiving a Web page of interest from a user. The Web pages of the domain can be related to the page of interest, such as by sharing a common domain name or linking to a page with the common domain name. Determining the domain is important since information within the domain is used to provide the navigation recommendations. If the defined domain is too small, there may not be enough information to generate a navigation path between a source page and the destination Web page. Alternatively, if the domain is too large, determining the navigation recommendation can take too long to process during the call without frustrating or angering the caller.

Figure 3:
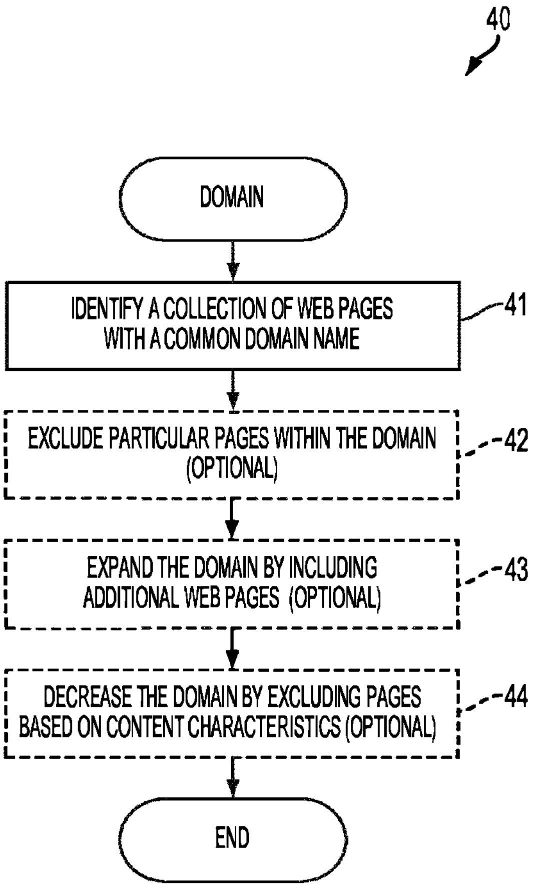
FIG. 3 is a flow diagram showing, by way of example, a process for determining a domain for a particular Web page.

The domain can be determined automatically, by the user, by the agent, or as a combination. FIG. 3 is a flow diagram showing, by way of example, a process 40 for determining a domain for a destination Web page. A collection of Web pages related to the destination Web page is identified (block 41). The related pages can share a common domain name with the Web page of interest. For example, a user is looking for an insurance form to fill out on the California Health Care ("CHC") Website. All the Web pages with the domain name californiahealthcare.com can be identified. Each of the Web pages is analyzed and can optionally be applied to exclusion rules (block 42). If the exclusion rule does not apply to the Web page, that page is included in the domain.

The exclusion rules can include a predetermined list of Web pages to exclude, including those Web pages having a particular URI within the domain or that include a particular terms in the URI. For instance, returning to the above example, Web pages with the URI, http://reports.californiahealthcare.com, can be excluded from the domain or Web pages having the term "banner" in the URI can be excluded. The remaining Web pages can then be defined as the domain.

The domain can optionally be refined to ensure that an adequate number of Web pages are included to generate a fast and accurate recommendation for navigation. For instance, the domain can be expanded or decreased by including additional Web pages (block 43) within a particular distance from a Web page within the domain or by excluding Web pages with particular content characteristics (block 44), respectively. Returning to the above example, the CHC Website contains a large number of pages, most of which are unrelated to insurance. To generate a domain with more representative Web pages, Web pages that do not share the common domain name, but that are located a predetermined number of clicks away from the Web pages in the domain can be included. Meanwhile, the domain can be further refined to exclude Web pages with certain content characteristics, such as Web pages with the phrase "physician biographies."

In a further embodiment, the domain can be predetermined. For example, agents at a call center associated with the CHC are available to answer calls related to the CHC Website, which is the predetermined domain. However, in yet a further embodiment, a predetermined domain can be modified by expanding or decreasing the domain as described above with respect to FIG. 3.

Figure 4:
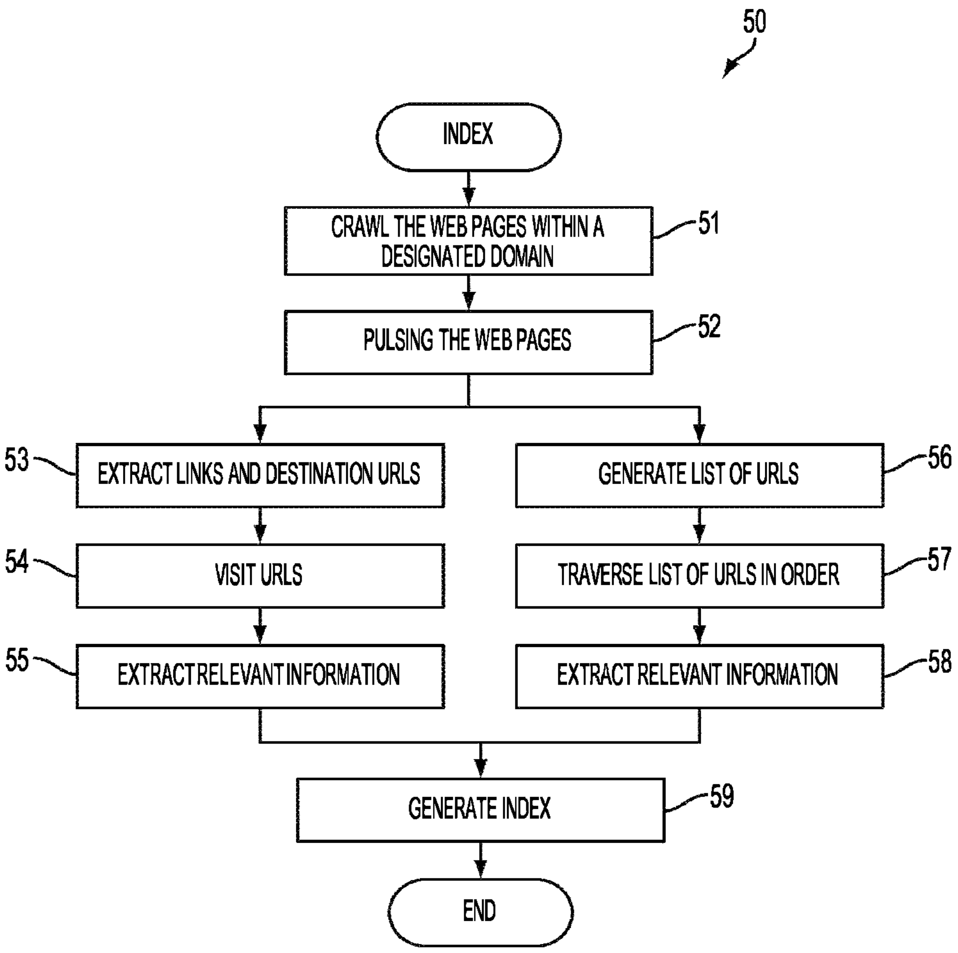
FIG. 4 is a block diagram showing, by way of example, a process for obtaining information for use in generating an index for navigation assistance.

After defining the domain, information within the Web pages of the domain is identified and extracted. FIG. 4 is a block diagram showing, by way of example, processes 50 for obtaining information for use in generating an index. A Web crawler traverses (block 51) and parses (block 52) the Web pages in the defined domain. The Web pages within the domain can be identified and analyzed by traversing links within the Web pages or by traversing a list of the Web pages. To traverse by link, the html code of each Web page within the domain is parsed, and anchor tags and corresponding destination URIs are extracted (block 53). The Web crawler then visits (block 54) each URI via a depth-first or breadth-first search. Relevant information from the Web pages is then extracted (block 55). The relevant information can include from the Web pages, metadata, and structure, such as connections between the Web pages. Alternatively, to traverse the Web pages based on a list, URIs for each Web site can be complied into a list (block 56) and the list is then visited in order (block 57). Relevant information is extracted (block 58) from each of the visited Web pages.

The relevant information extracted from the Web pages of the designated domain is used to generate an index (block 59). The index can include a graph representation of the Web pages as nodes and connections between the Web pages as links, or a hash table, which maps each Web page to a set of attributes.

Figure 5:
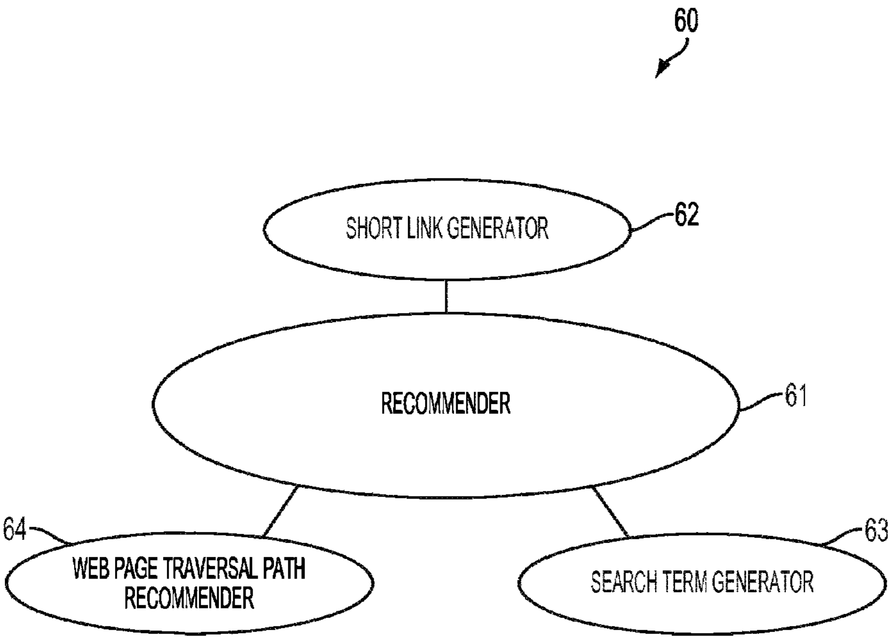
FIG. 5 is a flow diagram showing, by way of example, different types of recommendations for navigation assistance.

The index information can be used to generate a recommendation for navigation. FIG. 5 is a flow diagram showing, by way of example, different types of recommendations for navigation assistance. A recommendation can be generated using a recommender 61, such as a short link generator 62, a search term generator 63, or a path recommender 64. The short link generator 62 generates a shortened URI as a replacement for the original, longer URI assigned to the destination Web page. The shortened URI can be generated using an algorithmically-generated value, such as hash code, or based on a semantically meaningful short form.

The algorithmically-generated value can be a TinyURL, by Gilby Productions, which provides short aliases for redirection of original URIs based on the domain name tinyurl.com. However, TinyURLs are generally unrelated to the content of the desired Web page and fail to assist a user in accessing the same page at a later date.

Meanwhile, a semantically meaningful short form URI can be based on terms that are related to information provided on the Web page of interest. For example meaningulurl.com maps arbitrary URIs to short forms using predefined controlled domain names that are extended by user-selected text strings. If the meaningful short form URI is unique from any existing short form, the URI is created and reserved for a limited period of time and recycled upon expiration.

To further personalize the shortened URIs, easy-to-remember words or phases that are shared between the user and the agent should be used. Also, to assist the users in learning how to access the Web page on their own, the shortened URIs should have structure and be related to the content of the Web page represented by the short link. Further characteristics for selecting the shortened URIs include using or abbreviating a domain of interest upper level name, an upper level interest name or Website structural information, the user name or related information, the agent name or related information, keywords or code relevant to the interaction between the user and the agent, date and time information, and any agreed upon words between the user and the agent. The shortened URIs can be determined automatically or by an agent. In one embodiment, the agent is provided with a list of the characteristics for use while selecting a shortened URI.

Once the shortened URI is selected, the Web page associated with the original URI is mapped to the shortened URI. Additionally, the shortened URI can be refined to include meaningful information by shortening or lengthening the shortened URI. If approved, the shortened URI is communicated to the user and a shortened URI service provider implements the associated mapping into a public Web structure. Different callers that are looking for the same Web page of interest can be provided with the same link or with a different link that can be characterized to that caller, such as "johnsinsuranceform.com" versus "mariasinsuranceform-.com." Also, effectiveness of the short link URI can be measured by how easy the link is to type into a Web browser, how memorable the link is to remember, and how relevant the link is to the Web page of interest, as well as other factors.

Figure 6:
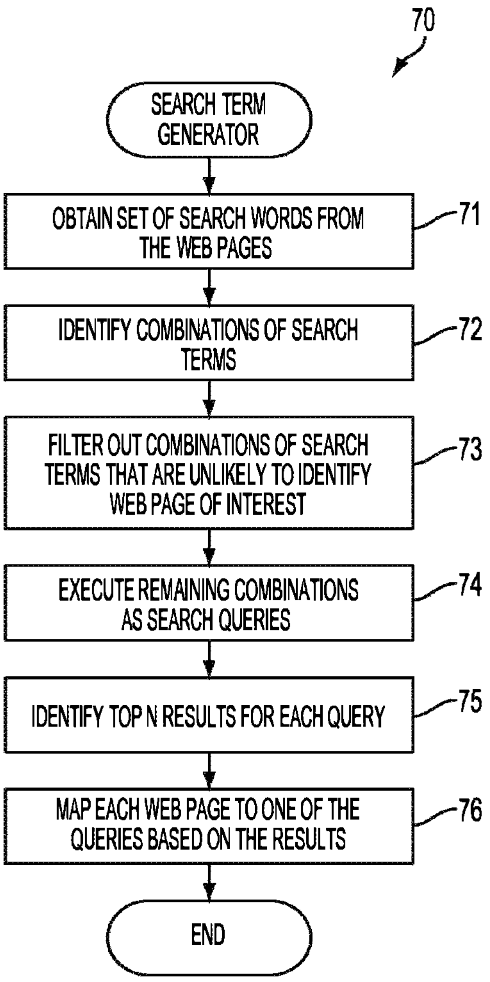
FIG. 6 is a flow diagram showing, by way of example, a process for generating a search term recommendation for navigation assistance.

A recommendation for navigation can also be provided as a search query. For instance, a set of search terms can be determined for locating the Web page of interest as a top search result. The search terms are then provided to the caller who can enter the terms as a query and locate the page of interest. FIG. 6 is a flow diagram showing, by way of example, a process for generating a search query recommendation for navigation assistance. A set of search words is obtained (block 71) from one or more Web pages, such as the Web page of interest, all Web pages in the domain of interest, or a reference set of Web pages, that can be defined by crawling domain-related terms or compiling domain ontologies. Alternatively, the search terms can be stored and obtained from a previously generated index, such as a hash table, as well as other types of indices. The list of search terms can be optionally refined, such as by limiting the number of search terms for further processing or limiting the sections of the Web pages from which the search terms can be obtained. For example, the number of search terms can be reduced by removing stop words or stemming the words. Also, the number of search terms can be reduced by looking for terms that appear in one or more sections of the Web page, including the title, headers, and text of an html version of the Web pages.

Combinations of the search terms are identified (block 72) as possible search queries. In one embodiment, all possible search term combinations are identified. A number of the combinations can be reduced by limiting the number of search terms, as described above, or by setting a maximum number of words for inclusion in a search combination. In one embodiment, a maximum number of search terms for combining in a query is set to three terms. Once determined, those combinations that are unlikely to identify the Web page of interest are removed (block 73). Specifically, the search terms are each analyzed to determine a commonality of that term using term frequency-inverse document frequency ("tf-idf"). A high tf-idf score indicates that the term appears many times in a particular Web page and few times in other Web pages, which makes the term a good candidate for identifying that particular Web page. Combinations of search terms each having low tf-idfs can be removed to reduce the number of possible search queries to test.

In a further embodiment, two or more terms are analyzed for overlap. In one example, a first term is present in half of the Web pages in the domain, while a second term is present in a different half of the Web pages. Using tf-idf, each term would have a low tf-idf score. However, an overlap of the two words may only appear on the Web page of interest and thus, both terms are good even though the tf-idf score is low.

A search is performed using each of the remaining combinations of search terms (block 74) as search queries to identify one or more Web pages in the domain as search results for each of the queries. The search queries can be applied to the URI of each Web page in the domain or to the content of each Web page to identify results. The top N number of resulting Web pages is identified (block 75) and each Web page is mapped (block 76) to the best search query for that Web page, which is determined using the N number of results for each query.

Generally, each Web page in the domain should appear at least one in the search results. If a Web page is only identified as a top N result for a single search query, then that Web page is mapped to that search query. Alternatively, if a Web page is listed as a top N result for two or more search queries, the best search query for that Web page can be identified based on one or more selection factors, including how difficult are the words in the query, how many words does the query include, and how high is the Web page ranked in the top N search results for that query. For example, the search query with the easiest words, the least number of words, or that ranks the Web page the highest is the best search query. Additionally, the best query can be determined using a combination of the selection factors. Other selection factors are possible. Each Web page can be stored with the search query in a one-to-one mapping chart. Upon a request from a user to access a Web page, the search query can be obtained from the mapping and provided to the user. The search query can be obtained automatically after an agent enters the requested Web page or manually by the agent.

In one example, a caller requests instructions for locating information on ankle sprains on the CHC Website from an agent. The agent can request instructions for providing to the caller, such as by entering the requested information via a user interface. If the request has already been submitted, a previously generated query associated with the requested information is looked up in the mapping stored in a database and provided to the caller. In contrast, if the request has not been previously submitted, a recommendation for obtaining the requested information is generated and provided to the agent as a search query for relaying to the caller. Alternatively, the query can be automatically provided to the caller. Subsequently, the caller can enter the search query into a local search engine on a Web page or on a public search engine across the Internet to access the destination Web page with the desired information by selecting the result associated with the desired Web page.

Figure 7:
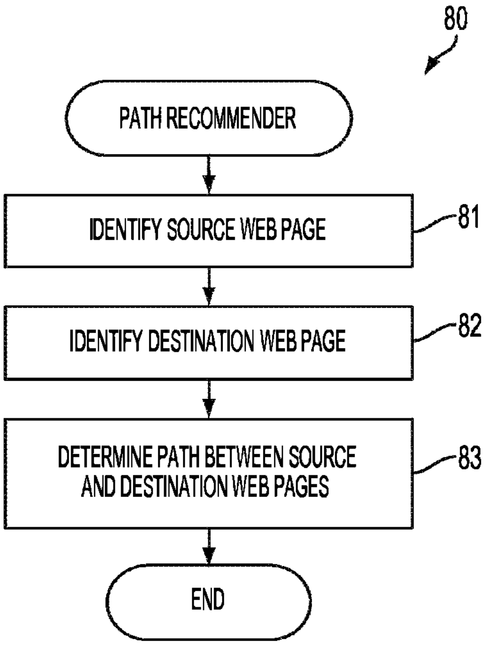
FIG. 7 is a flow diagram showing, by way of example, a process for generating a path recommendation for navigation assistance.

A recommendation for navigating to a destination Web page can also be a path from a source Web page to the desired Web page. A navigation path allows the caller to locate the Web page of interest by clinking on links of Web pages. FIG. 7 is a flow diagram showing, by way of example, a process 80 for generating a path recommendation for navigation assistance. A source, or start, Web page is identified (block 81). For instance, a caller is looking for an insurance form on the CHC Web site. The home page of the CHC Web page can be designated as the source page. Next, a destination, or desired, Web page is identified (block 82). For example, the page on which the insurance form is located can be identified as the destination Web page. Subsequently, a path is determined (block 83) between the source and destination Web pages. The path can be generated automatically or by the agent, and is determined based on information provided in the index, which is further described above with reference to FIG. 4. The index can be a graph or map representation of the Website to which the Web page of interest belongs or a representation of the domain, which can be the same or different from the Website. In the map representation, each Web page can be represented as a node, while the connections between the Web pages are represented as links, such as lines. Based on the map representation, a path can be determined.

The determined path can be the shortest path, the most intuitive path, via a predetermined Web page, based on one or more efficiency metrics, or based on topics. The shortest path can be the path that includes the fewest number of links to reach to the Web page of interest. In one embodiment, the Dijkstra shortest path algorithm can be applied to the hyperlinks that connect the Web pages within the domain for the source and destination Web pages. Other algorithms are possible. Selection of a particular path can be based on characteristics of the caller or as a default. For instance, an older caller may want to get to the Web page of interest with the shortest amount of links so that he can later remember how to reaccess the Web page, whereas a more savvy user may desire the most intuitive path, even though the path is longer.

A recommended path can be routed via a predetermined page when the Web page is important, should be seen by the caller, or helps provide insight as to the rest of the Website. Other reasons for routing the path through the predetermined pages are possible. Returning to the above example, the caller requests instructions to obtain an insurance form on the CHC Website. The home page of the CHC Website can be designated as the source page, while the Web page with the insurance form can be designated as the destination Web page. A path can be generated from the home page to the insurance page through the contact page, which includes the address and fax number to which the completed insurance form can be sent. When the navigation instructions for the recommended path are provided, the caller sees the contact information and will later be able to navigate back to obtain the contact information after he has filled out the insurance form.

During path generation, a set of metrics can be considered for identifying an efficient, clear and easy to understand path for providing to the caller. The metrics can include a number of hops, link visibility, link length, locating links, site exposure, and scrolling. A number of hops identifies how many Web pages a caller passes en route to the destination page. Link visibility focuses on how quickly and clearly the agent can describe attributes of a hyperlink (link) to the caller, which links to another Web page in the path. For example, links can be text, images, buttons, or other graphics. In one embodiment, depending on the links, describing an image to the user for identifying a link may be easier than describing text, or vice versa. Link position, size, color, or content can be used as the attributes for describing a link. Link length provides a measure of length of a link. For example, longer links can be more confusing for a caller. Link location identifies an ease with which the caller identifies a link on the Web page. Factors for determining ease of the caller's identification includes color, size, and location of the link on a screen. For instance, the link may only be visible if the user performs an action, such as hovering over a tab on a Web page, which can be difficult for the caller to locate. Site exposure includes identifying how much Website structure does the caller see and learn and how likely is the caller to locate a similar page on his own. Scrolling identifies whether the caller must scroll down a Web page to find a link for clicking to get to the next Web page on the recommended path.

In one example, a Web page of a possible path may require the user to scroll down to identify a link. Thus, the path may include a detour so that the Web page is not included since the link can be difficult for the caller to identify. In a further example, Web pages that include bigger or more visible links can be included in the path since the links are easy for the caller to find.

The metrics can be applied to determine a path with respect to the metric selected. In one embodiment, one of the metrics is selected and optimized over a graph of the Website or domain using Dijkstra's algorithm. In a further embodiment, a least-cost algorithm that can handle multi-dimensional weights can be used to optimize over more than one metric, such as the Self-Adapting Multiple Constraints Routing Algorithm.

Paths can also be generated based on topics. For instance, the caller is looking for an insurance form. A path can be generated that takes the caller through all Web pages that are relevant to insurance, such as a frequently asked questions page on insurance, contact information for sending insurance forms, and how get an update on insurance claims. The pages can be identified using the map representation. Specifically, each node in the map representation is associated with metadata, such as topics, content, and relationships, as well as other metadata. In a further example, a caller may be interested in obtaining information about diabetes on the CHC Website, which has different paths from the home page to information on diabetes Type 1 and diabetes Type 2. Since Type 1 and Type 2 diabetes are related, the respective paths generated for each type can route the caller through a general diabetes page or another common page. Routing the paths through a common page may include more links, but can be easier for the caller to remember, as well as provide the caller with additional related information. Other examples are provided.

Once the recommendation is generated, the instructions of the recommendation are relayed to the caller. The instructions can be provided verbally by the agent in a step-to-step manner, as text, or via an automated response system. However, other methods for providing the instructions to the caller are possible. Relaying the instructions to the caller via a script is further discussed below. The recommended path can then be evaluated for efficiency. If the path is not efficient, the path can be revised or a new path can be generated. Additionally, multiple paths can be generated and ranked to determine the best path.

Past data and common behaviors can be used to improve path generation. The most common starting points and desired destination Web pages are identified to provide insight as to a general flow of a Website. Based on the common starting and endpoints, paths that share large subsections can be generated. For example, a path from page A to page B can share many of the same hops as a path from page C to page B. Hierarchical grouping can be used to see which group results in the most shared hops. Map representation and path generation can also be useful for redesigning or restructuring the Website having the Web page of interest. Analyzing actions of users with respect to the pages and grouping similar flows into the same path can help web designers understand how best to group content together on Web pages. As well, the approach could be used to reduce the number of links along a path and aggregate all related information onto a single page.

The recommendations, whether provided as a short link, search query, or path, can each be provided to a caller via a script. Scripts are a convenient way to provide consistent instructions to the callers by different agents. The script is generated as a string of text that can be read by the agent who directs the caller to the desired information. The script can be based on the recommendation for navigation instructions, along with explanatory or narrative elements to express the navigation in human readable form. For example, a script can be generated automatically based on the recommended navigation instructions or manually by a person affiliated with the call center in which the script will be used. In a further embodiment, the script is prerecorded and played to the caller, or sent to the caller as text.

Figure 8:
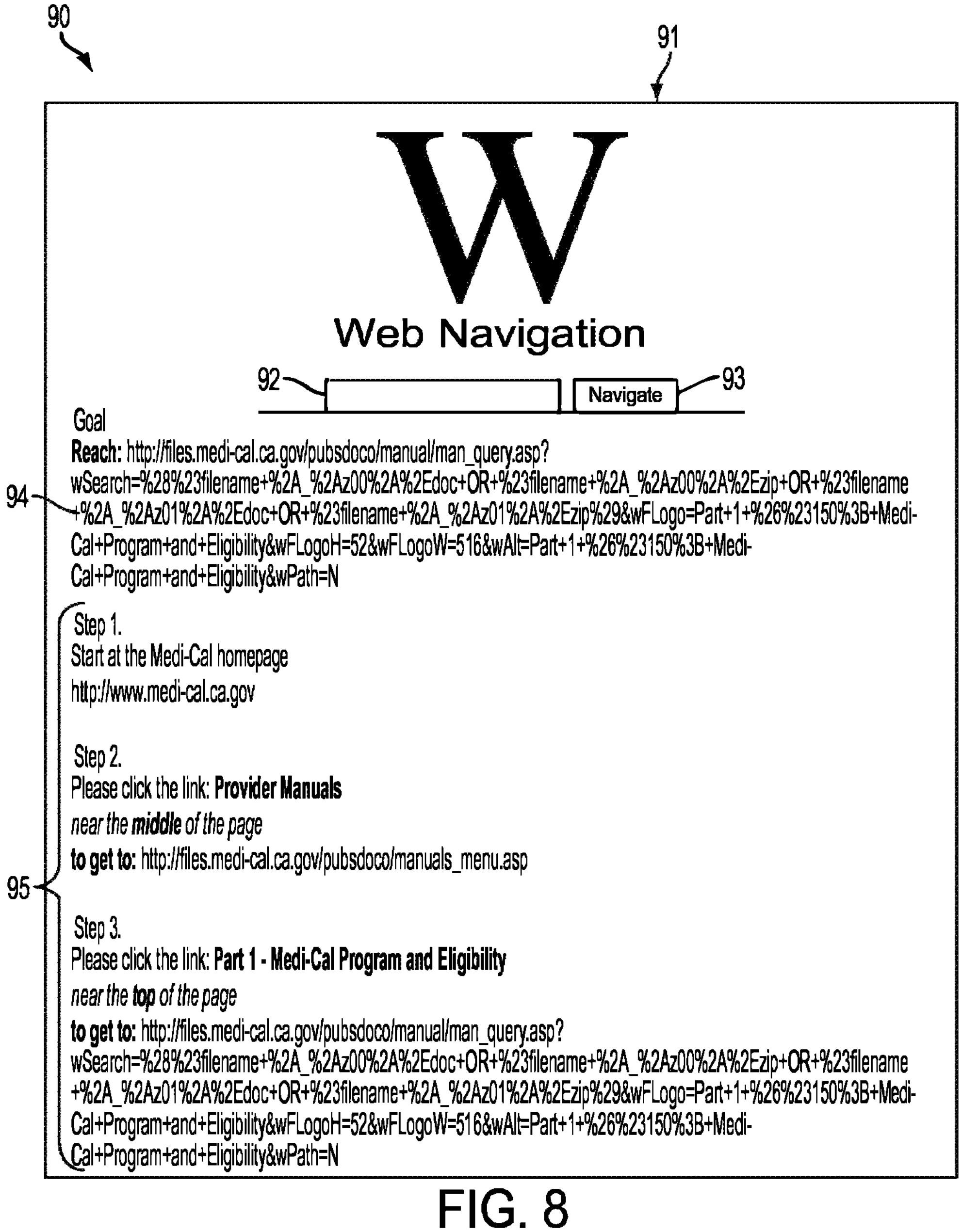
FIG. 8 is a screenshot of a Web page displaying a script to an agent.

Once generated, content of the script is relayed to the caller. FIG. 8 is a screenshot 90 of a Web page 91 displaying a script to an agent. The Web page 91 can be displayed to an agent at a call center and includes a navigation box 92, goal 93, and script 94. Other fields on the Web page 91 are possible, including a map representation of the domain, user data and preferences, and a navigation recommendation selection field. The agent can enter a request for a Web page of interest from a caller in the navigation box 92. Subsequently, the agent can select a navigation button 93 located proximate to the navigation box 92 to request navigation instructions to the entered Web page of interest. Once the request is processed and navigation instructions are determined, a script is displayed. The script can be newly generated based on the request or can be previously generated and stored in a database for accessing by the agent. The script can include a goal 94, which is the Web page of interest, and steps 95 explaining how to navigate to the Web page of interest. The agent can then relay the instructions to the caller step-by-step using the script.

The script can be stored in a database and used to document a portion of the call. Specifically, transformation rules can be applied to the script for conversion into a format suitable for archiving, such as by recording the scripts, applying text filters, or other language processing techniques. For example, after every step of the navigation instructions, actions and speech can be automatically documented for the agent based on the script. Additionally, at each step, the agent can manually document actions or speech of the caller. In one embodiment, the record is generated by appending each step as provided in the script to the record and providing a cursor after the step so the agent can start to type at the appropriate location. The record is then generated step-by-step as the agent relays the instructions to the caller.

In a further embodiment, the recommendations can be evaluated for effectiveness. The measures of effectiveness can include repeatability, learnability, error rate, time to convey instructions, number of clicks, number of keystrokes, and similar pages. Repeatability measures how easily a user is able to get to the same Web page of interest without the assistance of an agent, such as by testing sets of navigations over a sample population of test participants and by keeping a history of scripts and repeated calls by the caller or difficulties reported by the agent. Learnability measures how much the caller learns about the structure of the Website that includes the Web page of interest. Error rate identifies a percentage of time that the recommendation results in an error, such as by providing instructions to the wrong Web page, and how likely errors are made in communicating the recommendation. The time to convey instructions measures a length of time needed for the caller to go from the source page to the destination page. The number of clicks measures how many clicks, such as mouse clicks or finger taps, are required based on the instructions directing the caller from the source page to the destination Web page. The number of keystrokes measures how many keystrokes are required based on the instructions directing the caller from the source page to the destination Web page. Similar pages measures how easily a caller can get to a similar page after being instructed to the page of interest, which can be determined by testing sets of navigations over a sample population of test participants.

The calls can be monitored based on the measures to determine whether the recommended navigation instructions should be revised. If the measures show that the recommendation is not effective based on the measures, such as locating the Web page of interest or teaching the user how to locate the Web page on their own, the recommendation can be revised. For example, a different short link URI, search query, or path can be generated and stored for further use.

In a further embodiment, the user can bypass the call center and directly contact the server via a Web-enabled device, such as a cellular telephone or computer for navigations instructions, which are then displayed on the Web-enabled device.

In yet a further embodiment, pages different from the Web page of interest can be recommended to the caller. Analyzing sets of pages that one or more callers visit in a single session provides an indication that the pages are related to a common task, such as locating the Web page of interest. If a lot of people visit the same sets of Web pages in a session, the pages are likely related. Thus, if a caller visits a page, which is part of a related set of pages, a recommendation for the caller to visit the other related pages can be made.

While the invention has been particularly shown and described as referenced to the embodiments thereof, those skilled in the art will understand that the foregoing and other changes in form and detail may be made therein without departing from the spirit and scope of the invention.

What is claimed is:

1. A system for providing Website navigation instructions, comprising:

a server comprising a central processing unit, memory, an input port, and an output port, wherein the central processing unit is configured to:

receive a request for directions from a source Web page to a destination Web page received from a user;

identify a Web page of interest as the destination Web page;

generate a domain of Web pages related to the destination Web page, comprising:

identify Web pages that are related to the destination Web page; and perform at least one of selecting those of the identified Web pages that satisfy one or more exclusion rules and refining the identified Web pages as the domain of Web pages;

extract information from each Web page in the domain;

generate an index of the extracted information from the domain of Web pages for the destination Web page, generating the index including structuring the index as an index type between one of a graph representation and a hash table, wherein the index type is structured based on a type of recommendation to be generated;

distinguish whether the index associated with the destination Web page is the graph representation or the hash table;

select navigation directions comprising links or search terms to the destination Web page based on whether the index associated with the destination web page is the graph representation or the hash table; and provide the selected instruction to the user in response to the request based on the index type associated with the destination web page, comprising:

provide a path instruction comprising two or more links to Web pages located between the source Web page and the destination Web page as the selected instruction to the user when the index type of the destination web page is the graph representation; or provide a query instruction comprising two or more search terms as the selected instruction to the user when the index type of the destination web page is the hash table.

2. A system according to claim 1, wherein the central processing unit assigns a short link to the destination Web page based on the extracted information and provides the short link to a user as the instruction.

3. A system according to claim 1, wherein the central processing unit determines a search query to identify the Web page of interest and provides the search query to a user as the query instruction.

4. A system according to claim 3, wherein the central processing unit generates the search query by selecting a set of search words from the domain of Web pages, by identifying combinations of the search terms, by filtering out the combinations of search terms that are unlikely to identify the destination Web page, by applying the non-filtered combinations as possible search queries, by identifying one or more Web pages as results, and by mapping each of the results to one of the search queries.

5. A system according to claim 1, further comprising:

a source Web page; and a path determined between the source and destination Web pages, wherein the path is provided to a user as the path instruction.

6. A system according to claim 1, wherein the path is generated based on at least one of a predetermined Web page through which the path is directed, structures within the Web pages, and shortest path.

7. A system according to claim 1, further comprising at least one of:

a script generated based on the instructions;

a display to provide the script to an agent during a call with a caller; and a record of the call based on the script.

8. A system according to claim 1, wherein the central processing unit measures effectiveness of the instruction by measuring metrics of the instruction, wherein the metrics comprise at least one of repeatability, error rate and learnability and by analyzing the metrics.

9. A system according to claim 1, wherein the central processing unit determines the domain by identifying a collection of Web pages with a common domain related to the destination Web page.

10. A system according to claim 9, wherein the central processing unit performs at least one of excludes particular pages within the domain based on a Web page title, expands the domain by including additional Web pages, and decreases the domain by excluding pages based on content characteristics.

11. A method for providing Website navigation instructions, comprising:

receiving from a user, a request for directions from a source Web page to a destination Web page;

identifying a Web page of interest as the destination Web page;

defining a domain of Web pages, comprising:

identifying Web pages that are related to the destination Web page; and performing at least one of selecting those of the identified Web pages that satisfy one or more exclusion rules and refining the identified Web pages as the domain of Web pages;

extracting information from each Web page in the domain;

generating an index of the extracted information from the domain of Web pages for the destination Web page, generating the index including structuring the index as an index type between one of a graph representation and a hash table, wherein the index type is structured based on a type of recommendation to be generated;

distinguishing whether the index associated with the destination Web page is the graph representation or the hash table;

selecting navigation directions comprising links or search terms to the destination Web page based on whether the identified index type associated with the destination web page is the graph representation or the hash table; and providing the selected instruction to the user in response to the request based on the index type associated with the destination web page, comprising:

providing a path instruction comprising two or more links to Web pages located between the source Web page and the destination Web page as the selected instruction to the user when the index type of the destination web page is the graph representation; or providing a query instruction comprising two or more search term as the selected instruction to the user when the index type of the destination web page is the hash table.

12. A method according to claim 11, further comprising:

assigning a short link to the destination Web page based on the extracted information; and providing the short link to a user as the instruction.

13. A method according to claim 11, further comprising:

determining a search query to identify the Web page of interest; and providing the search query to a user as the query instruction.

14. A method according to claim 13, further comprising:
generating the search query, comprising:
obtaining a set of search words from the domain of Web pages;
identifying combinations of the search terms;
filtering out the combinations of search terms that are unlikely to identify the destination Web page;
applying the non-filtered combinations as possible search queries;
identifying one or more Web pages as results; and
mapping each of the results to one of the search queries.

15. A method according to claim 11, further comprising:
identifying a source Web page;
determining a path between the source and destination Web pages; and
providing the path to a user as the path instruction.

16. A method according to claim 11, wherein the path is generated based on at least one of a predetermined Web page through which the path is directed, structures within the Web pages, and shortest path.

17. A method according to claim 11, further comprising at least one of:
generating a script based on the instructions;
providing the script to an agent during a call with a caller; and
generating a record of the call based on the script.

18. A method according to claim 11, further comprising:
measuring effectiveness of the instruction, comprising:
measuring metrics of the instruction, wherein the metrics comprise at least one of repeatability, error rate, and learnability; and
analyzing the metrics.

19. A method according to claim 11, further comprising:
determining the domain by identifying a collection of Web pages with a common domain related to the destination Web page.

20. A method according to claim 19, further comprising at least one of:
excluding particular pages within the domain based on a Web page title;
expanding the domain by including additional Web pages; and
decreasing the domain by excluding pages based on content characteristics.

* * * * *